United States Patent
Oosato et al.

(10) Patent No.: US 10,824,016 B2
(45) Date of Patent: **\*Nov. 3, 2020**

(54) OPTICALLY ANISOTROPIC LAMINATE, CIRCULARLY POLARIZING PLATE, AND IMAGE DISPLAY DEVICE

(71) Applicant: ZEON CORPORATION, Tokyo (JP)

(72) Inventors: Kazuhiro Oosato, Tokyo (JP); Masashi Aimatsu, Tokyo (JP); Masakazu Saito, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 195 days.

This patent is subject to a terminal disclaimer.

(21) Appl. No.: 16/085,218

(22) PCT Filed: Mar. 27, 2017

(86) PCT No.: PCT/JP2017/012322
§ 371 (c)(1),
(2) Date: Sep. 14, 2018

(87) PCT Pub. No.: WO2017/170360
PCT Pub. Date: Oct. 5, 2017

(65) Prior Publication Data
US 2019/0079355 A1    Mar. 14, 2019

(30) Foreign Application Priority Data

Mar. 30, 2016   (JP) ................. 2016-068010

(51) Int. Cl.
*G02F 1/13363* (2006.01)
*G02B 5/30* (2006.01)
(Continued)

(52) U.S. Cl.
CPC .......... *G02F 1/133634* (2013.01); *B32B 7/02* (2013.01); *C09K 19/30* (2013.01);
(Continued)

(58) Field of Classification Search
CPC ............. G02F 1/133634; G02F 1/1336; G02F 1/1363; G02F 1/133615; G02F 1/133528;
(Continued)

(56) References Cited

U.S. PATENT DOCUMENTS 6,565,974 B1  5/2003  Uchiyama et al.
7,030,860 B1  4/2006  Hsu et al.
(Continued)

FOREIGN PATENT DOCUMENTS

CN      1292097 A     4/2001
CN    104603165 A     5/2015
(Continued)

OTHER PUBLICATIONS

May 16, 2017, International Search Report issued in the International Patent Application No. PCT/JP2017/012322.
(Continued)

*Primary Examiner* — Kristina M Deherrera
(74) *Attorney, Agent, or Firm* — Kenja IP Law PC

(57) ABSTRACT

An optically anisotropic layered body including a first optically anisotropic layer and a second optically anisotropic layer, wherein in-plane retardations Re(H450), Re(H550), Re(H590), and Re(H650) of the first optically anisotropic layer at wavelengths of 450 nm, 550 nm, 590 nm, and 650 nm, respectively, and in-plane retardations Re(Q450), Re(Q550), Re(Q590), and Re(Q650) of the second optically anisotropic layer at wavelengths of 450 nm, 550 nm, 590 nm, and 650 nm, respectively, satisfy specific requirements.

46 Claims, 4 Drawing Sheets

(51) Int. Cl.

| | | |
|---|---|---|
| C09K 19/34 | (2006.01) | |
| C09K 19/38 | (2006.01) | |
| H05B 33/02 | (2006.01) | |
| B32B 7/02 | (2019.01) | |
| C09K 19/30 | (2006.01) | |
| G02F 1/1335 | (2006.01) | |
| H01L 51/50 | (2006.01) | |
| G02B 1/10 | (2015.01) | |
| G06F 3/044 | (2006.01) | |

(52) U.S. Cl.
CPC .............. *C09K 19/34* (2013.01); *C09K 19/38* (2013.01); *G02B 1/10* (2013.01); *G02B 5/30* (2013.01); *G02B 5/305* (2013.01); *G02B 5/3016* (2013.01); *G02B 5/3083* (2013.01); *G02F 1/1335* (2013.01); *G02F 1/13363* (2013.01); *G02F 1/133553* (2013.01); *G06F 3/044* (2013.01); *H01L 51/50* (2013.01); *H05B 33/02* (2013.01); *G02F 2001/133562* (2013.01); *G02F 2001/133638* (2013.01)

(58) Field of Classification Search
CPC ............. G02F 1/134363; G02F 1/1335; G02F 1/133603; G02F 1/1313; G02F 1/133602; G02F 2001/133531; G02F 2001/133638; G02F 2001/133635; G02F 2001/133562; G02F 2001/133631; G02F 2001/133538; G02F 2001/133738; G02F 2202/40; C09K 19/04
USPC ............................... 359/489.07; 428/1.1, 1.3
See application file for complete search history.

(56) References Cited

U.S. PATENT DOCUMENTS

| | | | |
|---|---|---|---|
| 2005/0231660 | A1 | 10/2005 | Fujita et al. |
| 2005/0237440 | A1 | 10/2005 | Sugimura et al. |
| 2008/0309635 | A1 | 12/2008 | Matsuo |
| 2009/0091551 | A1 | 4/2009 | Hotelling et al. |
| 2009/0296027 | A1 | 12/2009 | Kawamoto et al. |
| 2010/0182252 | A1 | 7/2010 | Jeong et al. |
| 2010/0309167 | A1 | 12/2010 | Nam |
| 2014/0132860 | A1 | 5/2014 | Hotelling et al. |
| 2014/0142266 | A1 | 5/2014 | Sakamoto et al. |
| 2015/0070764 | A1 | 3/2015 | Hatanaka et al. |
| 2016/0145363 | A1 | 5/2016 | Sakamoto et al. |
| 2016/0216808 | A1 | 7/2016 | Hotelling et al. |
| 2016/0274400 | A1* | 9/2016 | Iida .................... G02F 1/13363 |
| 2017/0047555 | A1 | 2/2017 | Ishiguro et al. |
| 2018/0031738 | A1 | 2/2018 | Ishii et al. |
| 2018/0259812 | A1* | 9/2018 | Goda ................ G02F 1/133602 |

FOREIGN PATENT DOCUMENTS

| | | | |
|---|---|---|---|
| EP | 1045261 | A1 | 10/2000 |
| EP | 2871192 | A1 | 5/2015 |
| JP | H09127885 | A | 5/1997 |
| JP | 2002156528 | A | 5/2002 |
| JP | 2002321302 | A | 11/2002 |
| JP | 2003511799 | A | 3/2003 |
| JP | 2003331654 | A | 11/2003 |
| JP | 2005326818 | A | 11/2005 |
| JP | 2007328310 | A | 12/2007 |
| JP | 2008310550 | A | 12/2008 |
| JP | 2010164938 | A | 7/2010 |
| JP | 2010541109 | A | 12/2010 |
| JP | 2011511357 | A | 4/2011 |
| JP | 2011138144 | A | 7/2011 |
| JP | 2011175601 | A | 9/2011 |
| JP | 2012018634 | A | 1/2012 |
| JP | 2014071209 | A | 4/2014 |
| JP | 2014123099 | A | 7/2014 |
| JP | 2014123134 | A | 7/2014 |
| JP | 2015040904 | A | 3/2015 |
| JP | 2015079230 | A | 4/2015 |
| WO | 2012147904 | A1 | 11/2012 |
| WO | 2015166991 | A1 | 11/2015 |
| WO | 2016114254 | A1 | 7/2016 |

OTHER PUBLICATIONS

Yugang Sun et al., Polyol Synthesis of Uniform Silver Nanowires: A Plausible Growth Mechanism and the Supporting Evidence, Nano Letters, 2003, pp. 955-960, vol. 3, Issue 7.

Yugang Sun et al., Uniform Silver Nanowires Synthesis by Reducing AgNO3 with Ethylene Glycol in the Presence of Seeds and Poly(Vinyl Pyrrolidone), Chem. Mater., 2002, pp. 4736-4745, vol. 14, Issue 11.

Oct. 2, 2018, International Preliminary Report on Patentability issued in the International Patent Application No. PCT/JP2017/012322.

Oct. 23, 2019, the Extended European Search Report issued by the European Patent Office in the corresponding European Patent Application No. 17774897.7.

* cited by examiner

OPTICALLY ANISOTROPIC LAMINATE, CIRCULARLY POLARIZING PLATE, AND IMAGE DISPLAY DEVICE

FIELD

The present invention relates to an optically anisotropic layered body, and a circularly polarizing plate and an image display device that include the optically anisotropic layered body.

BACKGROUND

An image display device such as a liquid crystal display device and an organic electroluminescent display (hereinafter sometimes referred to as "organic EL display device" as appropriate) usually includes an optically anisotropic film as an optical film. For such an optical film, various studies have been made in prior art (see Patent Literatures 1 to 7).

CITATION LIST

Patent Literature

Patent Literature 1: Japanese Patent Application Laid-Open No. 2014-071209 A
Patent Literature 2: Japanese Patent Application Laid-Open No. 2014-123099 A
Patent Literature 3: Japanese Patent Application Laid-Open No. 2011-138144 A
Patent Literature 4: Japanese Patent Application Laid-Open No. 2015-040904 A
Patent Literature 5: Japanese Patent Application Laid-Open No. 2015-079230 A
Patent Literature 6: Japanese Patent Application Laid-Open No. 2007-328310 A
Patent Literature 7: Japanese Patent Application Laid-Open No. 2005-326818 A

SUMMARY

Technical Problem

An image of an image display device may be displayed with linearly polarized light. For example, a liquid crystal display device includes a liquid crystal cell and a linear polarizer. Therefore, an image of the liquid crystal display device may be displayed with linearly polarized light having passed through the linear polarizer. For example, an organic EL display device includes a circularly polarizing plate for suppressing reflection of external light on a display surface thereof. In this case, an image of the organic EL display device including such a circularly polarizing plate may be displayed with linearly polarized light having passed through a linear polarizer of the circularly polarizing plate.

When an image displayed with linearly polarized light as described above is viewed through polarized sunglasses, the image may be dark and may not be visually recognized in some cases. Specifically, when a vibration direction of linearly polarized light used in displaying the image is parallel to a polarized light absorption axis of the polarized sunglasses, the linearly polarized light cannot pass through the polarized sunglasses. Therefore, the image cannot be visually recognized. Herein, the vibration direction of the linearly polarized light means a vibration direction of the electric field of the linearly polarized light.

In order to render the image visually recognizable, the present inventor attempted to provide an optically anisotropic film capable of functioning as a $\lambda/4$ wave plate on a visual recognition side of a linear polarizer of an image display device. Linearly polarized light having passed through the linear polarizer is converted into circularly polarized light by the optically anisotropic film. A part of the circularly polarized light can pass through polarized sunglasses. Therefore, the image can be visually recognized through polarized sunglasses.

As to the image display device including the optically anisotropic film on the visual recognition side of the linear polarizer, when a display surface of the image display device is viewed in a front direction through polarized sunglasses, coloring of an image may occur according to a slant angle of the polarized sunglasses. Herein, the slant angle of polarized sunglasses is an angle of slant in a rotation direction about a rotation axis perpendicular to the display surface. The slant angle may be represented by an angle of a polarized light absorption axis of a linear polarizer of polarized sunglasses relative to a polarized light absorption axis of the linear polarizer provided in the image display device.

According to investigation by the present inventor, the present inventor has considered that the coloring is caused by a prior-art optically anisotropic film of which the in-plane retardation has forward wavelength dispersion. Herein, the forward wavelength dispersion of an in-plane retardation means a property in which the in-plane retardation becomes smaller as the wavelength is longer. For example, the in-plane retardation of a stretched film obtained by stretching a resin film generally has forward wavelength dispersion. When such a stretched film having in-plane retardation with forward wavelength dispersion is used as an optically anisotropic film, linearly polarized light having passed through the optically anisotropic film may not be converted into ideal circularly polarized light but converted into deformed circularly polarized light (elliptically polarized light) depending on the wavelength of the linearly polarized light. Therefore, the strength of light capable of passing through the linear polarizer of polarized sunglasses varies at each wavelength depending on the slant angle of the polarized sunglasses. Thus, an image may be colored unintentionally according to the slant angle of the polarized sunglasses.

It is known that a broadband $\lambda/4$ wave plate capable of functioning as a $\lambda/4$ wave plate in a wide wavelength range is obtained by combining a $\lambda/2$ wave plate and a $\lambda/4$ wave plate that have an in-plane retardation with forward wavelength dispersion. In order to suppress the aforementioned coloring, the present inventor attempted to apply such a broadband $\lambda/4$ wave plate to the optically anisotropic film. However, even when the broadband $\lambda/4$ wave plate is used, uniform conversion of linearly polarized light as to light in the entire visible wavelength region into ideal circularly polarized light is difficult. Therefore, it is difficult to sufficiently suppress coloring of a display surface depending on the slant angle of the polarized sunglasses.

The present invention has been made in view of the problems. An object of the present invention is to provide an optically anisotropic layered body capable of suppressing coloring of a display surface depending on a slant angle of polarized sunglasses when the display surface is viewed in a front direction of an image display device through polarized sunglasses; and a circularly polarizing plate and an image display device that include the optically anisotropic layered body.

Solution to Problem

The present inventor has intensively studied to solve the aforementioned problems. As a result, the inventor has found that when, in an optically anisotropic layered body including a first optically anisotropic layer and a second optically anisotropic layer, the in-plane retardations Re(H450), Re(H550), Re(H590), and Re(H650) of the first optically anisotropic layer at wavelengths of 450 nm, 550 nm, 590 nm, and 650 nm, respectively, and the in-plane retardations Re(Q450), Re(Q550), Re(Q590), and Re(Q650) of the second optically anisotropic layer at wavelengths of 450 nm, 550 nm, 590 nm, and 650 nm, respectively, satisfy specific requirements, the aforementioned problems can be solved. Thus, the present invention has been completed.

That is, the present invention is as follows:

<1> An optically anisotropic layered body comprising a first optically anisotropic layer and a second optically anisotropic layer, wherein in-plane retardations Re(H450), Re(H550), Re(H590), and Re(H650) of the first optically anisotropic layer at wavelengths of 450 nm, 550 nm, 590 nm, and 650 nm, respectively, satisfy the following expressions (1), (2), and (3), and in-plane retardations Re(Q450), Re(Q550), Re(Q590), and Re(Q650) of the second optically anisotropic layer at wavelengths of 450 nm, 550 nm, 590 nm, and 650 nm, respectively, satisfy the following expressions (4), (5), and (6), $$242 \text{ nm} < Re(H590) < 331 \text{ nm} \quad (1),$$

$$0.75 \leq Re(H450)/Re(H550) \leq 0.85 \quad (2),$$

$$1.04 \leq Re(H650)/Re(H550) \leq 1.20 \quad (3),$$

$$121 \text{ nm} < Re(Q590) < 166 \text{ nm} \quad (4),$$

$$0.75 \leq Re(Q450)/Re(Q550) \leq 0.85 \quad (5), \text{ and}$$

$$1.04 \leq Re(Q650)/Re(Q550) \leq 1.20 \quad (6).$$

<2> An optically anisotropic layered body comprising a first optically anisotropic layer and a second optically anisotropic layer, wherein in-plane retardations Re(H450), Re(H550), Re(H590), and Re(H650) of the first optically anisotropic layer at wavelengths of 450 nm, 550 nm, 590 nm, and 650 nm, respectively, satisfy the following expressions (7), (8), and (9), and in-plane retardations Re(Q450), Re(Q550), Re(Q590), and Re(Q650) of the second optically anisotropic layer at wavelengths of 450 nm, 550 nm, 590 nm, and 650 nm, respectively, satisfy the following expressions (10), (11), and (12), $$236 \text{ nm} < Re(H590) < 316 \text{ nm} \quad (7),$$

$$0.85 < Re(H450)/Re(H550) \leq 0.90 \quad (8),$$

$$1.02 \leq Re(H650)/Re(H550) < 1.04 \quad (9),$$

$$118 \text{ nm} < Re(Q590) < 158 \text{ nm} \quad (10),$$

$$0.85 < Re(Q450)/Re(Q550) \leq 0.90 \quad (11), \text{ and}$$

$$1.02 \leq Re(Q650)/Re(Q550) < 1.04 \quad (12).$$

<3> An optically anisotropic layered body comprising a first optically anisotropic layer and a second optically anisotropic layer, wherein in-plane retardations Re(H450), Re(H550), Re(H590), and Re(H650) of the first optically anisotropic layer at wavelengths of 450 nm, 550 nm, 590 nm, and 650 nm, respectively, satisfy the following expressions (13), (14), and (15), and in-plane retardations Re(Q450), Re(Q550), Re(Q590), and Re(Q650) of the second optically anisotropic layer at wavelengths of 450 nm, 550 nm, 590 nm, and 650 nm, respectively, satisfy the following expressions (16), (17), and (18), $$240 \text{ nm} < Re(H590) < 290 \text{ nm} \quad (13),$$

$$0.90 < Re(H450)/Re(H550) \leq 0.99 \quad (14),$$

$$1.01 \leq Re(H650)/Re(H550) < 1.20 \quad (15),$$

$$120 \text{ nm} < Re(Q590) < 148 \text{ nm} \quad (16),$$

$$0.90 < Re(Q450)/Re(Q550) \leq 0.99 \quad (17), \text{ and}$$

$$1.01 \leq Re(Q650)/Re(Q550) < 1.02 \quad (18).$$

<4> The optically anisotropic layered body according to <1>, wherein the in-plane retardation Re(H590) of the first optically anisotropic layer at the wavelength of 590 nm satisfies the following expression (19), and the in-plane retardation Re(Q590) of the second optically anisotropic layer at the wavelength of 590 nm satisfies the following expression (20), $$266 \text{ nm} < Re(H590) < 314 \text{ nm} \quad (19), \text{ and}$$

$$133 \text{ nm} < Re(Q590) < 157 \text{ nm} \quad (20).$$

<5> The optically anisotropic layered body according to <2>, wherein the in-plane retardation Re(H590) of the first optically anisotropic layer at the wavelength of 590 nm satisfies the following expression (21), and the in-plane retardation Re(Q590) of the second optically anisotropic layer at the wavelength of 590 nm satisfies the following expression (22), $$260 \text{ nm} < Re(H590) < 291 \text{ nm} \quad (21), \text{ and}$$

$$130 \text{ nm} < Re(Q590) < 145 \text{ nm} \quad (22).$$

<6> The optically anisotropic layered body according to <1> or <4>, wherein the in-plane retardation Re(H590) of the first optically anisotropic layer at the wavelength of 590 nm satisfies the following expression (23), and the in-plane retardation Re(Q590) of the second optically anisotropic layer at the wavelength of 590 nm satisfies the following expression (24), $$274 \text{ nm} < Re(H590) < 299 \text{ nm} \quad (23), \text{ and}$$

$$137 \text{ nm} < Re(Q590) < 150 \text{ nm} \quad (24).$$

<7> The optically anisotropic layered body according to <2> or <5>, wherein the in-plane retardation Re(H590) of the first optically anisotropic layer at the wavelength of 590 nm satisfies the following expression (25), and the in-plane retardation Re(Q590) of the second optically anisotropic layer at the wavelength of 590 nm satisfies the following expression (26), 271 nm<Re(H590)<291 nm    (25), and 135 nm<Re(Q590)<145 nm    (26).

<8> The optically anisotropic layered body according to any one of <1> to <7>, wherein an angle formed between a slow axis direction which gives a maximum refractive index in a plane of the first optically anisotropic layer and a slow axis direction which gives a maximum refractive index in a plane of the second optically anisotropic layer is 60°±10°.

<9> The optically anisotropic layered body according to any one of <1> to <8>, wherein at least one of the first optically anisotropic layer and the second optically anisotropic layer is formed of a cured product of a liquid crystal composition containing a polymerizable liquid crystal compound.

<10> The optically anisotropic layered body according to any one of <1> to <9>, wherein both the first optically anisotropic layer and the second optically anisotropic layer are formed of a cured product of a liquid crystal composition containing a polymerizable liquid crystal compound.

<11> The optically anisotropic layered body according to <9> or <10>, wherein the liquid crystal compound is a liquid crystal compound that expresses an in-plane retardation with reverse wavelength dispersion when it is homogeneously oriented.

<12> The optically anisotropic layered body according to any one of <9> to <11>, wherein the liquid crystal compound contains a main chain mesogen and a side chain mesogen bonded to the main chain mesogen in a molecule of the liquid crystal compound.

<13> The optically anisotropic layered body according to any one of <9> to <12>, wherein the liquid crystal compound is represented by the following formula (I):

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring, wherein R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; R$^4$ is an alkyl group of 1 to 20 carbon atoms, an alkenyl group of 2 to 20 carbon atoms, a phenyl group, or a 4-methylphenyl group; R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A^x$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

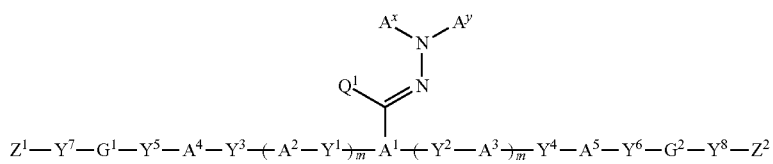

(in the Formula (I), $Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;

$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; with a proviso that cases where two or more of each of —O— or —S— groups are adjacently inserted are excluded, wherein R$^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$Q^1$ is a hydrogen atom or an alkyl group of 1 to 6 carbon atoms optionally having a substituent; and m is each independently 0 or 1).

<14> The optically anisotropic layered body according to any one of <9> to <13>, wherein the liquid crystal compound contains at least one type selected from the group consisting of a benzothiazole ring, and a combination of a cyclohexyl ring and a phenyl ring, in a molecule of the liquid crystal compound.

<15> The optically anisotropic layered body according to any one of <1> to <14>, comprising a transparent electro-conductive layer.

<16> A circularly polarizing plate comprising a linear polarizer, and the optically anisotropic layered body according to any one of <1> to <15>, wherein the circularly polarizing plate comprises the linear polarizer, the first optically anisotropic layer, and the second optically anisotropic layer in this order.

<17> The circularly polarizing plate according to <16>, wherein an angle θ1 (−90°<θ1<90°) formed between an absorption axis direction of the linear polarizer and a slow axis direction which gives a maximum refractive index in a plane of the first optically anisotropic layer, and an angle θ2 (−90°<θ2<90°) formed between the absorption axis direction of the linear polarizer and a slow axis direction which gives a maximum refractive index in a plane of the second optically anisotropic layer have the same sign, and satisfy the following expressions (27) and (28):

$$|θ1|=15°±5° \quad (27),\text{ and}$$

$$|θ2|=75°±10° \quad (28).$$

<18> The circularly polarizing plate according to <16>, wherein an angle θ1 (−90°<θ1<90°) formed between an absorption axis direction of the linear polarizer and a slow axis direction which gives a maximum refractive index in a plane of the first optically anisotropic layer, and an angle θ2 (−90°<θ2<90°) formed between the absorption axis direction of the linear polarizer and a slow axis direction which gives a maximum refractive index in a plane of the second optically anisotropic layer have the same sign, and satisfy the following expressions (29) and (30):

$$|θ1|=75°±10° \quad (29),\text{ and}$$

$$|θ2|=15°±5° \quad (30).$$

<19> An image display device comprising the circularly polarizing plate according to any one of <16> to <18>, and an image display element, wherein the image display device comprises the optically anisotropic layered body, the linear polarizer, and the image display element in this order.

<20> An image display device being an organic electroluminescent display device comprising the circularly polarizing plate according to any one of <16> to <18>, and an organic electroluminescent element, wherein the image display device comprises the linear polarizer, the optically anisotropic layered body, and the organic electroluminescent element in this order.

Advantageous Effects of Invention

According to the present invention, there can be provided an optically anisotropic layered body capable of suppressing coloring of a display surface depending on a slant angle of polarized sunglasses when the display surface is viewed in a front direction of an image display device through polarized sunglasses; and a circularly polarizing plate and an image display device that include the optically anisotropic layered body.

DESCRIPTION OF EMBODIMENTS

Figure 1:
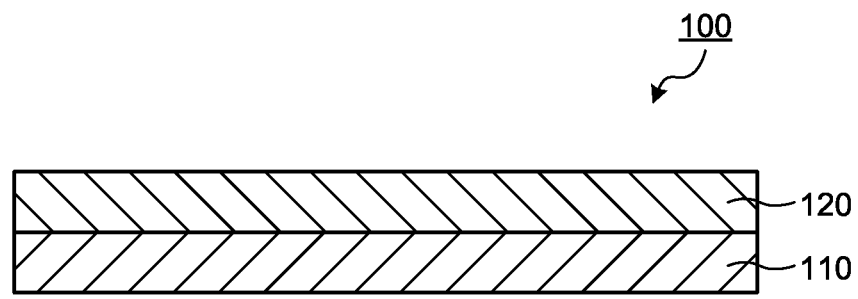
FIG. 1 is a cross-sectional view schematically illustrating a cross section of an optically anisotropic layered body as a first embodiment of the present invention.

Hereinafter, the present invention will be described in detail with reference to examples and embodiments. However, the present invention is not limited to the following examples and embodiments and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the long-length film is not particularly limited, and may be, for example, 100,000 times or less the width.

In the following description, an in-plane retardation of a certain layer represents a value represented by Re=(nx−ny)× d, unless otherwise specified. Herein, nx represents a refractive index in a direction that gives, among directions perpendicular to the thickness direction of the layer (in-plane directions), the maximum refractive index. ny represents a refractive index in a direction that is perpendicular to the direction of nx among the in-plane directions of the layer. d represents a thickness of the layer.

In the following description, a direction of a slow axis of a film refers to a direction of a slow axis in an in-plane direction, unless otherwise specified.

In the following description, a diagonal direction of a long-length film refers to an in-plane direction of the film that is not parallel nor perpendicular to the widthwise direction of the film.

In the following description, a front direction of a surface means a normal direction of the surface unless otherwise specified. The front direction specifically represents a direction of polar angle of 0° and azimuth angle of 0° of the surface.

In the following description, a direction of an element being "parallel", "perpendicular", and "orthogonal" may allow an error within the range of not impairing the advantageous effects of the present invention, for example, within a range of ±5°, unless otherwise specified.

In the following description, "substrate", "polarizing plate", "phase difference plate", "λ/2 wave plate", and "λ/4 wave plate" include not only a rigid member, but also a flexible member such as a resin film, unless otherwise specified.

In the following description, an angle formed between optical axes (polarized light absorption axis, polarized light transmission axis, slow axis, etc.) of layers in a member having a plurality of layers represents an angle as viewed in the thickness direction of the layers, unless otherwise specified.

In the following description, "(meth)acrylate" is a term encompassing "acrylate", "methacrylate" and a combination thereof, and "(meth)acryl-" is a term encompassing "acryl-", "methacryl-" and a combination thereof, unless otherwise specified.

In the following description, a resin having a positive intrinsic birefringence value means a resin of which the refractive index in a stretching direction becomes larger than the refractive index in a direction orthogonal to the stretching direction, unless otherwise specified. A resin having a negative intrinsic birefringence value means a resin of which the refractive index in the stretching direction becomes smaller than the refractive index in the direction orthogonal to the stretching direction, unless otherwise specified. The intrinsic birefringence value may be calculated from dielectric constant distribution.

[Summary of Optical Anisotropic Layered Body]

FIG. 1 is a cross-sectional view schematically illustrating a cross section of an optically anisotropic layered body 100 as a first embodiment of the present invention.

As illustrated in FIG. 1, the optically anisotropic layered body 100 includes a first optically anisotropic layer 110 and a second optically anisotropic layer 120. The first optically anisotropic layer 110 and the second optically anisotropic layer 120 have in-plane retardations satisfying specific requirements by any of the following first to third combinations. The optically anisotropic layered body 100 may include an optional layer (not illustrated) as necessary.

The materials for the first optically anisotropic layer 110 and the second optically anisotropic layer 120 are not particularly limited. However, it is preferable that at least one of the first optically anisotropic layer 110 and the second optically anisotropic layer 120 is formed of a cured product of a liquid crystal composition containing a polymerizable liquid crystal compound since the first optically anisotropic layer 110 and the second optically anisotropic layer 120 can be easily produced as a thin film. Furthermore, it is more preferable that both of the first optically anisotropic layer 110 and the second optically anisotropic layer 120 are formed of a cured product of a liquid crystal composition containing a polymerizable liquid crystal compound.

[2. First Combination of in-Plane Retardation of Optical Anisotropic Layer]

In the first combination, the in-plane retardation Re(H450) of the first optically anisotropic layer at a wavelength of 450 nm, the in-plane retardation Re(H550) of the first optically anisotropic layer at a wavelength of 550 nm, the in-plane retardation Re(H590) of the first optically anisotropic layer at a wavelength of 590 nm, the in-plane retardation Re(H650) of the first optically anisotropic layer at a wavelength of 650 nm, the in-plane retardation Re(Q450) of the second optically anisotropic layer at the wavelength of 450 nm, the in-plane retardation Re(Q550) of the second optically anisotropic layer at the wavelength of 550 nm, the in-plane retardation Re(Q590) of the second optically anisotropic layer at the wavelength of 590 nm, and the in-plane retardation Re(Q650) of the second optically anisotropic layer at the wavelength of 650 nm satisfy the following expressions (1) to (6):

242 nm<Re($H$590)<331 nm  (1), 0.75≤Re($H$450)/Re($H$550)≤0.85  (2), 1.04≤Re($H$650)/Re($H$550)≤1.20  (3), 121 nm<Re($Q$590)<166 nm  (4), 0.75≤Re($Q$450)/Re($Q$550)≤0.85  (5), and 1.04≤Re($Q$650)/Re($Q$550)≤1.20  (6).

When an optically anisotropic layered body including the first optically anisotropic layer having in-plane retardations satisfying the aforementioned expressions (1) to (3) and the second optically anisotropic layer having in-plane retardations satisfying the aforementioned expressions (4) to (6) in combination is provided to an image display device, coloring of a display surface of the image display device depending on a slant angle of polarized sunglasses when the display surface is viewed in a front direction thereof through the polarized sunglasses can be particularly effectively suppressed. When a circularly polarizing plate obtained by combining the optically anisotropic layer with a linear polarizer layer is provided to an organic EL display device, reflection of external light in a front direction of the organic EL display device can be usually suppressed.

The ratio Re(H450)/Re(H550) of the in-plane retardations of the first optically anisotropic layer relating to the expression (2) will be described in detail. The ratio Re(H450)/Re(H550) is usually 0.75 or more, preferably 0.77 or more, and more preferably 0.79 or more, and is usually 0.85 or less, preferably 0.83 or less, and more preferably 0.81 or less. When the ratio Re(H450)/Re(H550) falls within such a range, the aforementioned effects such as suppression of coloring of a display surface and suppression of reflection of external light are particularly effectively obtained.

The ratio Re(H650)/Re(H550) of the in-plane retardations of the first optically anisotropic layer relating to the expression (3) will be described in detail. The ratio Re(H650)/Re(H550) is usually 1.04 or more, and is usually 1.20 or less, preferably 1.10 or less, and more preferably 1.07 or less. When the ratio Re(H650)/Re(H550) falls within such a range, the aforementioned effects such as suppression of coloring of a display surface and suppression of reflection of external light are particularly effectively obtained.

The ratio Re(Q450)/Re(Q550) of the in-plane retardations of the second optically anisotropic layer relating to the expression (5) will be described in detail. The ratio Re(Q450)/Re(Q550) is usually 0.75 or more, preferably 0.77 or more, and more preferably 0.79 or more, and is usually 0.85 or less, preferably 0.83 or less, and more preferably 0.81 or less. When the ratio Re(Q450)/Re(Q550) falls within such a range, the aforementioned effects such as suppression of coloring of a display surface and suppression of reflection of external light are particularly effectively obtained.

The ratio Re(Q450)/Re(Q550) of the in-plane retardations of the second optically anisotropic layer is preferably close to the ratio Re(H450)/Re(H550) of the in-plane retardations of the first optically anisotropic layer, and more preferably the same as the ratio Re(H450)/Re(H550) of the in-plane retardations of the first optically anisotropic layer. By having such a feature, the aforementioned effects such as suppression of coloring of a display surface and suppression of reflection of external light are particularly effectively obtained.

The ratio Re(Q650)/Re(Q550) of the in-plane retardations of the second optically anisotropic layer relating to the expression (6) will be described in detail. The ratio Re(Q650)/Re(Q550) is usually 1.04 or more, and is usually 1.20 or less, preferably 1.10 or less, and more preferably 1.07 or less. When the ratio Re(Q650)/Re(Q550) falls within such a range, the aforementioned effects such as suppression of coloring of a display surface and suppression of reflection of external light are particularly effectively obtained.

The ratio Re(Q650)/Re(Q550) of the in-plane retardations of the second optically anisotropic layer is preferably close to the ratio Re(H650)/Re(H550) of the in-plane retardations of the first optically anisotropic layer, and more preferably the same as the ratio Re(H650)/Re(H550) of the in-plane retardations of the first optically anisotropic layer. By having such a feature, the aforementioned effects such as suppression of coloring of a display surface and suppression of reflection of external light are particularly effectively obtained.

In particular, from the viewpoint of effectively suppressing coloring of a display surface of the image display device when the display surface is viewed through polarized sunglasses, the in-plane retardation Re(H590) of the first optically anisotropic layer at the wavelength of 590 nm and the in-plane retardation Re(Q590) of the second optically anisotropic layer at the wavelength of 590 nm preferably satisfy the following expressions (19) and (20):

$$266 \text{ nm} < \text{Re}(H590) < 314 \text{ nm} \qquad (19), \text{ and}$$

$$133 \text{ nm} < \text{Re}(Q590) < 157 \text{ nm} \qquad (20).$$

The expression (19) will be described in detail. The in-plane retardation Re(H590) of the first optically anisotropic layer is preferably more than 266 nm, more preferably more than 274 nm, and particularly preferably more than 285 nm, and is preferably less than 314 nm, more preferably less than 307 nm, and particularly preferably less than 299 nm.

The expression (20) will be described in detail. The in-plane retardation Re(Q590) of the second optically anisotropic layer is preferably more than 133 nm, more preferably more than 137 nm, and particularly preferably more than 142 nm, and is preferably less than 157 nm, more preferably less than 153 nm, and particularly preferably less than 150 nm.

When the optically anisotropic layered body including the first optically anisotropic layer having the in-plane retardation Re(H590) satisfying the expression (19) and the second optically anisotropic layer having the in-plane retardation Re(Q590) satisfying the expression (20) in combination is provided to an image display device, coloring of a display surface of the image display device depending on a slant angle of polarized sunglasses when the display surface is viewed in a front direction thereof through the polarized sunglasses can be particularly effectively suppressed.

In particular, from the viewpoint of effectively suppressing reflection of external light by the circularly polarizing plate obtained by combining the optically anisotropic layer with a linear polarizer layer, the in-plane retardation Re(H590) of the first optically anisotropic layer at the wavelength of 590 nm and the in-plane retardation Re(Q590) of the second optically anisotropic layer at the wavelength of 590 nm preferably satisfy the following expressions (23) and (24):

$$274 \text{ nm} < \text{Re}(H590) < 299 \text{ nm} \qquad (23), \text{ and}$$

$$137 \text{ nm} < \text{Re}(Q590) < 150 \text{ nm} \qquad (24).$$

The expression (23) will be described in detail. The in-plane retardation Re(H590) of the first optically anisotropic layer is preferably more than 274 nm, more preferably more than 278 nm, and particularly preferably more than 285 nm, and is preferably less than 299 nm.

The expression (24) will be described in detail. The in-plane retardation Re(Q590) of the second optically anisotropic layer is preferably more than 137 nm, more preferably more than 139 nm, and particularly preferably more than 142 nm, and is preferably less than 150 nm.

When the optically anisotropic layered body including the first optically anisotropic layer having the in-plane retardation Re(H590) satisfying the expression (23) and the second optically anisotropic layer having the in-plane retardation Re(Q590) satisfying the expression (24) in combination is used together with a linear polarizer layer to obtain a circularly polarizing plate, reflection of external light in a front direction of an organic EL display device can be particularly effectively suppressed by such a circularly polarizing plate.

[3. Second Combination of in-Plane Retardation of Optical Anisotropic Layer]

In the second combination, the in-plane retardation Re(H450) of the first optically anisotropic layer at the wavelength of 450 nm, the in-plane retardation Re(H550) of the first optically anisotropic layer at the wavelength of 550 nm, the in-plane retardation Re(H590) of the first optically anisotropic layer at the wavelength of 590 nm, the in-plane retardation Re(H650) of the first optically anisotropic layer at the wavelength of 650 nm, the in-plane retardation Re(Q450) of the second optically anisotropic layer at the wavelength of 450 nm, the in-plane retardation Re(Q550) of the second optically anisotropic layer at the wavelength of 550 nm, the in-plane retardation Re(Q590) of the second optically anisotropic layer at the wavelength of 590 nm, and the in-plane retardation Re(Q650) of the second optically anisotropic layer at the wavelength of 650 nm satisfy the following expressions (7) to (12):

$$236 \text{ nm} < \text{Re}(H590) < 316 \text{ nm} \qquad (7),$$

$$0.85 < \text{Re}(H450)/\text{Re}(H550) \leq 0.90 \qquad (8),$$

$$1.02 \leq \text{Re}(H650)/\text{Re}(H550) < 1.04 \qquad (9),$$

$$118 \text{ nm} < \text{Re}(Q590) < 158 \text{ nm} \qquad (10),$$

$$0.85 < \text{Re}(Q450)/\text{Re}(Q550) \leq 0.90 \qquad (11), \text{ and}$$

$$1.02 \leq \text{Re}(Q650)/\text{Re}(Q550) < 1.04 \qquad (12).$$

When an optically anisotropic layered body including the first optically anisotropic layer having in-plane retardations satisfying the aforementioned expressions (7) to (9) and the second optically anisotropic layer having in-plane retardations satisfying the aforementioned expressions (10) to (12) in combination is provided to an image display device, coloring of a display surface of the image display device depending on a slant angle of polarized sunglasses when the display surface is viewed in a front direction thereof through the polarized sunglasses can be particularly effectively suppressed. When a circularly polarizing plate obtained by combining the optically anisotropic layer with a linear polarizer layer is provided to an organic EL display device, reflection of external light in a front direction of the organic EL display device can be usually suppressed.

The ratio Re(H450)/Re(H550) of the in-plane retardations of the first optically anisotropic layer relating to the expression (8) will be described in detail. The ratio Re(H450)/Re(H550) is usually more than 0.85, preferably more than 0.87, and more preferably more than 0.88, and is usually 0.90 or less. When the ratio Re(H450)/Re(H550) falls within such a range, the aforementioned effects such as suppression of coloring of a display surface and suppression of reflection of external light are particularly effectively obtained.

The ratio Re(H650)/Re(H550) of the in-plane retardations of the first optically anisotropic layer relating to the expression (9) will be described in detail. The ratio Re(H650)/Re(H550) is usually 1.02 or more, and is usually less than 1.04. When the ratio Re(H650)/Re(H550) falls within such a range, the aforementioned effects such as suppression of coloring of a display surface and suppression of reflection of external light are particularly effectively obtained.

The ratio Re(Q450)/Re(Q550) of the in-plane retardations of the second optically anisotropic layer relating to the expression (11) will be described in detail. The ratio Re(Q450)/Re(Q550) is usually more than 0.85, preferably more than 0.87, and more preferably more than 0.88, and is usually 0.90 or less. When the ratio Re(Q450)/Re(Q550) falls within such a range, the aforementioned effects such as suppression of coloring of a display surface and suppression of reflection of external light are particularly effectively obtained.

The ratio Re(Q450)/Re(Q550) of the in-plane retardations of the second optically anisotropic layer is preferably close to the ratio Re(H450)/Re(H550) of the in-plane retardations of the first optically anisotropic layer, and more preferably the same as the ratio Re(H450)/Re(H550) of the in-plane retardations of the first optically anisotropic layer. By having such a feature, the aforementioned effects such as suppression of coloring of a display surface and suppression of reflection of external light are particularly effectively obtained.

The ratio Re(Q650)/Re(Q550) of the in-plane retardations of the second optically anisotropic layer relating to the expression (12) will be described in detail. The ratio Re(Q650)/Re(Q550) is usually 1.02 or more, and is usually less than 1.04. When the ratio Re(Q650)/Re(Q550) falls within such a range, the aforementioned effects such as suppression of coloring of a display surface and suppression of reflection of external light are particularly effectively obtained.

The ratio Re(Q650)/Re(Q550) of the in-plane retardations of the second optically anisotropic layer is preferably close to the ratio Re(H650)/Re(H550) of the in-plane retardations of the first optically anisotropic layer, and more preferably the same as the ratio Re(H650)/Re(H550) of the in-plane retardations of the first optically anisotropic layer. By having such a feature, the aforementioned effects such as suppression of coloring of a display surface and suppression of reflection of external light are particularly effectively obtained.

In particular, from the viewpoint of effectively suppressing coloring of a display surface of the image display device when the display surface is viewed through polarized sunglasses, the in-plane retardation Re(H590) of the first optically anisotropic layer at the wavelength of 590 nm and the in-plane retardation Re(Q590) of the second optically anisotropic layer at the wavelength of 590 nm preferably satisfy the following expressions (21) and (22):

$$260 \text{ nm} < Re(H590) < 291 \text{ nm} \quad (21), \text{ and}$$

$$130 \text{ nm} < Re(Q590) < 145 \text{ nm} \quad (22).$$

The expression (21) will be described in detail. The in-plane retardation Re(H590) of the first optically anisotropic layer is preferably more than 260 nm, and more preferably more than 267 nm, and is preferably less than 291 nm, and more preferably less than 283 nm.

The expression (22) will be described in detail. The in-plane retardation Re(Q590) of the second optically anisotropic layer is preferably more than 130 nm, and more preferably more than 133 nm, and is preferably less than 145 nm, and more preferably less than 145 nm.

When the optically anisotropic layered body including the first optically anisotropic layer having the in-plane retardation Re(H590) satisfying the expression (21) and the second optically anisotropic layer having the in-plane retardation Re(Q590) satisfying the expression (22) in combination is provided to an image display device, coloring of a display surface of the image display device depending on a slant angle of polarized sunglasses when the display surface is viewed in a front direction thereof through the polarized sunglasses can be particularly effectively suppressed.

In particular, from the viewpoint of effectively suppressing reflection of external light by the circularly polarizing plate obtained by combining the optically anisotropic layer with a linear polarizer layer, the in-plane retardation Re(H590) of the first optically anisotropic layer at the wavelength of 590 nm and the in-plane retardation Re(Q590) of the second optically anisotropic layer at the wavelength of 590 nm preferably satisfy the following expressions (25) and (26):

$$271 \text{ nm} < Re(H590) < 291 \text{ nm} \quad (25), \text{ and}$$

$$135 \text{ nm} < Re(Q590) < 145 \text{ nm} \quad (26).$$

The expression (25) will be described in detail. The in-plane retardation Re(H590) of the first optically anisotropic layer is preferably more than 271 nm, more preferably more than 275 nm, and particularly preferably more than 279 nm, and is preferably less than 291 nm, and more preferably less than 287 nm.

The expression (26) will be described in detail. The in-plane retardation Re(Q590) of the second optically anisotropic layer is preferably more than 135 nm, more preferably more than 137 nm, and particularly preferably more than 139 nm, and is preferably less than 145 nm, and more preferably less than 143 nm.

When the optically anisotropic layered body including the first optically anisotropic layer having the in-plane retardation Re(H590) satisfying the expression (25) and the second optically anisotropic layer having the in-plane retardation Re(Q590) satisfying the expression (26) in combination is used together with a linear polarizer layer to obtain a circularly polarizing plate, reflection of external light in a front direction of an organic EL display device can be particularly effectively suppressed by such a circularly polarizing plate.

[4. Third Combination of in-Plane Retardation of Optical Anisotropic Layer]

In the third combination, the in-plane retardation Re(H450) of the first optically anisotropic layer at the wavelength of 450 nm, the in-plane retardation Re(H550) of the first optically anisotropic layer at the wavelength of 550 nm, the in-plane retardation Re(H590) of the first optically anisotropic layer at the wavelength of 590 nm, the in-plane retardation Re(H650) of the first optically anisotropic layer at the wavelength of 650 nm, the in-plane retardation Re(Q450) of the second optically anisotropic layer at the wavelength of 450 nm, the in-plane retardation Re(Q550) of the second optically anisotropic layer at the wavelength of 550 nm, the in-plane retardation Re(Q590) of the second optically anisotropic layer at the wavelength of 590 nm, and the in-plane retardation Re(Q650) of the second optically anisotropic layer at the wavelength of 650 nm satisfy the following expressions (13) to (18):

$$240 \text{ nm} < Re(H590) < 290 \text{ nm} \quad (13),$$

$$0.90 < Re(H450)/Re(H550) \leq 0.99 \quad (14),$$

$$1.01 \leq Re(H650)/Re(H550) < 1.02 \quad (15),$$

$$120 \text{ nm} < Re(Q590) < 148 \text{ nm} \quad (16),$$

$$0.90 < Re(Q450)/Re(Q550) \le 0.99 \quad (17), \text{ and}$$

$$1.01 \le Re(Q650)/Re(Q550) < 1.02 \quad (18).$$

When an optically anisotropic layered body including the first optically anisotropic layer having in-plane retardations satisfying the aforementioned expressions (13) to (15) and the second optically anisotropic layer having in-plane retardations satisfying the aforementioned expressions (16) to (18) in combination is provided to an image display device, coloring of a display surface of the image display device depending on a slant angle of polarized sunglasses when the display surface is viewed in a front direction thereof through the polarized sunglasses can be suppressed. When a circularly polarizing plate obtained by combining the optically anisotropic layer with a linear polarizer layer is provided to an organic EL display device, reflection of external light in a front direction of the organic EL display device can be suppressed.

The ratio Re(H450)/Re(H550) of the in-plane retardations of the first optically anisotropic layer relating to the expression (14) will be described in detail. The ratio Re(H450)/Re(H550) is usually more than 0.90, preferably more than 0.91, and more preferably more than 0.92, and is usually 0.99 or less, preferably 0.96 or less, and more preferably 0.94 or less. When the ratio Re(H450)/Re(H550) falls within such a range, the aforementioned effects such as suppression of coloring of a display surface and suppression of reflection of external light are particularly effectively obtained.

The ratio Re(H650)/Re(H550) of the in-plane retardations of the first optically anisotropic layer relating to the expression (15) will be described in detail. The ratio Re(H650)/Re(H550) is usually 1.01 or more, and is usually less than 1.02. When the ratio Re(H650)/Re(H550) falls within such a range, the aforementioned effects such as suppression of coloring of a display surface and suppression of reflection of external light are particularly effectively obtained.

The ratio Re(Q450)/Re(Q550) of the in-plane retardations of the second optically anisotropic layer relating to the expression (17) will be described in detail. The ratio Re(Q450)/Re(Q550) is usually more than 0.90, preferably more than 0.91, and more preferably more than 0.92, and is usually 0.99 or less, preferably 0.96 or less, and more preferably 0.94 or less. When the ratio Re(Q450)/Re(Q550) falls within such a range, the aforementioned effects such as suppression of coloring of a display surface and suppression of reflection of external light are particularly effectively obtained.

The ratio Re(Q450)/Re(Q550) of the in-plane retardations of the second optically anisotropic layer is preferably close to the ratio Re(H450)/Re(H550) of the in-plane retardations of the first optically anisotropic layer, and more preferably the same as the ratio Re(H450)/Re(H550) of the in-plane retardations of the first optically anisotropic layer. By having such a feature, the aforementioned effects such as suppression of coloring of a display surface and suppression of reflection of external light are particularly effectively obtained.

The ratio Re(Q650)/Re(Q550) of the in-plane retardations of the second optically anisotropic layer relating to the expression (18) will be described in detail. The ratio Re(Q650)/Re(Q550) is usually 1.01 or more, and is usually less than 1.02. When the ratio Re(Q650)/Re(Q550) falls within such a range, the aforementioned effects such as suppression of coloring of a display surface and suppression of reflection of external light are particularly effectively obtained.

The ratio Re(Q650)/Re(Q550) of the in-plane retardations of the second optically anisotropic layer is preferably close to the ratio Re(H650)/Re(H550) of the in-plane retardations of the first optically anisotropic layer, and more preferably the same as the ratio Re(H650)/Re(H550) of the in-plane retardations of the first optically anisotropic layer. By having such a feature, the aforementioned effects such as suppression of coloring of a display surface and suppression of reflection of external light are particularly effectively obtained.

In particular, from the viewpoint of effectively suppressing coloring of a display surface of the image display device when the display surface is viewed through polarized sunglasses, the in-plane retardation Re(H590) of the first optically anisotropic layer at the wavelength of 590 nm and the in-plane retardation Re(Q590) of the second optically anisotropic layer at the wavelength of 590 nm preferably fall within specific ranges.

Specifically, the in-plane retardation Re(H590) of the first optically anisotropic layer is preferably more than 248 nm, more preferably more than 255 nm, and particularly preferably more than 259 nm and is preferably less than 277 nm, more preferably less than 272 nm, and particularly preferably less than 268 nm.

The in-plane retardation Re(Q590) of the second optically anisotropic layer is preferably more than 124 nm, more preferably more than 127 nm, and particularly preferably more than 130 nm, and is preferably less than 138 nm, more preferably less than 136 nm, and particularly preferably less than 134 nm.

When the optically anisotropic layered body including the first optically anisotropic layer and the second optically anisotropic layer having the respective in-plane retardations Re(H590) and Re(Q590) falling within such ranges in combination is provided to an image display device, coloring of a display surface of the image display device depending on a slant angle of polarized sunglasses when the display surface is viewed in a front direction thereof through the polarized sunglasses can be particularly effectively suppressed.

In particular, from the viewpoint of effectively suppressing reflection of external light by the circularly polarizing plate obtained by combining the optically anisotropic layer with a linear polarizer layer, the in-plane retardation Re(H590) of the first optically anisotropic layer at the wavelength of 590 nm and the in-plane retardation Re(Q590) of the second optically anisotropic layer at the wavelength of 590 nm preferably fall within specific ranges.

Specifically, the in-plane retardation Re(H590) of the first optically anisotropic layer is preferably more than 268 nm, and more preferably more than 272 nm, and is preferably less than 286 nm, and more preferably less than 281 nm.

The in-plane retardation Re(Q590) of the second optically anisotropic layer is preferably more than 134 nm, and more preferably more than 136 nm, and is preferably less than 143 nm, and more preferably less than 141 nm.

When the optically anisotropic layered body including the first optically anisotropic layer and the second optically anisotropic layer having the respective in-plane retardations Re(H590) and Re(Q590) falling such ranges in combination is used together with a linear polarizer layer to obtain a circularly polarizing plate, reflection of external light in a front direction of an organic EL display device can be particularly effectively suppressed by such a circularly polarizing plate.

[5. Structure of First Optically Anisotropic Layer]

As the first optically anisotropic layer, a layer formed of a cured product of a liquid crystal composition containing a polymerizable liquid crystal compound may be used. Hereinafter, such a layer formed of a cured product of a liquid crystal composition containing a polymerizable liquid crystal compound may be referred to as "liquid crystal cured layer" as appropriate.

The liquid crystal compound is a compound that is capable of exhibiting a liquid crystal phase when the liquid crystal compound is mixed in the liquid crystal composition and oriented. The polymerizable liquid crystal compound is a liquid crystal compound that is capable of being polymerized in the liquid crystal composition with the liquid crystal phase exhibited, to form a polymer with the orientation of molecules in the liquid crystal phase being maintained.

The aforementioned liquid crystal cured layer usually contains cured liquid crystal molecules obtained from the liquid crystal compound. The "cured liquid crystal molecules" herein mean molecules of a solidified compound that is obtained by solidifying the compound while the state of exhibiting the liquid crystal phase is maintained, wherein the compound is capable of exhibiting a liquid crystal phase. The cured liquid crystal molecules contained in the liquid crystal cured layer is usually a polymer obtained by polymerizing the liquid crystal compound. Therefore, the liquid crystal cured layer is usually a layer of a resin that contains a polymer obtained by polymerizing the liquid crystal compound and, as necessary, may also contain an optional component. The liquid crystal cured layer has optical anisotropy in accordance with the orientation state of the cured liquid crystal molecules. The in-plane retardation of the liquid crystal cured layer can be adjusted according to the type and orientation state of the liquid crystal compound and the thickness of the liquid crystal cured layer. Therefore, the liquid crystal cured layer may have the aforementioned desired in-plane retardations.

The liquid crystal composition contains the polymerizable liquid crystal compound, and, as necessary, an optional component. As the liquid crystal compound, a liquid crystal compound that expresses an in-plane retardation with reverse wavelength dispersion when it is homogeneously oriented is preferably used. Hereinafter, such a polymerizable liquid crystal compound that expresses an in-plane retardation with reverse wavelength dispersion when it is homogeneous oriented may be referred to as "polymerizable liquid crystal compound with reverse wavelength dispersion" as appropriate.

Herein, the state in which the liquid crystal composition is homogeneously oriented refers to the state in which the layer containing the liquid crystal compound is formed and the long-axis directions of mesogens of molecules of the liquid crystal compound in this layer are oriented in a certain direction parallel to the surface of the layer. If the liquid crystal compound contains a plurality of types of mesogens in different orientation directions, the direction in which the longest mesogen among these is oriented is the orientation direction. Whether the liquid crystal compound is homogeneously oriented or not and the orientation direction thereof may be confirmed by measurement of the slow axis direction and measurement of retardation distribution of each incidence angle in the slow axis direction using a phase difference meter typified by AxoScan (manufactured by Axometrics, Inc.).

The state in which the in-plane retardation Re expresses reverse wavelength dispersion usually refers to the state in which the in-plane retardations Re(450), Re(550), and Re(650) at the wavelengths of 450 nm, 550 nm, and 650 nm satisfy Re(450)<Re(650), and preferably satisfy Re(450) <Re(550)<Re(650).

When a liquid crystal composition containing a polymerizable liquid crystal compound with reverse wavelength dispersion is used, the ratio Re(H450)/Re(H550) and the ratio Re(H650)/Re(H550) of the in-plane retardations of the first optically anisotropic layer can be easily adjusted within the aforementioned range.

As the polymerizable liquid crystal compound with reverse wavelength dispersion, for example, a compound having a main chain mesogen and a side chain mesogen bonded to the main chain mesogen in a molecule of the polymerizable liquid crystal compound with reverse wavelength dispersion may be used. While the polymerizable liquid crystal compound with reverse wavelength dispersion having the main chain mesogen and the side chain mesogen is oriented, the side chain mesogen may be oriented in a direction different from that of the main chain mesogen. In this case, the birefringence is expressed as a difference between the refractive index corresponding to the main chain mesogen and the refractive index corresponding to the side chain mesogen. Therefore, the polymerizable liquid crystal compound with reverse wavelength dispersion can express an in-plane retardation with reverse wavelength dispersion when it is homogeneously oriented.

Examples of the polymerizable liquid crystal compound with reverse wavelength dispersion may include those disclosed in Japanese Patent Application Laid-Open No. 2014-123134 A. Examples of the polymerizable liquid crystal compound with reverse wavelength dispersion may also include compounds represented by the following formula (Ia). In the following description, the compounds represented by the formula (Ia) may be appropriately referred to as the "compound (Ia)".

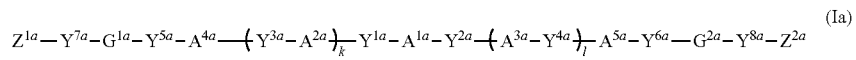

(Ia)

$$Z^{1a}-Y^{7a}-G^{1a}-Y^{5a}-A^{4a}-(Y^{3a}-A^{2a})_k-Y^{1a}-A^{1a}-Y^{2a}-(A^{3a}-Y^{4a})_l-A^{5a}-Y^{6a}-G^{2a}-Y^{8a}-Z^{2a}$$

In the formula (Ia) described above, $A^{1a}$ represents an aromatic hydrocarbon ring group having as a substituent an organic group of 1 to 67 carbon atoms that has at least one aromatic ring selected from the group consisting of an aromatic hydrocarbon ring and an aromatic heterocycle; or an aromatic heterocycle group having as a substituent an organic group of 1 to 67 carbon atoms that has at least one aromatic ring selected from the group consisting of an aromatic hydrocarbon ring and an aromatic heterocycle.

Specific examples of $A^{1a}$ may include a phenylene group substituted with a group represented by a formula: —$R^fC$(=N—NR$^g$R$^h$) or a formula: —$R^fC$(=N—N=R$^g$R$^h$); a benzothiazol-4,7-diyl group substituted with a 1-benzofuran-2-yl group; a benzothiazol-4,7-diyl group substituted with a 5-(2-butyl)-1-benzofuran-2-yl group; a benzothiazol-4,7-diyl group substituted with a 4,6-dimethyl-1-benzofuran-2-yl group; a benzothiazol-4,7-diyl group substituted with a 6-methyl-1-benzofuran-2-yl group; a benzothiazol-4, 7-diyl group substituted with a 4,6,7-trimethyl-1-benzofuran-2-yl group; a benzothiazol-4,7-diyl group substituted with a 4,5,6-trimethyl-1-benzofuran-2-yl group; a benzothiazol-4,7-diyl group substituted with a 5-methyl-1-benzofuran-2-yl group; a benzothiazol-4,7-diyl group substituted with a 5-propyl-1-benzofuran-2-yl group; a benzothiazol-4,7-diyl group substituted with a 7-propyl-1-benzofuran-2-yl group; a benzothiazol-4,7-diyl group substituted with a 5-fluoro-1-benzofuran-2-yl group; a benzothiazol-4,7-diyl group substituted with a phenyl group; a benzothiazol-4,7-diyl group substituted with a 4-fluorophenyl group; a benzothiazol-4,7-diyl group substituted with a 4-nitrophenyl group; a benzothiazol-4,7-diyl group substituted with a 4-trifluoromethylphenyl group; a benzothiazol-4,7-diyl group substituted with a 4-cyanophenyl group; a benzothiazol-4,7-diyl group substituted with a 4-methansulfonylphenyl group; a benzothiazol-4,7-diyl group substituted with a thiophen-2-yl group; a benzothiazol-4,7-diyl group substituted with a thiophen-3-yl group; a benzothiazol-4,7-diyl group substituted with a 5-methlthiophen-2-yl group; a benzothiazol-4,7-diyl group substituted with a 5-chlorothiophen-2-yl group; a benzothiazol-4,7-diyl group substituted with a thieno[3,2-b]thiophen-2-yl group; a benzothiazol-4,7-diyl group substituted with a 2-benzothiazoryl group; a benzothiazol-4,7-diyl group substituted with a 4-biphenyl group; a benzothiazol-4,7-diyl group substituted with a 4-propylbiphenyl group; a benzothiazol-4,7-diyl group substituted with a 4-thiazolyl group; a benzothiazol-4,7-diyl group substituted with a 1-phenylethylen-2-yl group; a benzothiazol-4,7-diyl group substituted with a 4-pyridyl group; a benzothiazol-4,7-diyl group substituted with a 2-furyl group; a benzothiazol-4,7-diyl group substituted with a naphtho[1,2-b]furan-2-yl group; a 1H-isoindole-1,3(2H)-dione-4,7-diyl group substituted with a 5-methoxy-2-benzothiazolyl group; a 1H-isoindole-1,3(2H)-dione-4,7-diyl group substituted with a phenyl group; a 1H-isoindole-1,3(2H)-dione-4,7-diyl group substituted with a 4-nitrophenyl group; and a 1H-isoindole-1,3(2H)-dione-4,7-diyl group substituted with a 2-thiazolyl group. Herein, $R^f$ and $R^{f1}$ are each independently represent the same meaning as that of $Q^1$ described later. $R^g$ represents the same meaning as that of $A^y$ described later. $R^h$ represents the same meaning as that of $A^x$ described later.

In the aforementioned formula (Ia), $Y^{1a}$ to $Y^{8a}$ each independently represent a chemical single bond, —O—, —S—, —O—C(=O)—, —C(=O)—O—, —O—C(=O)—O—, NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—. Herein, $R^1$ represents a hydrogen atom or an alkyl group of 1 to 6 carbon atoms.

In the aforementioned formula (Ia), $G^{1a}$ and $G^{2a}$ each independently represent a divalent aliphatic group of 1 to 20 carbon atoms optionally having a substituent. In the aliphatic group, one or more of —O—, —S—, —O—C(=O)—, —C(=O)—O—, —O—C(=O)—O—, —NR$^2$—C(=O)—, —C(=O)—NR$^2$—, —NR$^2$—, or —C(=O)— may be interposed per one aliphatic group, with a proviso that cases where 2 or more of —O— or —S— are adjacently interposed therein are excluded. Herein, $R^2$ represents a hydrogen atom or an alkyl group of 1 to 6 carbon atoms.

In the aforementioned formula (Ia), $Z^{1a}$ and $Z^{2a}$ each independently represent an alkenyl group of 2 to 20 carbon atoms optionally substituted with a halogen atom.

In the aforementioned formula (Ia), $A^{2a}$ and $A^{3a}$ each independently represent a divalent alicyclic hydrocarbon group of 3 to 30 carbon atoms optionally having a substituent.

In the aforementioned formula (Ia), $A^{4a}$ and $A^{5a}$ each independently represent a divalent aromatic group of 6 to 30 carbon atoms optionally having a substituent.

In the aforementioned formula (Ia), k and l each independently represent 0 or 1.

Specific examples of particularly preferable polymerizable liquid crystal compounds with reverse wavelength dispersion may include a compound represented by the following formula (I). In the following description, the compound represented by the formula (I) may be appropriately referred to as "compound (I)".

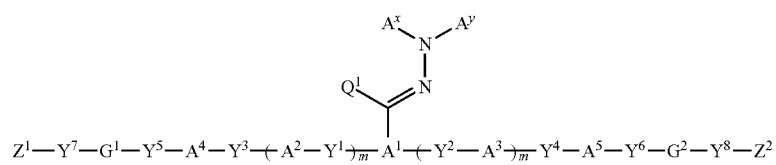

(I)

As shown in the following formula, the compound (I) usually includes two mesogen skeletons including a main chain mesogen 1a composed of a group —Y$^5$-A$^4$-(Y$^3$-A$^2$)$_n$-Y$^1$-A$^1$-Y$^2$-(A$^3$-Y$^4$)$_m$-A$^5$-Y$^6$— and a side chain mesogen 1b composed of a group >A$^1$-C(Q$^1$)=N—N(A$^x$)A$^y$. The main chain mesogen 1a and the side chain mesogen 1b cross each other. The aforementioned main chain mesogen 1a and side chain mesogen 1b may be collectively regarded as one mesogen, but in the present invention, are described as two separate mesogens.

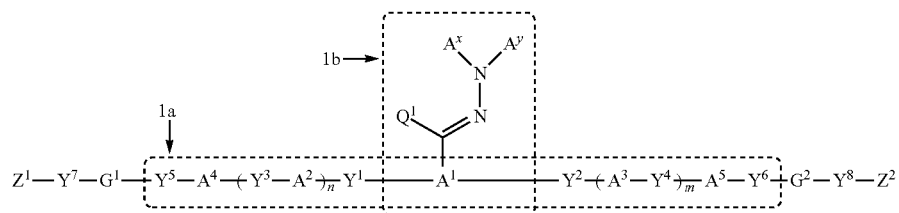

The refractive index of the main chain mesogen 1a in the long-axis direction is denoted by n1, and the refractive index of the side chain mesogen 1b in the long-axis direction is denoted by n2. In this case, the absolute value and wavelength dispersion of the refractive index n1 usually depend on the molecular structure of the main chain mesogen 1a. The absolute value and wavelength dispersion of the refractive index n2 usually depend on the molecular structure of the side chain mesogen 1b. Herein, the polymerizable liquid crystal compound with reverse wavelength dispersion is usually subjected to rotational motion around the long-axis direction of the main chain mesogen 1a as a rotational axis in the liquid crystal phase. Therefore, the refractive indices n1 and n2 herein represent the refractive indices of the rotating bodies.

Due to the molecular structures of the main chain mesogen 1a and the side chain mesogen 1b, the absolute value of the refractive index n1 is larger than the absolute value of the refractive index n2. Further, the refractive indices n1 and n2 usually exhibit forward wavelength dispersion. A refractive index with forward wavelength dispersion herein means a refractive index of which the absolute value becomes smaller as the measurement wavelength is longer. The refractive index n1 of the main chain mesogen 1a exhibits small forward wavelength dispersion. Therefore, although the refractive index n1 measured at a long wavelength is smaller than the refractive index n1 measured at a short wavelength, the difference thereof is small. In contrast, the refractive index n2 of the side chain mesogen 1b exhibits large forward wavelength dispersion. Therefore, the refractive index n2 measured at a long wavelength is smaller than the refractive index n2 measured at a short wavelength, and the difference thereof is large. Consequently, the difference Δn between the refractive index n1 and the refractive index n2 is small at the short measurement wavelength, and the difference Δn between the refractive index n1 and the refractive index n2 is large at the long measurement wavelength. Accordingly, when a homogeneous orientation is given, the compound (I) can express an in-plane retardation with inverse wavelength dispersion on the basis of the main chain mesogen 1a and the side chain mesogen 1b.

In the formula (I) mentioned above, $Y^1$ to $Y^8$ are each independently a chemical single bond, —O—, —S—, —O—C(=O)—, —C(=O)—O—, —O—C(=O)—O—, —$NR^1$—C(=O)—, —C(=O)—$NR^1$—, —O—C(=O)—$NR^1$—, —$NR^1$—C(=O)—O—, —$NR^1$—C(=O)—$NR^1$—, —O—$NR^1$—, or —$NR^1$—O—.

Herein, $R^1$ is a hydrogen atom or an alkyl group of 1 to 6 carbon atoms.

Examples of the alkyl group of 1 to 6 carbon atoms of $R^1$ may include a methyl group, an ethyl group, a n-propyl group, an isopropyl group, a n-butyl group, a sec-butyl group, a t-butyl group, a n-pentyl group, and a n-hexyl group.

It is preferable that $R^1$ is a hydrogen atom or an alkyl group of 1 to 4 carbon atoms.

In the compound (I), it is preferable that $Y^1$ to $Y^8$ are each independently a chemical single bond, —O—, —O—C(=O)—, —C(=O)—O—, or —O—C(=O)—O—.

In the formula (I) mentioned above, $G^1$ and $G^2$ are each independently a divalent aliphatic group of 1 to 20 carbon atoms optionally having a substituent.

Examples of the divalent aliphatic group of 1 to 20 carbon atoms may include a divalent aliphatic group having a linear structure, such as an alkylene group of 1 to 20 carbon atoms and an alkenylene group of 2 to 20 carbon atoms; and a divalent aliphatic group, such as a cycloalkanediyl group of 3 to 20 carbon atoms, a cycloalkenediyl group of 4 to 20 carbon atoms, and a divalent alicyclic fused ring group of 10 to 30 carbon atoms.

Examples of the substituent in the divalent aliphatic group of $G^1$ and $G^2$ may include a halogen atom, such as a fluorine atom, a chlorine atom, a bromine atom, and an iodine atom; and an alkoxy group of 1 to 6 carbon atoms, such as a methoxy group, an ethoxy group, a n-propoxy group, an isopropoxy group, a n-butoxy group, a sec-butoxy group, a t-butoxy group, a n-pentyloxy group, and a n-hexyloxy group. Among these, a fluorine atom, a methoxy group, and an ethoxy group are preferable.

The aforementioned aliphatic groups may have one or more per one aliphatic group of —O—, —S—, —O—C(=O)—, —C(=O)—O—, —O—C(=O)—O—, —$NR^2$—C(=O)—, —C(=O)—$NR^2$—, —$NR^2$—, or —C(=O)— inserted therein. However, cases where two or more —O— or —S— are adjacently inserted are excluded. Herein, $R^2$ is a hydrogen atom or an alkyl group of 1 to 6 carbon atoms. It is preferable that $R^2$ is a hydrogen atom or a methyl group.

It is preferable that the group inserted into the aliphatic groups is —O—, —O—C(=O)—, —C(=O)—O—, or —C(=O)—.

Specific examples of the aliphatic groups into which the group is inserted may include —$CH_2$—$CH_2$—O—$CH_2$—$CH_2$—, —$CH_2$—$CH_2$—S—$CH_2$—$CH_2$—, —$CH_2$—$CH_2$—O—C(=O)—$CH_2$—$CH_2$—, —$CH_2$—$CH_2$—C(=O)—O—$CH_2$—$CH_2$—, —$CH_2$—$CH_2$—C(=O)—O—$CH_2$—, —$CH_2$—O—C(=O)—O—$CH_2$—$CH_2$—, —$CH_2$—$CH_2$—$NR^2$—C(=O)—$CH_2$—$CH_2$—, —$CH_2$—$CH_2$—C(=O)—$NR^2$—$CH_2$—, —$CH_2$—$NR^2$—$CH_2$—$CH_2$—, and —$CH_2$—C(=O)—$CH_2$—.

Among these, from the viewpoint of more favorably expressing the desired effect of the present invention, $G^1$ and $G^2$ are each independently preferably a divalent aliphatic group having a linear structure, such as an alkylene group of 1 to 20 carbon atoms and an alkenylene group of 2 to 20 carbon atoms, more preferably an alkylene group of 1 to 12 carbon atoms, such as a methylene group, an ethylene group, a trimethylene group, a propylene group, a tetramethylene group, a pentamethylene group, a hexamethylene group, an octamethylene group, and a decamethylene group [—$(CH_2)_{10}$—], and particularly preferably a tetramethylene group [—$(CH_2)_4$—], a hexamethylene group [—$(CH_2)_6$—], an octamethylene group [—$(CH_2)_8$—], or a decamethylene group [—$(CH_2)_{10}$—].

In the formula (I) mentioned above, $Z^1$ and $Z^2$ are each independently an alkenyl group of 2 to 10 carbon atoms that may be substituted by a halogen atom.

It is preferable that the number of carbon atoms in the alkenyl group is 2 to 6. Examples of the halogen atom that is a substituent in the alkenyl group of $Z^1$ and $Z^2$ may include a fluorine atom, a chlorine atom, and a bromine atom. A chlorine atom is preferable.

Specific examples of the alkenyl group of 2 to 10 carbon atoms of $Z^1$ and $Z^2$ may include $CH_2$=CH—, $CH_2$=C($CH_3$)—, $CH_2$=CH—$CH_2$—, $CH_3$—CH=CH—, $CH_2$=CH—$CH_2$—$CH_2$—, $CH_2$=C($CH_3$)—$CH_2$—$CH_2$—, $(CH_3)_2$C=CH—$CH_2$—, $(CH_3)_2$C=CH—$CH_2$—$CH_2$—, $CH_2$=C(Cl)—, $CH_2$=C($CH_3$)—$CH_2$—, and $CH_3$—CH=CH—$CH_2$—.

Among these, from the viewpoint of favorably expressing the desired effect of the present invention, $Z^1$ and $Z^2$ are each independently preferably $CH_2$=CH—, $CH_2$=C($CH_3$)—, $CH_2$=C(Cl)—, $CH_2$=CH—$CH_2$—, $CH_2$=C($CH_3$)—$CH_2$—, or $CH_2$=C($CH_3$)—$CH_2$—$CH_2$—, more preferably $CH_2=CH-$, $CH_2=C(CH_3)-$ or $CH_2=C(Cl)-$, and particularly preferably $CH_2=CH-$.

In the formula (I) mentioned above, $A^x$ is an organic group of 2 to 30 carbon atoms having at least one aromatic ring selected from the group consisting of an aromatic hydrocarbon ring and an aromatic heterocyclic ring. The "aromatic ring" means a cyclic structure having aromaticity in the broad sense based on Huckel rule, that is, a cyclic conjugated structure having (4n+2) π electrons, and a cyclic structure that exhibits aromaticity by involving a lone electron pair of electrons of a heteroatom, such as sulfur, oxygen, and nitrogen, in a π electron system, typified by thiophene, furan, and benzothiazole.

The organic group of 2 to 30 carbon atoms having at least one aromatic ring selected from the group consisting of an aromatic hydrocarbon ring and an aromatic heterocyclic ring, of $A^x$, may have a plurality of aromatic rings, or have both an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring, such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a fused aromatic heterocyclic ring, such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring of $A^x$ may have a substituent. Examples of the substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; $-C(=O)-R^5$; $-C(=O)-OR^5$; and $-SO_2R^6$. Herein, $R^5$ is an alkyl group of 1 to 20 carbon atoms, an alkenyl group of 2 to 20 carbon atoms, or a cycloalkyl group of 3 to 12 carbon atoms. $R^6$ is an alkyl group of 1 to 20 carbon atoms, an alkenyl group of 2 to 20 carbon atoms, a phenyl group, or a 4-methylphenyl group, which are the same as those for $R^4$ which will be described later.

The aromatic ring of $A^x$ may have a plurality of substituents that may be the same or different, and two adjacent substituents may be bonded together to form a ring. The formed ring may be a monocycle or a fused polycycle, and may be an unsaturated ring or a saturated ring.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

Examples of the organic group of 2 to 30 carbon atoms having at least one aromatic ring selected from the group consisting of an aromatic hydrocarbon ring and an aromatic heterocyclic ring, of $A^x$, may include an aromatic hydrocarbon ring group such as a benzene ring group, a naphthalene ring group, and an anthracene ring group; an aromatic heterocyclic ring group such as a pyrrole ring group, a furan ring group, a thiophene ring group, a pyridine ring group, a pyridazine ring group, a pyrimidine ring group, a pyrazine ring group, a pyrazole ring group, an imidazole ring group, an oxazole ring group, a thiazole ring group, a benzothiazole ring group, a benzoxazole ring group, a quinoline ring group, a phthalazine ring group, a benzimidazole ring group, a benzopyrazole ring group, a benzofuran ring group, a benzothiophene ring group, a thiazolopyridine ring group, an oxazolopyridine ring group, a thiazolopyrazine ring group, an oxazolopyrazine ring group, a thiazolopyridazine ring group, an oxazolopyridazine ring group, a thiazolopyrimidine ring group, and an oxazolopyrimidine ring group; a group containing a combination of an aromatic hydrocarbon ring and a heterocyclic ring; an alkyl group of 3 to 30 carbon atoms having at least one aromatic ring selected from the group consisting of an aromatic hydrocarbon ring and an aromatic heterocyclic ring; an alkenyl group of 4 to 30 carbon atoms having at least one aromatic ring selected from the group consisting of an aromatic hydrocarbon ring and an aromatic heterocyclic ring; and an alkynyl group of 4 to 30 carbon atoms having at least one aromatic ring selected from the group consisting of an aromatic hydrocarbon ring and an aromatic heterocyclic ring.

Preferable specific examples of $A^x$ are as follows. However, $A^x$ is not limited to the following examples. In the following formulae, "—" represents an atomic bonding at any position of the ring (the same applies to the following).

(1) An Aromatic Hydrocarbon Ring Group

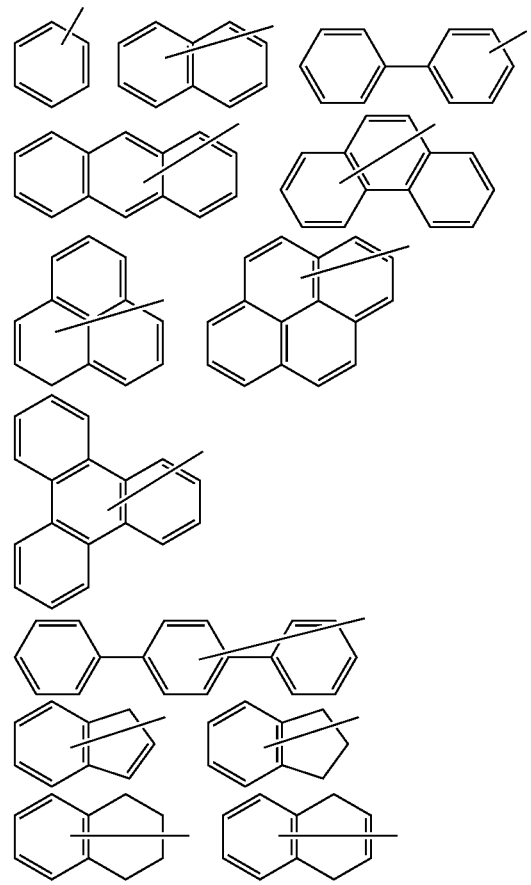

-continued

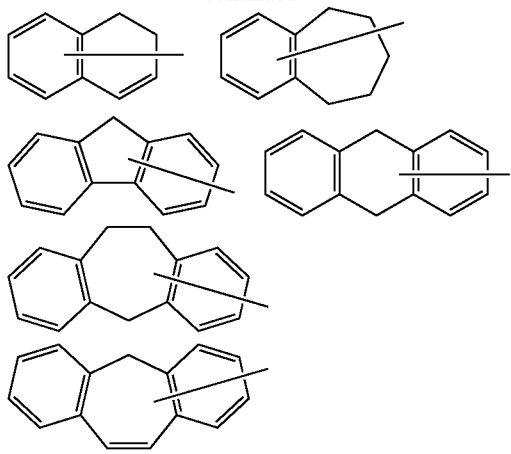

(2) An Aromatic Heterocyclic Group

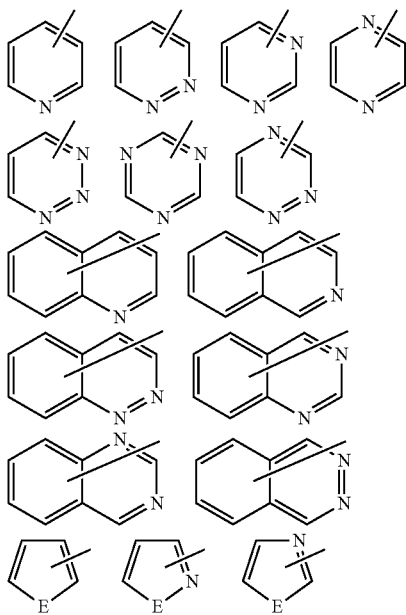

In the aforementioned formulae, E is $NR^{6a}$, an oxygen atom, or a sulfur atom. Herein, $R^{6a}$ is a hydrogen atom; or an alkyl group of 1 to 6 carbon atoms, such as a methyl group, an ethyl group, and a propyl group.

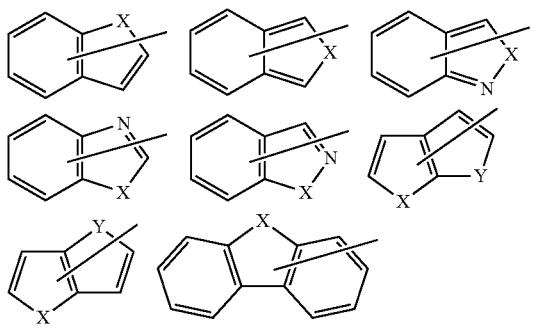

-continued

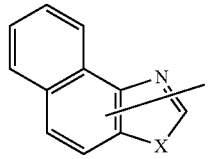

In the aforementioned formulae, X and Y are each independently $NR^7$, an oxygen atom, a sulfur atom, —SO—, or —SO$_2$— (with a proviso that cases where an oxygen atom, a sulfur atom, —SO—, and —SO$_2$— are each adjacent are excluded). $R^7$ is a hydrogen atom, or an alkyl group of 1 to 6 carbon atoms, such as a methyl group, an ethyl group, and a propyl group, which are the same as those for $R^{6a}$ described above.

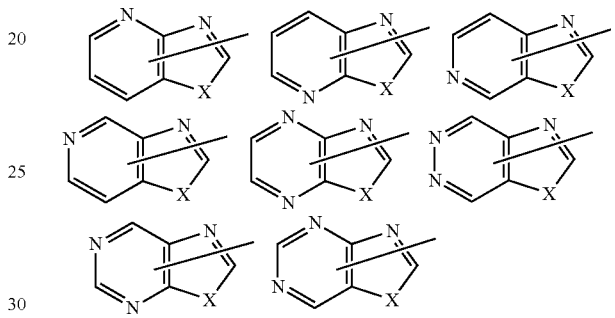

(In the aforementioned formulae, X has the same meanings as described above.)

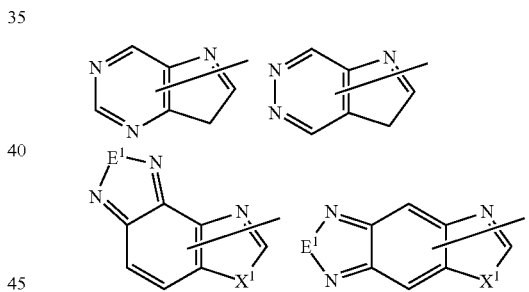

(In the aforementioned formulae, $X^1$ is —CH$_2$—, —NR$^c$—, an oxygen atom, a sulfur atom, —SO—, or —SO$_2$—, and E1 is —NR$^C$—, an oxygen atom or a sulfur atom. Herein, $R^c$ is a hydrogen atom, or an alkyl group of 1 to 6 carbon atoms such as a methyl group, an ethyl group, and a propyl group. (provided that, in each formula, each of the oxygen atom, the sulfur atom, —SO—, and —SO$_2$— is not adjacent.))

(3) A Group Containing a Combination of an Aromatic Hydrocarbon Ring and a Heterocyclic Ring

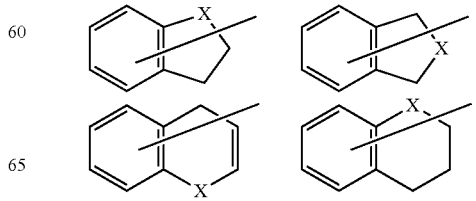

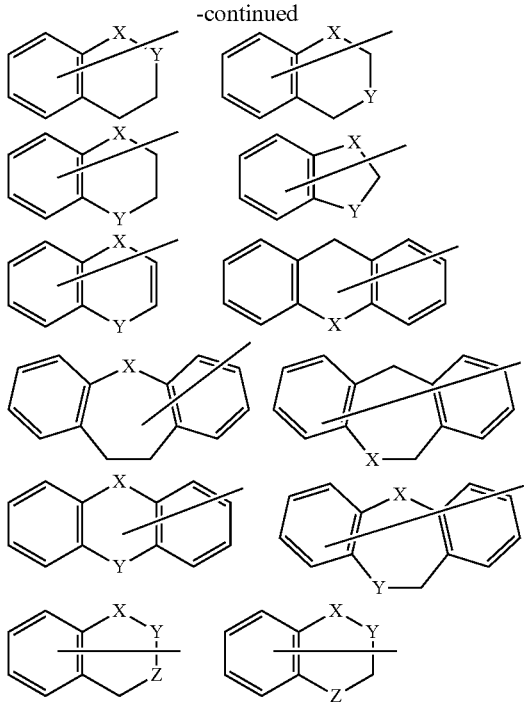

(In the aforementioned formulae, each of X and Y independently has the same meanings as described above. In the aforementioned formulae, Z represents NR⁷, an oxygen atom, a sulfur atom, —SO—, or —SO₂— (with a proviso that cases where an oxygen atom, a sulfur atom, —SO—, and —SO₂— are each adjacent are excluded.).)

(4) An Alkyl Group Having at Least One Aromatic Ring Selected from the Group Consisting of an Aromatic Hydrocarbon Ring and an Aromatic Heterocyclic Ring

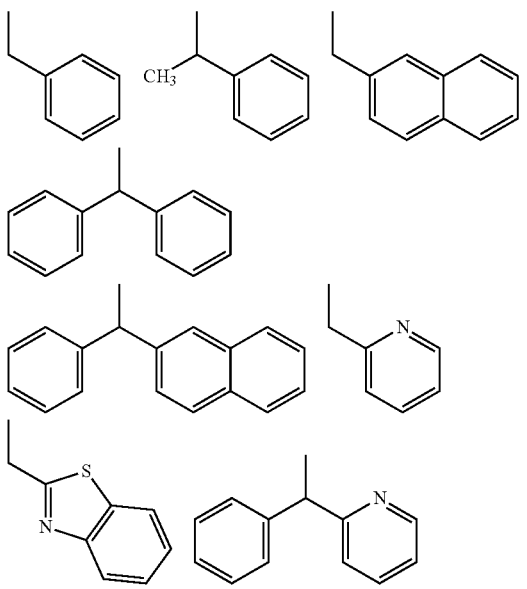

(5) An Alkenyl Group Having at Least One Aromatic Ring Selected from the Group Consisting of an Aromatic Hydrocarbon Ring and an Aromatic Heterocyclic Ring

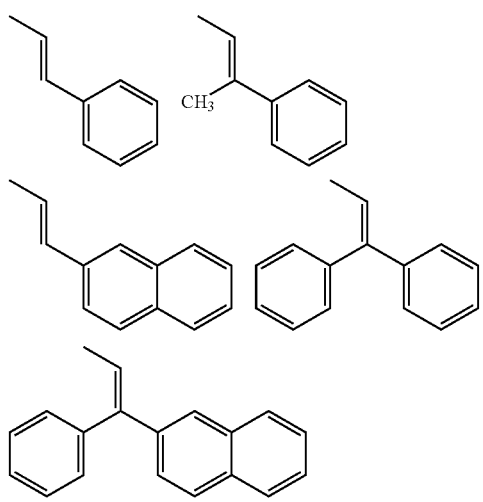

(6) An Alkynyl Group Having at Least One Aromatic Ring Selected from the Group Consisting of an Aromatic Hydrocarbon Ring and an Aromatic Heterocyclic Ring

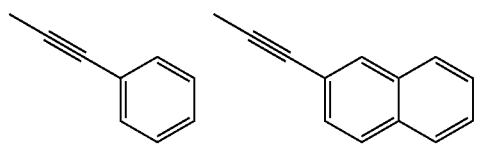

Of $A^x$ described above, an aromatic hydrocarbon ring group of 6 to 30 carbon atoms, an aromatic heterocyclic group of 4 to 30 carbon atoms, and a group of 4 to 30 carbon atoms containing a combination of an aromatic hydrocarbon ring group and a heterocyclic ring are preferable, and any of the groups shown below are more preferable.

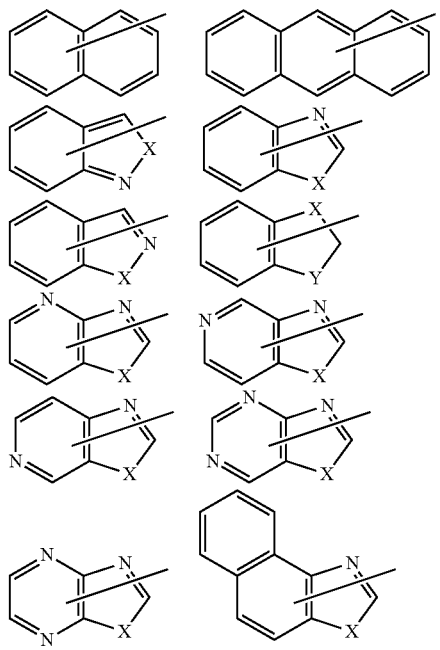

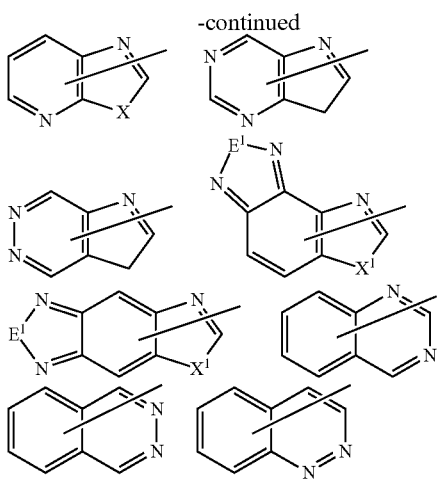

It is further preferable that $A^x$ is any of the following groups.

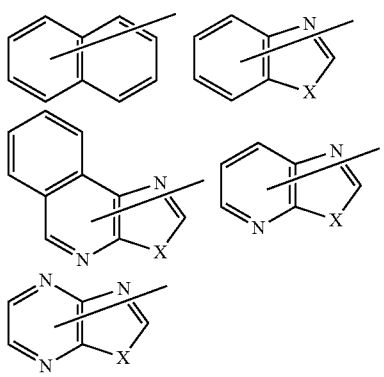

The ring that $A^x$ has may have a substituent. Examples of such a substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; $-C(=O)-R^8$; $-C(=O)-OR^8$; and $-SO_2R^6$. Herein, $R^8$ is an alkyl group of 1 to 6 carbon atoms, such as a methyl group and an ethyl group; or an aryl group of 6 to 14 carbon atoms, such as a phenyl group. In particular, it is preferable that the substituent is a halogen atom, a cyano group, an alkyl group of 1 to 6 carbon atoms, or an alkoxy group of 1 to 6 carbon atoms.

The ring that $A^x$ has may have a plurality of substituents that may be the same or different, and two adjacent substituents may be bonded together to form a ring. The formed ring may be a monocycle or a fused polycycle.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

In the aforementioned formula (I), $A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, $-C(=O)-R^3$, $-SO_2-R^4$, $-C(=S)NH-R^9$, or an organic group of 2 to 30 carbon atoms having at least one aromatic ring selected from the group consisting of an aromatic hydrocarbon ring and an aromatic heterocyclic ring. Herein, $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. $R^4$ is an alkyl group of 1 to 20 carbon atoms, an alkenyl group of 2 to 20 carbon atoms, a phenyl group, or a 4-methylphenyl group. $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent.

Examples of the alkyl group of 1 to 20 carbon atoms in the alkyl group of 1 to 20 carbon atoms optionally having a substituent, of $A^y$, may include a methyl group, an ethyl group, a n-propyl group, an isopropyl group, a n-butyl group, an isobutyl group, a 1-methylpentyl group, a 1-ethylpentyl group, a sec-butyl group, a t-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms in the alkyl group of 1 to 20 carbon atoms optionally having a substituent is preferably 1 to 12, and further preferably 4 to 10.

Examples of the alkenyl group of 2 to 20 carbon atoms in the alkenyl group of 2 to 20 carbon atoms optionally having a substituent, of $A^y$, may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icocenyl group. The number of carbon atoms in the alkenyl group of 2 to 20 carbon atoms optionally having a substituent is preferably 2 to 12.

Examples of the cycloalkyl group of 3 to 12 carbon atoms in the cycloalkyl group of 3 to 12 carbon atoms optionally having a substituent, of $A^y$, may include a cyclopropyl group, a cyclobutyl group, a cyclopentyl group, a cyclohexyl group, and a cyclooctyl group.

Examples of the alkynyl group of 2 to 20 carbon atoms in the alkynyl group of 2 to 20 carbon atoms optionally having a substituent, of $A^y$, may include an ethynyl group, a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituents in the alkyl group of 1 to 20 carbon atoms optionally having a substituent and the alkenyl group of 2 to 20 carbon atoms optionally having a substituent, of $A^y$, may include a halogen atom, such as a fluorine atom and a chlorine atom; a cyano group; a substituted amino group, such as a dimethylamino group; an alkoxy group of 1 to 20 carbon atoms, such as a methoxy group, an ethoxy group, an isopropyl group, and a butoxy group; an alkoxy group of 1 to 12 carbon atoms that is substituted by an alkoxy group of 1 to 12 carbon atoms, such as a methoxymethoxy group and a methoxyethoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; a cycloalkyloxy group of 3 to 8 carbon atoms, such as a cyclopentyloxy group, and a cyclohexyloxy group; a cyclic ether group of 2 to 12 carbon atoms, such as a tetrahydrofuranyl group, a tetrahydropyranyl group, a dioxolanyl group, and a dioxanyl group; an aryloxy group of 6 to 14 carbon atoms, such as a phenoxy group, and a naphthoxy group; a fluoroalkoxy group of 1 to 12 carbon atoms in which at least one is substituted by a fluoro atom, such as a trifluoromethyl group, a pentafluoroethyl group, and —$CH_2CF_3$; a benzofuryl group; a benzopyranyl group; a benzodioxolyl group, a benzodioxanyl group; —C(=O)—$R^{7a}$; —C(=O)—$OR^{7a}$; —$SO_2R^{8a}$; —$SR^{10}$; an alkoxy group of 1 to 12 carbon atoms substituted by —$SR^{10}$; and a hydroxyl group. Herein, $R^{7a}$ and $R^{10}$ are each independently an alkyl group of 1 to 20 carbon atoms, an alkenyl group of 2 to 20 carbon atoms, a cycloalkyl group of 3 to 12 carbon atoms, or an aromatic hydrocarbon ring group of 6 to 12 carbon atoms. $R^{8a}$ is an alkyl group of 1 to 20 carbon atoms, an alkenyl group of 2 to 20 carbon atoms, a phenyl group, or a 4-methylphenyl group, which are the same as those for $R^4$ described above.

Examples of the substituent in the cycloalkyl group of 3 to 12 carbon atoms optionally having a substituent, of $A^y$, may include a halogen atom, such as a fluorine atom and a chlorine atom; a cyano group; a substituted amino group, such as a dimethylamino group; an alkyl group of 1 to 6 carbon atoms, such as a methyl group, an ethyl group, and a propyl group; an alkoxy group of 1 to 6 carbon atoms, such as a methoxy group, an ethoxy group, and an isopropoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; —C(=O)—$R^{7a}$; —C(=O)— $OR^{7a}$; —$SO_2R^{8a}$; and a hydroxyl group. Herein, $R^{7a}$ and $R^{8a}$ have the same meanings as described above.

Examples of the substituent in the alkynyl group of 2 to 20 carbon atoms optionally having a substituent, of $A^y$, may include substituents that are the same as the substituents in the alkyl group of 1 to 20 carbon atoms optionally having a substituent and the alkenyl group of 2 to 20 carbon atoms optionally having a substituent.

In the group represented by —C(=O)—$R^3$ of $A^y$, $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$; and the aromatic hydrocarbon ring group of 5 to 12 carbon atoms, among the aromatic hydrocarbon ring groups described in $A^x$ described above.

In the group represented by —$SO_2$—$R^4$ of $A^y$, $R^4$ is an alkyl group of 1 to 20 carbon atoms, an alkenyl group of 2 to 20 carbon atoms, a phenyl group, or a 4-methylphenyl group. Specific examples of the alkyl group of 1 to 20 carbon atoms and the alkenyl group of 2 to 20 carbon atoms, of $R^4$, may include those exemplified as the examples of the alkyl group of 1 to 20 carbon atoms, and the alkenyl group of 2 to 20 carbon atoms, of $A^y$ described above.

In the group represented by —C(=S)NH—$R^9$ of $A^y$, $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$ described above; and the aromatic hydrocarbon ring group of 5 to 20 carbon atoms and aromatic heteroaromatic ring group of 5 to 20 carbon atoms, among the aromatic groups such as the aromatic hydrocarbon ring groups and aromatic heteroaromatic ring groups described in $A^x$ described above.

Examples of the organic group of 2 to 30 carbon atoms having at least one aromatic ring selected from the group consisting of an aromatic hydrocarbon ring and an aromatic heterocyclic ring of $A^y$ may include those exemplified as the examples of $A^x$ described above.

Among these, $A^y$ is preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, or an organic group of 2 to 30 carbon atoms having at least one aromatic ring selected from the group consisting of an aromatic hydrocarbon ring and an aromatic heterocyclic ring, and further preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, an aromatic hydrocarbon ring group of 6 to 12 carbon atoms optionally having a substituent, an aromatic heterocyclic group of 3 to 9 carbon atoms optionally having a substituent, an group of 3 to 9 carbon atoms containing a combination of an aromatic hydrocarbon ring and a heterocyclic ring and optionally having a substituent, —C(=O)— $R^3$, or a group represented by —$SO_2$—$R^4$. Herein, $R^3$ and $R^4$ have the same meanings as described above.

It is preferable that substituents in the alkyl group of 1 to 20 carbon atoms optionally having a substituent, the alkenyl group of 2 to 20 carbon atoms optionally having a substituent, and the alkynyl group of 2 to 20 carbon atoms optionally having a substituent, of $A^y$, are a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a phenylsulfonyl group, a 4-methylphenylsulfonyl group, a benzoyl group, or —$SR^{10}$. Herein, $R^{10}$ has the same meanings as described above.

It is preferable that substituents in the cycloalkyl group of 3 to 12 carbon atoms optionally having a substituent, the aromatic hydrocarbon ring group of 6 to 12 carbon atoms optionally having a substituent, the aromatic heterocyclic group of 3 to 9 carbon atoms optionally having a substituent, and an group of 3 to 9 carbon atoms containing a combination of an aromatic hydrocarbon ring and a heterocyclic ring and optionally having a substituent, of $A^y$, are a fluorine atom, an alkyl group of 1 to 6 carbon atoms, an alkoxy group of 1 to 6 carbon atoms, or a cyano group.

$A^x$ and $A^y$ may form a ring together. Examples of the ring may include an unsaturated heterocyclic ring of 4 to 30 carbon atoms optionally having a substituent and an unsaturated carbon ring of 6 to 30 carbon atoms optionally having a substituent.

The aforementioned unsaturated heterocyclic ring of 4 to 30 carbon atoms and the aforementioned unsaturated carbon ring of 6 to 30 carbon atoms are not particularly restricted, and may or may not have aromaticity.

Examples of the ring formed by $A^x$ and $A^y$ together may include rings shown below. The rings shown below are a moiety of:

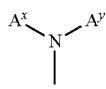

in the formula (I).

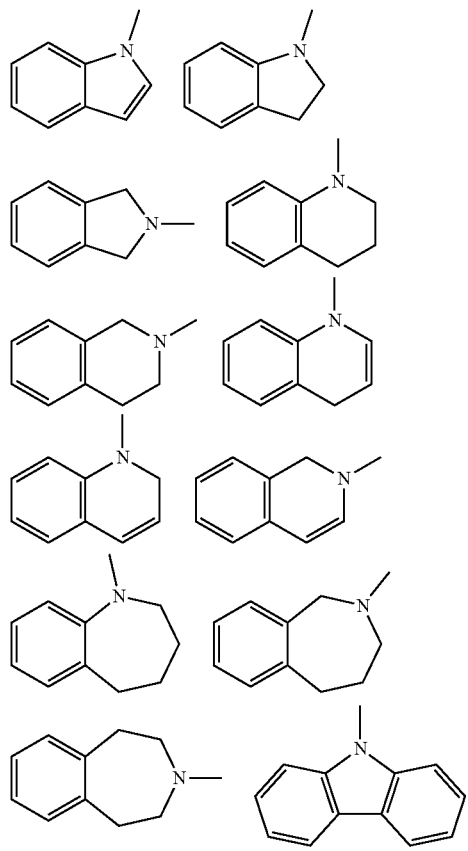

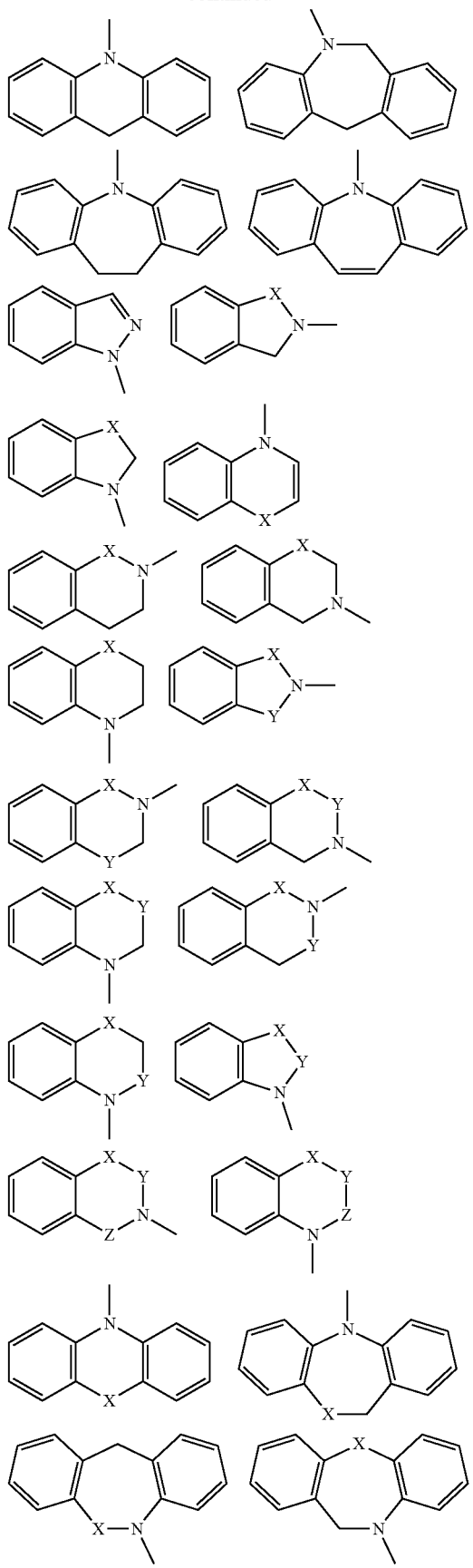

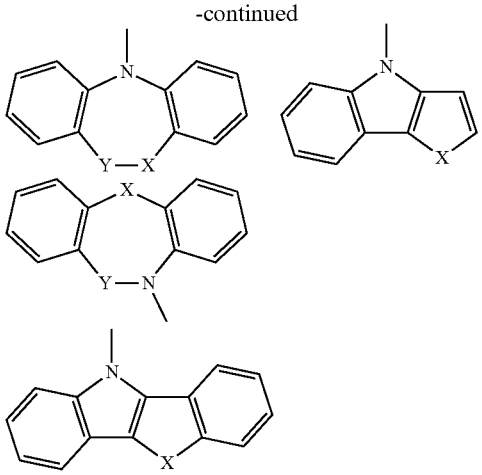

(In the formulae, X, Y, and Z have the same meanings as described above.)

The rings may have a substituent. Examples of the substituent may include those described as the substituent in the aromatic ring of $A^x$.

The total number of π electrons contained in $A^x$ and $A^y$ is preferably 4 or more and 24 or less, more preferably 6 or more and 20 or less, and still more preferably 6 or more and 18 or less from the viewpoint of favorably expressing the desired effect of the present invention.

Examples of preferred combination of $A^x$ and $A^y$ may include the following combinations (α) and (β).

(α) a combination of $A^x$ and $A^y$ in which $A^x$ is an aromatic hydrocarbon ring group of 4 to 30 carbon atoms, an aromatic heterocyclic group of 4 to 30 carbon atoms or a group containing a combination of an aromatic hydrocarbon ring and a heterocyclic ring, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms containing a combination of an aromatic hydrocarbon ring and a heterocyclic ring and optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 2 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$.

(β) a combination of $A^x$ and $A^y$ in which $A^x$ and $A^y$ together form an unsaturated heterocyclic ring or an unsaturated carbon ring.

Herein, $R^{10}$ has the same meanings as described above.

Examples of more preferred combination of $A^x$ and $A^y$ may include the following combination (γ).

(γ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms containing a combination of an aromatic hydrocarbon ring and a heterocyclic ring and optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 2 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$.

Herein, $R^{10}$ has the same meanings as described above.

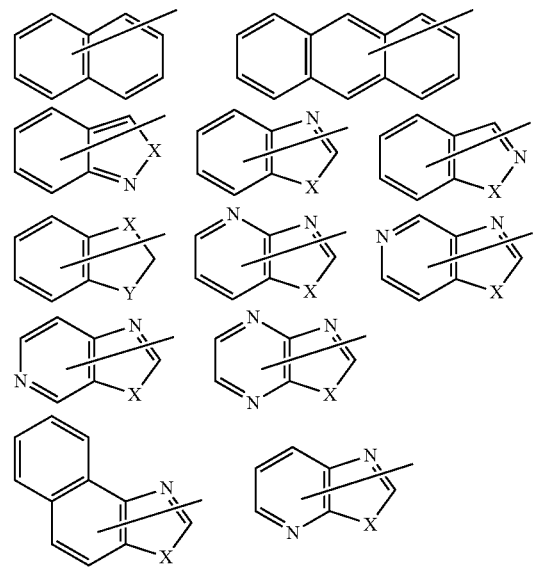

(In the formulae, X and Y have the same meanings as described above.)

Examples of particularly preferred combination of $A^x$ and $A^y$ may include the following combination (δ).

(δ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms containing a combination of an aromatic hydrocarbon ring and a heterocyclic ring and optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 2 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —SR$^{10}$.

In the following formulae, X has the same meanings as described above. Herein, R$^{10}$ has the same meanings as described above.

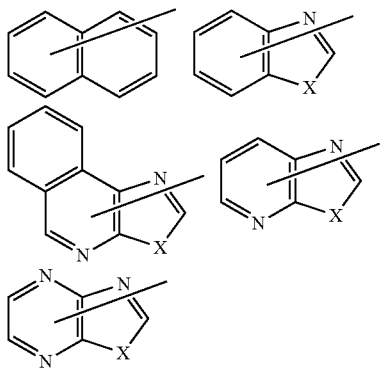

In the formula (I) mentioned above, A$^1$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent aromatic group is preferably the trivalent carbocyclic aromatic group, more preferably a trivalent benzene ring group or a trivalent naphthalene ring group, and further preferably a trivalent benzene ring group or a trivalent naphthalene ring group that is represented by the following formula. In the following formulae, substituents Y$^1$ and Y$^2$ are described for the sake of convenience to clearly show a bonding state (Y$^1$ and Y$^2$ have the same meanings as described above, and the same applies to the following).

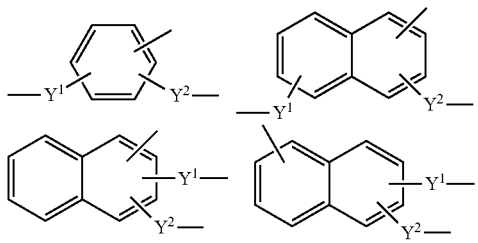

Among these, A$^1$ is more preferably a group represented by each of the following formulae (A11) to (A25), further preferably a group represented by the formula (A11), (A13), (A15), (A19), or (A23), and particularly preferably a group represented by the formula (A11) or (A23).

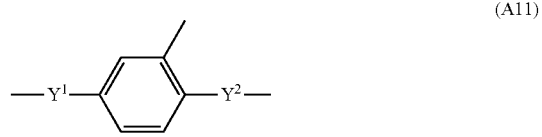
(A11)

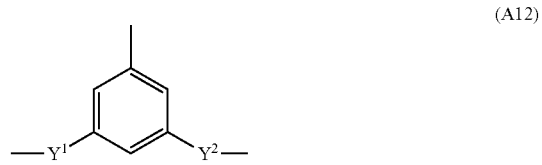
(A12)

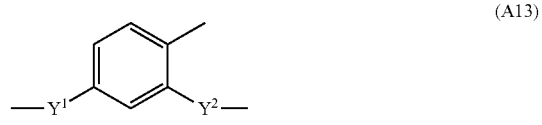
(A13)

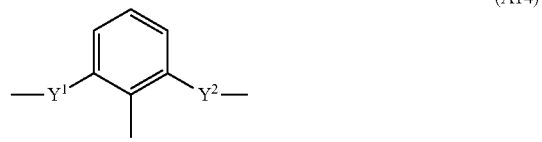
(A14)

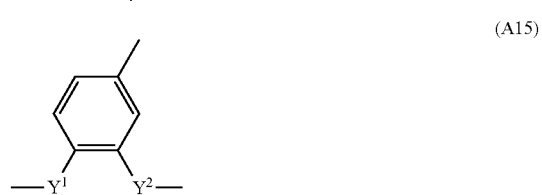
(A15)

(A16)

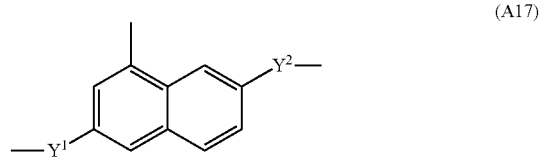
(A17)

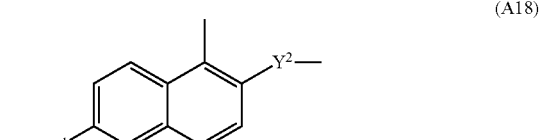
(A18)

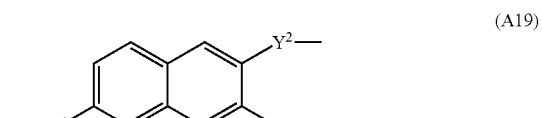
(A19)

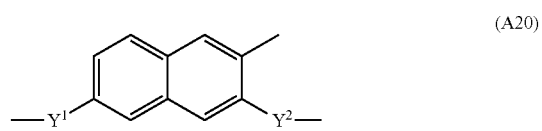
(A20)

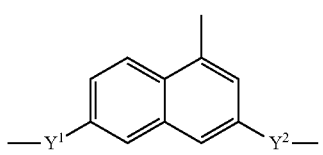 (A21)

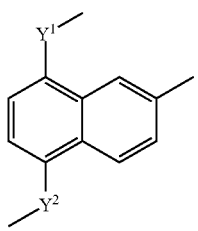 (A22)

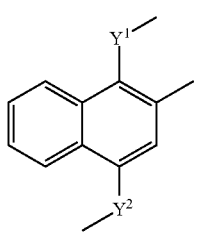 (A23)

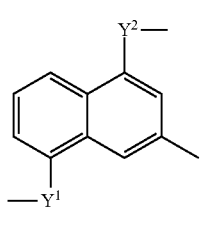 (A24)

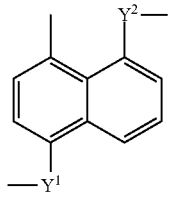 (A25)

Examples of the substituent that may be included in the trivalent aromatic group of $A^1$ may include those described as the substituent in the aromatic ring of $A^x$ described above. It is preferable that $A^1$ is a trivalent aromatic group having no substituent.

In the formula (I) mentioned above, $A^2$ and $A^3$ are each independently a divalent alicyclic hydrocarbon group of 3 to 30 carbon atoms optionally having a substituent. Examples of the divalent alicyclic hydrocarbon group of 3 to 30 carbon atoms may include a cycloalkanediyl group of 3 to 30 carbon atoms, and a divalent alicyclic fused ring group of 10 to 30 carbon atoms.

Examples of the cycloalkanediyl group of 3 to 30 carbon atoms may include a cyclopropanediyl group; a cyclobutanediyl group, such as a cyclobutane-1,2-diyl group and a cyclobutane-1,3-diyl group; a cyclopentanediyl group, such as a cyclopentane-1,2-diyl group and a cyclopentane-1,3-diyl group; a cyclohexanediyl group, such as a cyclohexane-1,2-diyl group, a cyclohexane-1,3-diyl group, and a cyclohexane-1,4-diyl group; a cycloheptanediyl group, such as a cycloheptane-1,2-diyl group, a cycloheptane-1,3-diyl group, and a cycloheptane-1,4-diyl group; a cyclooctanediyl group, such as a cyclooctane-1,2-diyl group, a cyclooctane-1,3-diyl group, a cyclooctane-1,4-diyl group, and a cyclooctane-1,5-diyl group; a cyclodecanediyl group, such as a cyclodecane-1,2-diyl group, a cyclodecane-1,3-diyl group, a cyclodecane-1,4-diyl group, and a cyclodecane-1,5-diyl group; a cyclododecanediyl group, such as a cyclododecane-1,2-diyl group, a cyclododecane-1,3-diyl group, a cyclododecane-1,4-diyl group, and a cyclododecane-1,5-diyl group; a cyclotetradecanediyl group, such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group, such as a cycloeicosane-1,2-diyl group and a cycloeicosane-1,10-diyl group.

Examples of the divalent alicyclic fused ring group of 10 to 30 carbon atoms may include a decalindiyl group, such as a decalin-2,5-diyl group and a decalin-2,7-diyl group; an adamantanediyl group, such as an adamantane-1,2-diyl group and an adamantane-1,3-diyl group; and a bicyclo [2.2.1]heptanediyl group, such as a bicyclo[2.2.1]heptane-2,3-diyl group, a bicyclo[2.2.1]heptane-2,5-diyl group, and a bicyclo[2.2.1]heptane-2,6-diyl group.

The divalent alicyclic hydrocarbon groups may further have a substituent at any position. Examples of the substituent may include those described as the substituent in the aromatic ring of $A^x$ described above.

Among these, $A^2$ and $A^3$ are preferably a divalent alicyclic hydrocarbon group of 3 to 12 carbon atoms, more preferably a cycloalkanediyl group of 3 to 12 carbon atoms, further preferably a group represented by each of the following formulae (A31) to (A34), and particularly preferably the group represented by the following formula (A32).

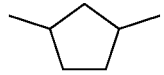 (A31)

 (A32)

 (A33)

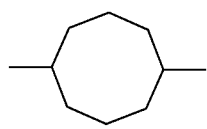 (A34)

The divalent alicyclic hydrocarbon group of 3 to 30 carbon atoms may exist in forms of cis- and trans-stereoisomers that are on the basis of difference of stereoconfiguration of carbon atoms bonded to $Y^1$ and $Y^3$ (or $Y^2$ and $Y^4$). For example, when the group is a cyclohexane-1,4-diyl group, a cis-isomer (A32a) and a trans-isomer (A32b) may exist, as described below.

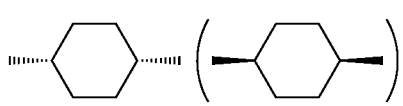 (A32a)

(A32b)

The aforementioned divalent alicyclic hydrocarbon group of 3 to 30 carbon atoms may be a cis-isomer, a trans-isomer, or an isomeric mixture of cis- and trans-isomers. Since the orientation quality is favorable, the group is preferably the trans-isomer or the cis-isomer, and more preferably the trans-isomer.

In the formula (I) mentioned above, $A^4$ and $A^5$ are each independently a divalent aromatic group of 6 to 30 carbon atoms optionally having a substituent. The aromatic group of $A^4$ and $A^5$ may be monocyclic or polycyclic. Specific preferable examples of $A^4$ and $A^5$ are as follows.

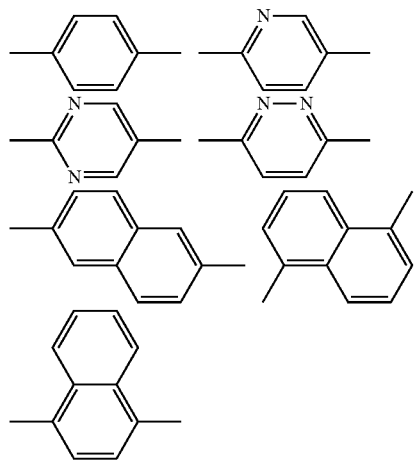

The divalent aromatic groups of $A^4$ and $A^5$ described above may have a substituent at any position. Examples of the substituent may include a halogen atom, a cyano group, a hydroxyl group, an alkyl group of 1 to 6 carbon atoms, an alkoxy group of 1 to 6 carbon atoms, a nitro group, and a —C(═O)—OR$^{8b}$ group. Herein, R$^{8b}$ is an alkyl group of 1 to 6 carbon atoms. In particular, it is preferable that the substituent is a halogen atom, an alkyl group of 1 to 6 carbon atoms, or an alkoxy group. Of the halogen atoms, a fluorine atom is more preferable, of the alkyl groups of 1 to 6 carbon atoms, a methyl group, an ethyl group, and a propyl group are more preferable, and of the alkoxy groups, a methoxy group and an ethoxy group are more preferable.

Among these, from the viewpoint of favorably expressing the desired effect of the present invention, $A^4$ and $A^5$ are each independently preferably a group represented by the following formula (A41), (A42), or (A43) and optionally having a substituent, and particularly preferably the group represented by the formula (A41) and optionally having a substituent.

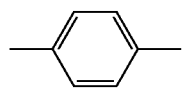
(A41)

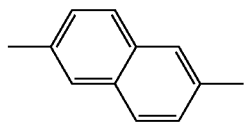
(A42)

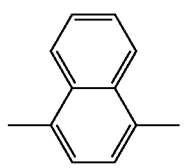
(A43)

In the formula (I) mentioned above, $Q^1$ is a hydrogen atom or an alkyl group of 1 to 6 carbon atoms optionally having a substituent. Examples of the alkyl group of 1 to 6 carbon atoms optionally having a substituent may include the alkyl group of 1 to 6 carbon atoms among the alkyl groups of 1 to 20 carbon atoms optionally having a substituent that are described as $A^y$ described above. Among these, $Q^1$ is preferably a hydrogen atom or an alkyl group of 1 to 6 carbon atoms, and more preferably a hydrogen atom or a methyl group.

In the formula (I) mentioned above, m each independently represents 0 or 1. Among these, m is preferably 1.

The compound (I) may be produced, for example, by a reaction of a hydrazine compound and a carbonyl compound as disclosed in International Publication No. 2012/147904.

Among the aforementioned polymerizable liquid crystal compound with reverse wavelength dispersion, from the viewpoint of more favorably expressing the desired effects of the present invention, those containing at least one type selected from the group consisting of a benzothiazole ring (the ring of the following formula (31A)); and a combination of a cyclohexyl ring (the ring of the following formula (31B) and a phenyl ring (the ring of the following formula (31C)) in the molecule of the polymerizable liquid crystal compound with reverse wavelength dispersion are preferable.

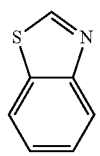
(31A)

(31B)

(31C)

The CN point of the liquid crystal compound is preferably 25° C. or higher, more preferably 45° C. or higher, and particularly preferably 60° C. or higher, and is preferably 120° C. or lower, more preferably 110° C. or lower, and particularly preferably 100° C. or lower. Herein, the "CN point" refers to a crystal-nematic phase transition temperature. When the liquid crystal compound having the CN point falling within the aforementioned range is used, the liquid crystal cured layer can be easily produced.

The molecular weight of the liquid crystal compound is preferably 300 or more, more preferably 700 or more, and particularly preferably 1,000 or more, and is preferably 2,000 or less, more preferably 1,700 or less, and particularly preferably 1,500 or less. When the liquid crystal compound has the aforementioned molecular weight, the application properties of the liquid crystal composition for forming the liquid crystal cured layer can be made particularly preferable.

As the liquid crystal compound, one type thereof may be solely used, and two or more types thereof may also be used in combination at any ratio.

The liquid crystal composition may contain, for example, a polymerization initiator as an optional component. The polymerization initiator for use may be appropriately selected according to the type of the polymerizable compound such as a liquid crystal compound to be contained in the liquid crystal composition. Herein, the polymerizable compound is a collective term referring to components of the liquid crystal composition that are compounds having polymerizability (liquid crystal compounds and other compounds having polymerizability). Among these, a photopolymerization initiator is preferable as the polymerization initiator.

Examples of the photopolymerization initiator may include a radical polymerization initiator, an anionic polymerization initiator, and a cationic polymerization initiator.

Examples of the radical polymerization initiator may include a photo radical generator which is a compound that generates active species capable of initiating polymerization of a polymerizable compound by light irradiation. Examples of the photo radical generator may include an acetophenone-based compound, a biimidazole-based compound, a triazine-based compound, an O-acyloxime-based compound, an onium salt-based compound, a benzoin-based compound, a benzophenone-based compound, an α-diketone-based compound, a polynuclear quinone-based compound, a xanthone-based compound, a diazo-based compound, and an imide sulfonate-based compound, as described in International Publication No. 2012/147904.

Examples of the anionic polymerization initiator may include an alkyllithium compound; a monolithium or monosodium salt of, for example, biphenyl, naphthalene, and pyrene; and a polyfunctional initiator such as a dilithium salt and a trilithium salt.

Examples of the cationic polymerization initiator may include a protonic acid such as sulfuric acid, phosphoric acid, perchloric acid, and trifluoromethanesulfonic acid; a Lewis acid such as boron trifluoride, aluminum chloride, titanium tetrachloride, and tin tetrachloride; and an aromatic onium salt or aromatic onium salt in combination with a reductant.

Specific examples of a commercially available photopolymerization initiator may include trade name: Irgacure 907, trade name: Irgacure 184, trade name: Irgacure 369, trade name: Irgacure 651, trade name: Irgacure 819, trade name: Irgacure 907, trade name: Irgacure 379, trade name: Irgacure 379EG, and trade name: Irgacure OXE02, manufactured by BASF, and trade name: Adecaoptomer N1919, manufactured by ADEKA Corporation.

As the polymerization initiator, one type thereof may be solely used, and two or more types thereof may also be used in combination at any ratio.

The ratio of the polymerization initiator in the liquid crystal composition is preferably 0.1 part by weight to 30 parts by weight, and preferably 0.5 part by weight to 10 parts by weight or less, relative to 100 parts by weight of the liquid crystal compound.

The liquid crystal composition may contain, for example, a surfactant as an optional component. By the surfactant, the surface tension of the liquid crystal composition can be adjusted. The surfactant is not particularly limited, but a nonionic surfactant is preferable. As the nonionic surfactant, a commercially available product may be used. For example, a nonionic surfactant which is an oligomer having a molecular weight of about several thousand may be used. Specific examples of these surfactants for use may include "PF-151N", "PF-636", "PF-6320", "PF-656", "PF-6520", "PF-3320", "PF-651", and "PF-652" of PolyFox manufactured by OMNOVA; "FTX-209F", "FTX-208G", "FTX-204D", and "601AD" of Ftergent manufactured by Neos Company Limited; "KH-40" and "S-420" of Surflon manufactured by Seimi Chemical Co., Ltd.; and "Megaface F562" manufactured by DIC Corporation.

As the surfactant, one type thereof may be solely used, and two or more types thereof may also be used in combination at any ratio.

The ratio of the surfactant in the liquid crystal composition is preferably 0.01 part by weight to 10 parts by weight, and more preferably 0.1 part by weight to 2 parts by weight, relative to 100 parts by weight of the liquid crystal compound.

The liquid crystal composition may contain, for example, a solvent such as an organic solvent as an optional component. Examples of the organic solvents may include a hydrocarbon solvent such as cyclopentane and cyclohexane; a ketone solvent such as cyclopentanone, cyclohexanone, methyl ethyl ketone, acetone, and methyl isobutyl ketone; an acetic acid ester solvent such as butyl acetate, and amyl acetate; a halogenated hydrocarbon solvent such as chloroform, dichloromethane, and dichloroethane; an ether solvent such as 1,4-dioxane, cyclopentyl methyl ether, tetrahydrofuran, tetrahydropyran, 1,3-dioxolane, and 1,2-dimethoxyethane; an aromatic hydrocarbon solvent such as toluene, xylene, and mesitylene; and mixtures of these. The boiling point of the solvent is preferably 60° C. to 250° C., and more preferably 60° C. to 150° C. from the viewpoint of excellent handleability.

The amount of the solvent used is preferably 100 parts by weight to 1,000 parts by weight or more, relative to 100 parts by weight of the liquid crystal compound.

The liquid crystal composition may further contain optional additives such as a metal, a metal complex, a dye, a pigment, a fluorescent material, a phosphorescent material, a leveling agent, a thixotropic agent, a gelling agent, a polysaccharide, an ultraviolet absorber, an infrared absorber, an antioxidant, an ion exchange resin, and a metal oxide such as titanium oxide. The ratio of such optional additives is preferably 0.1 part by weight to 20 parts by weight relative to 100 parts by weight of the liquid crystal compound.

The liquid crystal cured layer as the first optically anisotropic layer may be produced, for example, by a production method including:

a step (i) of applying the liquid crystal composition onto a substrate to obtain a layer of the liquid crystal composition, a step (ii) of orienting the liquid crystal compound contained in the layer of the liquid crystal composition, and a step (iii) of curing the liquid crystal composition.

For example, the step (i) may be performed by applying the liquid crystal composition onto the substrate. As the substrate, a long-length substrate is preferably used. When the long-length substrate is used, the liquid crystal composition can be continuously applied onto the substrate that is continuously conveyed. Accordingly, when the long-length substrate is used, the liquid crystal cured layer can be continuously produced. Therefore, the productivity can be improved.

When the liquid crystal composition is applied onto the substrate, it is preferable that an appropriate tensile force (usually 100 N/m to 500 N/m) is applied to the substrate to suppress flopping of the substrate during conveyance and maintain the flatness during application. The flatness is the swung amount of the substrate in its widthwise direction and vertical direction perpendicular to the conveyance direction, and is ideally 0 mm, and usually 1 mm or less.

A substrate film is usually used as the substrate. As the substrate film, a film usable as a substrate for an optical layered body may be appropriately selected for use. In particular, from the viewpoint of usability of a multilayer film including the substrate film and the liquid crystal cured layer as an optical film and elimination of the need of peeling the substrate film, it is preferable that the substrate film is a transparent film. Specifically, the total light transmittance of the substrate film is preferably 80% or more, more preferably 85% or more, and particularly preferably 88% or more. The total light transmittance of the substrate film may be measured at a wavelength range of 400 nm to 700 nm by an ultraviolet-visible spectrophotometer.

The material of the substrate film is not particularly limited, and various resins may be used. Examples of the resin may include resins containing various types of polymers. Examples of the polymer may include an alicyclic structure-containing polymer, a cellulose ester, a polyvinyl alcohol, a polyimide, a UV transparent acrylic, a polycarbonate, a polysulfone, a polyether sulfone, an epoxy polymer, a polystyrene, and combinations thereof. Among these, an alicyclic structure-containing polymer and a cellulose ester are preferable, and an alicyclic structure-containing polymer is more preferable from the viewpoint of transparency, low hygroscopicity, size stability, and light-weight properties.

The alicyclic structure-containing polymer is a polymer having an alicyclic structure in the repeating unit, and is usually an amorphous polymer. As the alicyclic structure-containing polymer, any of a polymer containing an alicyclic structure in the main chain and a polymer containing an alicyclic structure in the side chain may be used.

Examples of the alicyclic structure may include a cycloalkane structure, and a cycloalkene structure, and a cycloalkane structure is preferable from the viewpoint of thermal stability and the like.

The number of carbon atoms constituting one alicyclic structure repeating unit is not particularly limited, but is preferably 4 or more, more preferably 5 or more, and particularly preferably 6 or more, and is preferably 30 or less, more preferably 20 or less, and particularly preferably 15 or less.

The ratio of the repeating unit having the alicyclic structure in the alicyclic structure-containing polymer may be appropriately selected according to the use purpose, and is preferably 50% by weight or more, more preferably 70% by weight or more, and particularly preferably 90% by weight or more. When the repeating unit having the alicyclic structure is at a large amount as mentioned above, heat resistance of the substrate film can be enhanced.

Examples of the alicyclic structure-containing polymer may include (1) a norbornene polymer, (2) a monocycle cyclic olefin polymer, (3) a cyclic conjugated diene polymer, (4) a vinyl alicyclic hydrocarbon polymer, and hydrogenated products of these. Among these, a norbornene polymer is more preferable from the viewpoint of transparency and moldability.

Examples of the norbornene polymer may include a ring-opening polymer of a norbornene monomer, a ring-opening copolymer of a norbornene monomer with another monomer ring-opening copolymerizable therewith, and hydrogenated products thereof; an addition polymer of a norbornene monomer, and an addition copolymer of a norbornene monomer with another monomer copolymerizable therewith. Among these, from the viewpoint of transparency, a hydrogenated product of a ring-opening polymer of a norbornene monomer is particularly preferable.

The above-described alicyclic structure-containing polymer may be selected from publicly known polymers disclosed, for example, Japanese Patent Application Laid-Open No. 2002-321302 A and the like.

The glass transition temperature of the alicyclic structure-containing polymer is preferably 80° C. or more, and more preferably in a range of 100° C. to 250° C. The alicyclic structure-containing polymer having a glass transition temperature falling within such a range hardly causes deformation and stress in use under high temperature, and is excellent in durability.

The weight-average molecular weight (Mw) of the alicyclic structure-containing polymer is preferably 10,000 to 100,000, more preferably 25,000 to 80,000, and further more preferably 25,000 to 50,000. When the weight-average molecular weight falls within such a range, the mechanical strength and molding processability of the substrate film are highly balanced, thus being suitable. The above-mentioned weight-average molecular weight may be measured as a polyisoprene-equivalent value by gel permeation chromatography (hereinafter abbreviated as "GPC") using cyclohexane as a solvent. When the resin is not dissolved in cyclohexane in the above-mentioned GPC, the weight-average molecular weight may be measured as a polystyrene-equivalent value using toluene as a solvent.

The molecular weight distribution (weight-average molecular weight (Mw)/number-average molecular weight (Mn)) of the alicyclic structure-containing polymer is preferably 1 or more, and more preferably 1.2 or more, and is preferably 10 or less, more preferably 4 or less, and particularly preferably 3.5 or less.

When a resin containing the alicyclic structure-containing polymer is used as the material of the substrate film, the thickness of the substrate film is preferably from 1 µm to 1,000 µm, more preferably from 5 µm to 300 µm, and particularly preferably 30 µm to 100 µm, from the viewpoint of improved productivity, thinning, and weight-saving.

The resin containing the alicyclic structure-containing polymer may be composed solely of the alicyclic structure-containing polymer, but may contain an optional additive as long as the effect of the present invention is not significantly impaired. The ratio of the alicyclic structure-containing polymer in the resin containing the alicyclic structure-containing polymer is preferably 70% by weight or more, and more preferably 80% by weight or more.

Suitable specific examples of the resin containing the alicyclic structure-containing polymer may include "ZEONOR 1420" and "ZEONOR 1420 R" manufactured by ZEON Corporation.

As the cellulose ester, lower fatty acid esters of cellulose (for example, cellulose acetate, cellulose acetate butyrate, and cellulose acetate propionate) are representative examples. Lower fatty acid means a fatty acid of 6 or less carbon atoms per molecule. Examples of the cellulose acetate may include triacetyl cellulose (TAC) and cellulose diacetate (DAC).

The degree of acetylation of cellulose acetate is preferably 50% to 70%, and particularly preferably 55% to 65%. The weight-average molecular weight is preferably 70,000 to 120,000, and particularly preferably 80,000 to 100,000. In addition, the aforementioned cellulose acetate may be esterified with not only acetic acid but also a certain type of a fatty acid such as propionic acid and butyric acid. Further, the resin constituting the substrate film may contain cellulose acetate in combination with cellulose ester other than cellulose acetate (cellulose propionate, cellulose butyrate, and the like). In that case, it is preferable that the entirety of these cellulose esters satisfy the degree of acetylation described above.

When a film of triacetylcellulose is used as the substrate film, such a film is particularly preferably a triacetylcellulose film formed using triacetylcellulose dope that is prepared by dissolving triacetylcellulose in a solvent substantially free of dichloromethane by a low-temperature dissolution method or a high-temperature dissolution method, from the viewpoint of environmental conservation. The film of triacetylcellulose may be produced by a co-casting method. The co-casting method may be performed by preparing a solution (dope) containing raw material flakes of triacetylcellulose and a solvent, and, as necessary, an optional additive, casting the dope on a support from a dope supply device (die), drying the cast dope to some extent, peeling the cast product as a film from the support when rigidity has been imparted thereto, and further drying the film to remove the solvent. Examples of the solvent in which the raw material flakes are dissolved may include a halogenated hydrocarbon solvent (dichloromethane, etc.), an alcohol solvent (methanol, ethanol, butanol, etc.), an ester solvent (methyl formate, methyl acetate, etc.), and an ether solvent (dioxane, dioxolane, diethyl ether, etc.). Examples of the additive contained in the dope may include a retardation-increasing agent, a plasticizer, an ultraviolet absorber, a deterioration preventing agent, a lubricant, and a separation facilitator. Examples of the support on which the dope is cast may include a horizontal endless metal belt and a rotation drum. For casting, a single dope may be cast as a single layer. Alternatively, co-casting of a plurality of layers may also be performed. In co-casting of a plurality of layers, for example, a plurality of dopes may be successively cast so that a layer of a low-concentration cellulose ester dope and layers of a high-concentration cellulose ester dope in contact with the front and back surfaces of the layer of the low-concentration cellulose ester dope are formed. Examples of a method for drying the film to remove the solvent may include a method for conveying the film to pass the film through a drying portion of which the interior portion is under conditions suitable for drying.

Preferable examples of the film of triacetylcellulose may include "TAC-TD80U" manufactured by Fuji Photo Film Co., Ltd. and those disclosed in JIII journal of technical disclosure No. 2001-1745. The thickness of the film of triacetylcellulose is not particularly limited, but is preferably 20 µm to 150 µm, more preferably 40 µm to 130 µm, and still more preferably 70 µm to 120 µm.

As the substrate, one having an orientation regulating force may be used. The orientation regulating force of the substrate means the properties of the substrate capable of orienting the liquid crystal compound in the liquid crystal composition applied onto the substrate.

The orientation regulating force may be imparted by subjecting a member such as a film, which is a material of the substrate, to a treatment for imparting an orientation regulating force. Examples of such a treatment may include a stretching treatment and a rubbing treatment.

In a preferred aspect, the substrate is a stretched film. By using such a stretched film, it is possible to obtain a substrate having an orientation regulating force corresponding to the stretching direction.

The stretching direction of the stretched film may be any direction. Therefore, the stretching may be performed only by diagonal stretching (stretching in a direction that is not parallel to the lengthwise direction nor to the widthwise direction of the substrate), only by transverse stretching (stretching in the widthwise direction of the substrate), or only by longitudinal stretching (stretching in the lengthwise direction of the substrate). Further, these stretching processes may be performed in combination. The stretching ratio may be appropriately set within a range where an orientation regulating force is generated on the surface of the substrate. When a substrate employs a resin having a positive intrinsic birefringence as the material, the molecules are oriented in the stretching direction, so that a slow axis is developed in the stretching direction. The stretching may be performed using a known stretching machine such as a tenter stretching machine.

In a further preferable aspect, the substrate is a diagonally stretched film. Specifically, it is more preferable that the substrate is a long-length film that is stretched in a direction that is not parallel to the lengthwise direction nor to the widthwise direction of the film.

The angle formed between the stretching direction and the widthwise direction of the stretched film in the case where the substrate is a diagonally stretched film may specifically be more than 0° and less than 90°. When such a diagonally stretched film is used, it is possible to efficiently produce an optical film such as a circularly polarizing plate by transferring and laminating an optically anisotropic layered body on a long-length linear polarizer in a roll-to-roll manner.

In a certain aspect, the angle formed between the stretching direction and the widthwise direction of the stretched film may fall within a specific range such as preferably 15°±5°, 22.5°±5°, 45°±5°, or 75°±5°, more preferably 15°±4°, 22.5°±4°, 45°±4°, or 75°±4°, further more preferably 15°±3°, 22.5°±3°, 45°±3°, or 75°±3°. When such an angular relationship is satisfied, it is possible to use the optically anisotropic layered body as a material that enables efficient production of the circularly polarizing plate.

Examples of the application method of the liquid crystal composition may include a curtain coating method, an extrusion coating method, a roll coating method, a spin coating method, a dip coating method, a bar coating method, a spray coating method, a slide coating method, a printing coating method, a gravure coating method, a die coating method, a gap coating method, and a dipping method. The thickness of the layer of the liquid crystal composition to be applied may be appropriately set according to a desired thickness required for the liquid crystal cured layer.

After the step (i), the step (ii) of orienting the liquid crystal compound is performed. By the step (ii), the liquid crystal compound contained in the layer of the liquid crystal composition is oriented in the orientation direction according to the orientation regulating force of the substrate. For example, when a stretched film is used as the substrate, the liquid crystal compound contained in the layer of the liquid crystal composition is oriented in a direction parallel to the stretching direction of the stretched film. In this case, when a long-length substrate film is used as the substrate, it is preferable that the liquid crystal compound is oriented in a diagonal direction which is neither in the lengthwise direction of the substrate nor in the widthwise direction thereof. From the layer of the liquid crystal composition containing the liquid crystal compound oriented in such a diagonal direction, a liquid crystal cured layer having an orientation direction in the diagonal direction is usually obtained. That enables transferring and laminating of the optically anisotropic layered body to a long-length linear polarizer in a roll-to-roll manner, to efficiently produce an optical film such as a circularly polarizing plate.

In some cases, the step (ii) may be achieved immediately by application. But in some other cases, it may be achieved by performing an orientation treatment such as warming after application, as necessary. The conditions for the orientation treatment may be appropriately set according to the properties of the liquid crystal composition to be used. For example, the conditions may be a treatment condition of 30 seconds to 5 minutes under a temperature condition of 50° C. to 160° C.

The step (iii) may be performed immediately after the step (ii). However, the layer of the liquid crystal composition may be dried at any stage after the step (ii) and before the step (iii) as necessary. Such drying may be achieved by a drying method such as natural drying, heat drying, reduced pressure drying, and reduced pressure heating drying. Such drying can remove the solvent from the layer of the liquid crystal composition.

In the step (iii), the layer of the liquid crystal composition is cured by polymerizing the polymerizable compound such as a liquid crystal compound contained in the liquid crystal composition to obtain a liquid crystal cured layer. The method for polymerizing the polymerizable compound may be appropriately selected to suit the properties of the components of the liquid crystal composition, such as the polymerizable compound and the polymerization initiator. For example, a method of irradiating the polymerizable compound with light is preferable. Herein, examples of the light to be irradiated with may include light such as visible light, ultraviolet light, and infrared light. Among these, a method of irradiating the polymerizable compound with ultraviolet light is preferable because the operation is simple.

The ultraviolet irradiation intensity in the case of irradiating with ultraviolet light in the step (iii) is preferably in a range of 0.1 mW/cm$^2$ to 1,000 mW/cm$^2$, and more preferably in a range of 0.5 mW/cm$^2$ to 600 mW/cm$^2$. The ultraviolet irradiation time is preferably in a range of 1 second to 300 seconds, and more preferably in a range of 5 seconds to 100 seconds. The cumulative amount of ultraviolet light (mJ/cm$^2$) is determined by the ultraviolet irradiation intensity (mW/cm$^2$)×the irradiation time (sec) As the ultraviolet irradiation light source, a high-pressure mercury lamp, a metal halide lamp, or a low-pressure mercury lamp may be used.

In the step (iii), it is preferable to adjust the polymerization conditions of the polymerizable compound in order to reduce the residual monomer ratio in the liquid crystal cured layer. For example, in the step (iii), it is preferable to adjust the temperature of the layer of the liquid crystal composition.

Further, the step (iii) is preferably performed under an inert gas atmosphere because the residual monomer ratio tends to be reduced when the step (iii) is performed under such an inert gas atmosphere such as a nitrogen atmosphere, rather than under air.

During the polymerization in the step (iii), the liquid crystal compound usually polymerizes while maintaining the orientation of its molecules. Thus, the polymerization can produce a liquid crystal cured layer containing cured liquid crystal molecules oriented in a direction parallel to the orientation direction of the liquid crystal compound contained in the liquid crystal composition before curing. Thus, for example, when a stretched film is used as the substrate, a liquid crystal cured layer having an orientation direction parallel to the stretching direction of the stretched film can be obtained. Herein, the term "parallel" means that the deviation between the stretching direction of the stretched film and the orientation direction of the cured liquid crystal molecules is usually ±3°, preferably ±1°, and ideally 0°.

In the liquid crystal cured layer produced by the above-described production method, the cured liquid crystal molecules obtained from the liquid crystal compound preferably have orientation regularity of horizontal orientation with respect to the substrate film. For example, when a substrate film having an orientation regulating force is used, the cured liquid crystal molecules can be horizontally oriented in the liquid crystal cured layer. Herein, the term "horizontal orientation" of the cured liquid crystal molecules with respect to the substrate film means that the average direction of the long axis directions of the mesogens of the cured liquid crystal molecules is aligned in a certain direction that is parallel to or close to parallel to the film surface (for example, the angle formed with the film surface is within 5°). Whether or not the cured liquid crystal molecules are horizontally oriented and their alignment directions may be confirmed by measurements using a phase difference meter such as AxoScan (manufactured by Axometrics, Inc.).

In particular, when the cured liquid crystal molecules are formed by polymerizing a liquid crystal compound having a rod-like molecular structure, the long axis direction of the mesogen of the liquid crystal compound is usually the long axis direction of the mesogen of the cured liquid crystal molecules. When a plurality of types of mesogens having different orientation directions are present in the liquid crystal cured layer, as in the case where a polymerizable liquid crystal compound with reverse wavelength dispersion is used as the liquid crystal compound, the direction in which the long axis directions of the mesogens of the longest type of mesogens are aligned is usually the alignment direction.

The method of producing the liquid crystal cured layer as the first optically anisotropic layer described above may further include an optional step. For example, in the production method described above, a multilayer film including a substrate and a liquid crystal cured layer formed on the substrate is usually obtained, and therefore, the production method may include a step of peeling off the substrate as an optional step.

The slow axis direction in which the maximum refractive index in the plane of the first optically anisotropic layer is given may be set to any direction according to the use application of the optically anisotropic layered body. When the optically anisotropic layered body has a long-length shape, the angle formed between the slow axis of the first optically anisotropic layer and the widthwise direction of the optically anisotropic layered body is preferably more than 0° and less than 90°. In a certain aspect, the angle formed between the slow axis of the first optically anisotropic layer and the widthwise direction of the optically anisotropic layered body may be in a particular range, such as preferably 15°±5°, 22.5°±5°, 45°±5°, or 75°±5°, more preferably 15°±4°, 22.5°±4°, 45°±4°, or 75°±4°, and further more preferably 15°±3°, 22.5°±3°, 45°±3°, or 75°±3°. When such an angular relationship is satisfied, the optically anisotropic layered body can be used as a material that enables efficient production of a circularly polarizing plate.

The thickness of the first optically anisotropic layer is not particularly limited, and may be appropriately adjusted so that properties such as in-plane retardation can be set within a desired range. The specific thickness of the first optically anisotropic layer is preferably 0.5 µm or more, and more preferably 1.0 µm or more, and is preferably 10 µm or less, more preferably 7 µm or less, and particularly preferably 6 µm or less.

[6. Structure of Second Optically Anisotropic Layer]

As the second optically anisotropic layer, a liquid crystal cured layer formed of a cured product of a liquid crystal composition containing a polymerizable liquid crystal compound may be used. For the liquid crystal cured layer serving as the second optically anisotropic layer, any liquid crystal cured layer having the above-described desired in-plane retardation may be chosen within the range described as the liquid crystal cured layer as the first optically anisotropic layer.

The cured product of the liquid crystal composition contained in the liquid crystal cured layer as the second optically anisotropic layer may be different from the cured product of the liquid crystal composition contained in the liquid crystal cured layer as the first optically anisotropic layer, but is preferably the same. If the cured product of the liquid crystal composition contained in the liquid crystal cured layer as the first optically anisotropic layer and the cured product of the liquid crystal composition contained in the liquid crystal cured layer as the second optically anisotropic layer are the same as each other, the wavelength dispersion of the in-plane retardation of the first optically anisotropic layer and the wavelength dispersion of the in-plane retardation of the second optically anisotropic layer can be made the same as each other. Therefore, the ratio Re(H450)/Re(H550) of the in-plane retardations of the first optically anisotropic layer and the ratio Re(Q450)/Re(Q550) of the in-plane retardations of the second optically anisotropic layer can be made the same as each other, or the ratio Re(H650)/Re(H550) of the in-plane retardations of the first optically anisotropic layer and the ratio Re(Q650)/Re(Q550) of the in-plane retardations of the second optically anisotropic layer can be made the same as each other.

The liquid crystal cured layer as the second optically anisotropic layer may be produced by the same production method as the production method of the liquid crystal cured layer as the first optically anisotropic layer.

The slow axis direction in which the maximum refractive index in the plane of the second optically anisotropic layer is given may be set to any direction according to the use application of the optically anisotropic layered body. When the optically anisotropic layered body has a long-length shape, the angle formed between the slow axis of the second optically anisotropic layer and the widthwise direction of the optically anisotropic layered body is preferably more than 0° and less than 90°. In a certain aspect, the angle formed between the slow axis of the first optically anisotropic layer and the widthwise direction of the optically anisotropic layered body may fall within a specific range such as preferably 15°±5°, 22.5°±5°, 45°±5°, or 75°±5°, more preferably 15°±4°, 22.5°±4°, 45°±4°, or 75°±4°, and further more preferably 15°±3°, 22.5°±3°, 45°±3°, or 75°±3°. When such an angular relationship is satisfied, it is possible to use the optically anisotropic layered body as a material that enables efficient production of the circularly polarizing plate.

The angle formed between the slow axis direction in the plane of the first optically anisotropic layer and the slow axis direction in the plane of the second optically anisotropic layer is preferably 60°±10°, more preferably 60°±5°, and particularly preferably 60°±3°. Since the angle formed between the slow axis direction in the plane of the first optically anisotropic layer and the slow axis direction in the plane of the second optically anisotropic layer falls within the aforementioned range, the optically anisotropic layered body including the first optically anisotropic layer and the second optically anisotropic layer can function as a wide band λ/4 wave plate, and thus the aforementioned effects such as suppression of coloring of a display surface and suppression of reflection of external light can be exhibited particularly effectively.

The thickness of the second optically anisotropic layer is not particularly limited, and may be appropriately adjusted so that properties such as an in-plane retardation can be set within a desired range. The specific thickness of the second optically anisotropic layer is preferably 0.5 m or more, and more preferably 1.0 µm or more, and is preferably 10 µm or less, more preferably 5 µm or less, and particularly preferably 3 µm or less.

[7. Optional Layer]

The optically anisotropic layered body may further include an optional layer in combination with the first optically anisotropic layer and the second optically anisotropic layer. For example, the optically anisotropic layered body may include, as an optional layer, the substrate that has been used to produce the first optically anisotropic layer or the second optically anisotropic layer. As another example, the optically anisotropic layer may include an adhesive layer, a hard coat layer, or the like as an optional layer.

Figure 2:
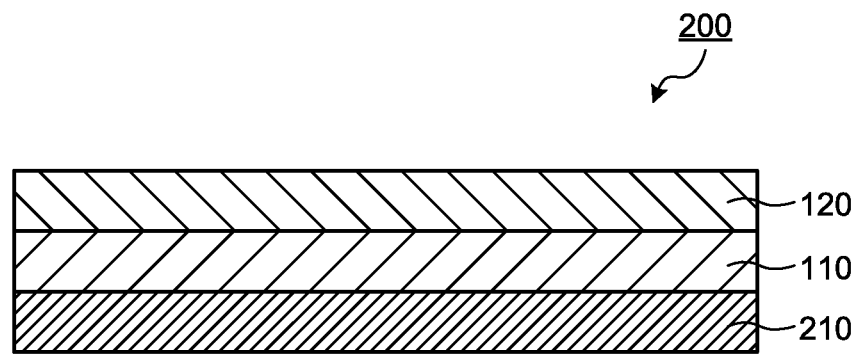
FIG. 2 is a cross-sectional view schematically illustrating a cross section of an optically anisotropic layered body as a second embodiment of the present invention.

FIG. 2 is a cross-sectional view schematically illustrating a cross section of an optically anisotropic layered body 200 as a second embodiment of the present invention.

As illustrated in FIG. 2, the optically anisotropic layered body 200 may include a transparent electroconductive layer 210 as an optional layer in combination with the first optically anisotropic layer 110 and the second optically anisotropic layer 120. In this case, the position of the transparent electroconductive layer 210 is not limited. Therefore, as shown in FIG. 2, the optically anisotropic layered body 200 may include the transparent electroconductive layer 210, the first optically anisotropic layer 110, and the second optically anisotropic layer 120 in this order. Alternatively, the optically anisotropic layered body 200 may include the transparent electroconductive layer 210, the second optically anisotropic layer 120, and the first optically anisotropic layer 110 in this order.

When a touch panel is provided with the optically anisotropic layered body 200 including the transparent electroconductive layer 210, the transparent electroconductive layer 210 may be used as an electrode of the touch panel. When the optically anisotropic layered body 200 is used in an image display device including the touch panel, coloring of a display surface depending on the slant angle of polarized sunglasses and reflection of external light can be suppressed.

As the transparent electroconductive layer 210, a layer containing at least one type of electroconductive material selected from the group consisting of an electroconductive metal oxide, an electroconductive nanowire, a metal mesh, and an electroconductive polymer may be used.

Examples of the electroconductive metal oxide may include indium tin oxide (ITO), indium zinc oxide (IZO), zinc oxide (ZnO), indium tungsten oxide (IWO), indium titanium oxide (ITiO), aluminum zinc oxide (AZO), gallium zinc oxide (GZO), special zinc-based oxide (XZO), and indium gallium zinc oxide (IGZO). As the electroconductive metal oxide, one type thereof may be solely used, and two or more types thereof may also be used in combination at any ratio.

The electroconductive nanowire is an electroconductive substance having a needle shape or a thread shape and has a diameter of nanometer level. The electroconductive nanowire may be a straight line or a curved line. When the electroconductive nanowire forms gaps with another electroconductive nanowire to be in a net shape, a favorable electrically electroconductive path can be formed even by using a small amount of electroconductive nanowire. As a result, a transparent electroconductive layer 210 having small electric resistance can be realized. When electroconductive wires form a net shape, openings are formed in the gaps in the net. Therefore, a high transparent electroconductive layer 210 having high light transmittance can be obtained. When a transparent electroconductive layer 210 including the electroconductive nanowire is used, an optically anisotropic layered body 200 having excellent flex resistance can be obtained.

The ratio of the length L relative to the thickness d of the electroconductive nanowire (aspect ratio: L/d) is preferably 10 to 100,000, more preferably 50 to 100,000, and particularly preferably 100 to 10,000. When an electroconductive nanowire having such a large aspect ratio is used, the electroconductive nanowire favorably intersects with another, and therefore high electroconductivity can be achieved even by using a small amount of electroconductive nanowire. As a result, an optically anisotropic layered body 200 having excellent transparency can be obtained. Herein, the "thickness of the electroconductive nanowire" means a diameter when the cross section of the electroconductive nanowire is a circle, a shortest diameter when the cross section thereof is an ellipse, or the longest diagonal line when the cross section thereof is a polygon. The thickness and length of the electroconductive nanowire may be confirmed by a scanning electron microscope or a transmission electron microscope.

The thickness of the electroconductive nanowire is preferably less than 500 nm, more preferably less than 200 nm, further preferably 10 nm to 100 nm, and particularly preferably 10 nm to 50 nm. By having such a feature, the transparency of the transparent electroconductive layer 210 can be enhanced.

The length of the electroconductive nanowire is preferably 2.5 µm to 1,000 µm, more preferably 10 µm to 500 µm, and particularly preferably 20 µm to 100 µm. By having such a feature, electroconductivity of the transparent electroconductive layer 210 can be enhanced.

Examples of the electroconductive nanowire may include a metal nanowire formed of a metal and an electroconductive nanowire containing a carbon nanotube.

The metal contained in the metal nanowire is preferably a metal having high electroconductivity. Suitable examples of the metal may include gold, platinum, silver, and copper. Among these, silver, copper, and gold are preferable, and silver is more preferable. A material in which the aforementioned metal is subjected to a plating treatment (e.g., gold-plating treatment) may be used. As the material, one type thereof may be solely used, and two or more types thereof may also be used in combination at any ratio.

As the method for producing the metal nanowire, any appropriate method may be used. Examples of the method may include a method in which silver nitrate is reduced in a solution; and a method in which a voltage or current is applied to a precursor surface from a tip of a probe and a metal nanowire is drawn at the tip of the probe to continuously form the metal nanowire. In the method in which silver nitrate is reduced in a solution, a silver salt such as silver nitrate is subjected to liquid-phase reduction in the presence of polyol such as ethylene glycol and polyvinylpyrrolidone, to synthesize a silver nanowire. Mass production of silver nanowire of uniform size can be achieved, for example, in accordance with a method described in Xia, Y. et al., Chem. Mater. (2002), 14, 4736 to 4745, and Xia, Y. et al., Nano letters (2003) 3(7), 955-960.

As the carbon nanotube, for example, a multi-walled carbon nanotube, a double-walled carbon nanotube, a single-walled carbon nanotube, or the like is used. Among these, a single-walled carbon nanotube is preferable from the viewpoint of high electroconductivity. As the method for producing the carbon nanotube, any appropriate method may be used. Preferably, a carbon nanotube produced by an arc discharge method is used. The carbon nanotube produced by an arc discharge method is preferable since it has excellent crystallizability.

The transparent electroconductive layer 210 containing the electroconductive nanowire may be produced by applying and drying an electroconductive nanowire dispersion liquid that has been obtained by dispersing the electroconductive nanowire in a solvent.

Examples of the solvent contained in the electroconductive nanowire dispersion liquid may include water, an alcohol-based solvent, a ketone-based solvent, an ether-based solvent, a hydrocarbon-based solvent, and an aromatic solvent. Among these, water is preferably used from the viewpoint of decreasing environmental impact. As the solvent, one type thereof may be solely used, and two or more types thereof may also be used in combination at any ratio.

The concentration of electroconductive nanowire in the electroconductive nanowire dispersion liquid is preferably 0.1% by weight to 1% by weight. By having such a concentration, a transparent electroconductive layer having excellent electroconductivity and transparency can be formed.

The electroconductive nanowire dispersion liquid may contain an optional component in combination with the electroconductive nanowire and the solvent. Examples of the optional component may include a corrosion inhibitor for inhibiting corrosion of the electroconductive nanowire, a surfactant for inhibiting aggregation of the electroconductive nanowire, and a binder polymer for holding the electroconductive nanowire in the transparent electroconductive layer 210. As the optional component, one type thereof may be solely used, and two or more types thereof may also be used in combination at any ratio.

Examples of the method for applying the electroconductive nanowire dispersion liquid may include a spray coating method, a bar coating method, a roll coating method, a die coating method, an inkjet coating method, a screen coating method, a dip coating method, a slot die coating method, a letterpress printing method, an intaglio printing method, and a gravure printing method. As the drying method, any appropriate drying method (e.g., natural drying, air drying, and heat drying) may be used. For example, in a case of heat drying, the drying temperature may be 100° C. to 200° C. and the drying time may be 1 minute to 10 minutes.

The ratio of the electroconductive nanowire in the transparent electroconductive layer is preferably 80% by weight to 100% by weight, and more preferably 85% by weight to 99% by weight, relative to the total weight of the transparent electroconductive layer. By having such a ratio, a transparent electroconductive layer 210 having excellent electroconductivity and optical transparency can be obtained.

The metal mesh is a metal fine-wire in a lattice shape. It is preferable that a metal contained in the metal mesh is a metal having high electroconductivity. Suitable examples of the metal may include gold, platinum, silver, and copper. Among these, silver, copper, and gold are preferable, and silver is more preferable. As the metal, one type thereof may be solely used, and two or more types thereof may also be used in combination at any ratio.

The transparent electroconductive layer 210 including the metal mesh may be formed, for example, by applying a transparent electroconductive layer-forming composition containing a silver salt, followed by an exposure treatment and a development treatment, to form a metal fine-wire in a specific lattice pattern. The transparent electroconductive layer 210 including the metal mesh may be formed by printing a transparent electroconductive layer-forming composition containing metal fine particles in a specific pattern. For details of such a transparent electroconductive layer and a method for forming the transparent electroconductive layer, Japanese Patent Application Laid-Open Nos. 2012-18634 A and 2003-331654 A may be referred to.

Examples of the electroconductive polymer may include a polythiophene-based polymer, a polyacetylene-based polymer, a polyparaphenylene-based polymer, a polyaniline-based polymer, a polyparaphenylene vinylene-based polymer, a polypyrrole-based polymer, a polyphenylene-based polymer, and a polyester-based polymer modified with an acrylic-based polymer. Among these, a polythiophene-based polymer, a polyacetylene-based polymer, a polyparaphenylene-based polymer, a polyaniline-based polymer, a polyparaphenylene vinylene-based polymer, and a polypyrrole-based polymer are preferable.

Among these, a polythiophene-based polymer is particularly preferable. When the polythiophene-based polymer is used, the transparent electroconductive layer 210 having excellent transparency and chemical stability can be obtained. Specific examples of the polythiophene-based polymers may include polythiophene; poly(3-CL-s alkylthiophene) such as poly(3-hexylthiophene); poly(3,4-(cyclo)alkylenedioxythiophene) such as poly(3,4-ethylenedioxythiophene), poly(3,4-propylenedioxythiophene), and poly[3,4-(1,2-cyclohexylene)dioxythiophene]; and polythienylenevinylene.

As the electroconductive polymer, one type thereof may be solely used, and two or more types thereof may also be used in combination at any ratio.

The electroconductive polymer is preferably polymerized in the presence of an anionic polymer. For example, the polythiophene-based polymer is preferably oxidatively polymerized in the presence of an anionic polymer. Examples of the anionic polymer may include a polymer having a carboxyl group, a sulfonic acid group, or a salt thereof. Preferably, an anionic polymer having a sulfonic acid group, such as polystyrene sulfonic acid, is used.

The transparent electroconductive layer 210 containing the electroconductive polymer may be formed by, for example, application and drying of an electroconductive composition containing the electroconductive polymer. For the transparent electroconductive layer 210 containing the electroconductive polymer, Japanese Patent Application Laid-Open No. 2011-175601 A may be referred to.

The transparent electroconductive layer 210 may be formed on the entirety of the optically anisotropic multilayer body 200 in the in-plane direction. Alternatively, the transparent electroconductive layer 210 may be patterned into a specific pattern. As the shape of the pattern of the transparent electroconductive layer 210, a pattern that favorably operates as a touch panel (for example, a capacitance type touch panel) is preferable. Examples of the pattern may include patterns described in Japanese Patent Application Laid-Open No. 2011-511357 A, Japanese Patent Application Laid-Open No. 2010-164938 A, Japanese Patent Application Laid-Open No. 2008-310550 A, Japanese Patent Application Laid-Open No. 2003-511799 A, and Japanese Patent Application Laid-Open No. 2010-541109 A.

The thickness of the transparent electroconductive layer 210 is preferably 0.01 μm to 10 μm, more preferably 0.05 μm to 3 μm, and particularly preferably 0.1 μm to 1 μm.

The total light transmittance of the transparent electroconductive layer is preferably 85% or more, more preferably 90% or more, and even more preferably 95% or more.

[8. Properties of Optically Anisotropic Layered Body]

It is preferable that the optically anisotropic layered body has excellent transparency. Specifically, the total light transmittance of the optically anisotropic layered body is preferably 80% or more, more preferably 85% or more, and particularly preferably 90% or more. The haze of the optically anisotropic layered body is preferably 5% or less, more preferably 3% or less, particularly preferably 1% or less, and ideally 0%. The light transmittance may be measured by using a spectrophotometer (ultraviolet-visible-near-infrared spectrophotometer "V-570" manufactured by JASCO Corporation) in accordance with JIS K0115. As the haze, an average value of haze values measured at five points by using a "turbidimeter NDH-300A" manufactured by Nippon Denshoku Industries Co., Ltd., in accordance with JIS K7361-1997 may be adopted.

[9. Method for Producing Optically Anisotropic Layered Body]

The optically anisotropic layered body may be produced by, for example, a production method including a step of bonding the first optically anisotropic layer to the second optically anisotropic layer to obtain the optically anisotropic layered body.

Specifically, when the first optically anisotropic layer and the second optically anisotropic layer are liquid crystal cured layers, the optically anisotropic layered body may be produced by a production method including a step of forming the first optically anisotropic layer on a first substrate as a liquid crystal cured layer to prepare a first multilayer film including the first substrate and the first optically anisotropic layer;

a step of forming the second optically anisotropic layer on a second substrate as a liquid crystal cured layer to prepare a second multilayer film including the second substrate and the second optically anisotropic layer; and a step of bonding the first optically anisotropic layer to the second optically anisotropic layer to obtain the optically anisotropic layered body.

In the bonding of the first optically anisotropic layer to the second optically anisotropic layer, an appropriate adhesive may be used. This adhesive includes not only an adhesive in a narrow sense (an adhesive of which the shear storage elastic modulus at 23° C. after irradiation with an energy ray or after a heating treatment is 1 MPa to 500 MPa) but also a tackiness agent of which the shear storage elastic modulus at 23° C. is less than 1 MPa. In particular, the same adhesive as an adhesive used for a circularly polarizing plate described below is preferably used.

The aforementioned method for producing an optically anisotropic layered body may include an optional step in addition to the aforementioned steps. For example, the aforementioned production method may include a step of peeling the first and second substrates, a step of providing an optional layer such as a transparent electroconductive layer, and the like.

[10. Circularly Polarizing Plate]

Figure 3:
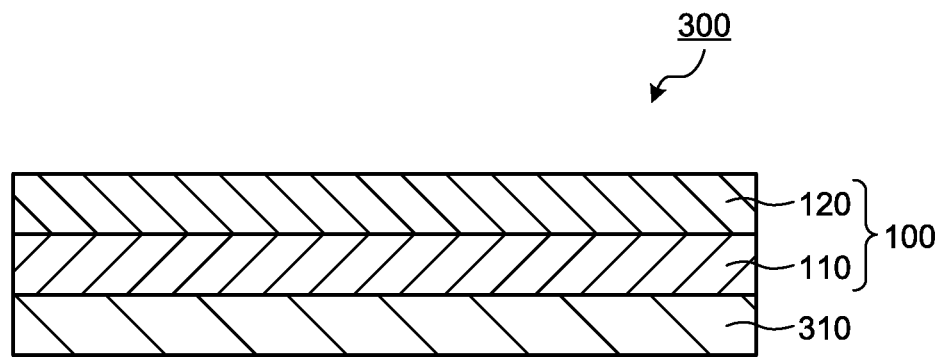
FIG. 3 is a cross-sectional view schematically showing a cross section of a circularly polarizing plate as a third embodiment of the present invention.

FIG. 3 is a cross-sectional view schematically showing a cross section of a circularly polarizing plate 300 as a third embodiment of the present invention.

As shown in FIG. 3, the circularly polarizing plate 300 includes a linear polarizer 310 and an optically anisotropic layered body 100. The circularly polarizing plate 300 includes the linear polarizer 310, a first optically anisotropic layer 110, and a second optically anisotropic layer 120 in this order.

The linear polarizer 310 may be a known linear polarizer used in devices such as liquid crystal display devices and other optical devices. Examples of the linear polarizer 310 may include a film obtained by giving a polyvinyl alcohol film an absorption treatment with iodine or dichromatic dye and then uniaxially stretching the polyvinyl alcohol film in a boric acid bath; and a film obtained by giving a polyvinyl alcohol film an absorption treatment with iodine or dichromatic dye, stretching the polyvinyl alcohol film, and then modifying a part of polyvinyl alcohol units in the molecular chain thereof into polyvinylene units. Other examples of the linear polarizer 310 may include a polarizer having a function of separating polarized light into reflected light and transmitted light, such as a grid polarizer, a multilayer polarizer, or a cholesteric liquid crystal polarizer. Among these, a polarizer containing polyvinyl alcohol is preferably used as the linear polarizer 310.

The linear polarizer 310 may be a long-length film. When the linear polarizer 310 is a long-length film, the polarized light absorption axis of the linear polarizer 310 is parallel or perpendicular to the widthwise direction of the linear polarizer 310. The long-length linear polarizer 310 may be bonded to the above-described optically anisotropic layered body 100 in a roll-to-roll manner to easily produce the long-length circularly polarizing plate 300.

When natural light is allowed to be incident on the linear polarizer 310, only one polarized light is transmitted. The degree of polarization of the linear polarizer 310 is not particularly limited, but is preferably 98% or more, and more preferably 99% or more.

The thickness of the linear polarizer 310 is preferably 5 μm to 80 μm.

Figure 4:
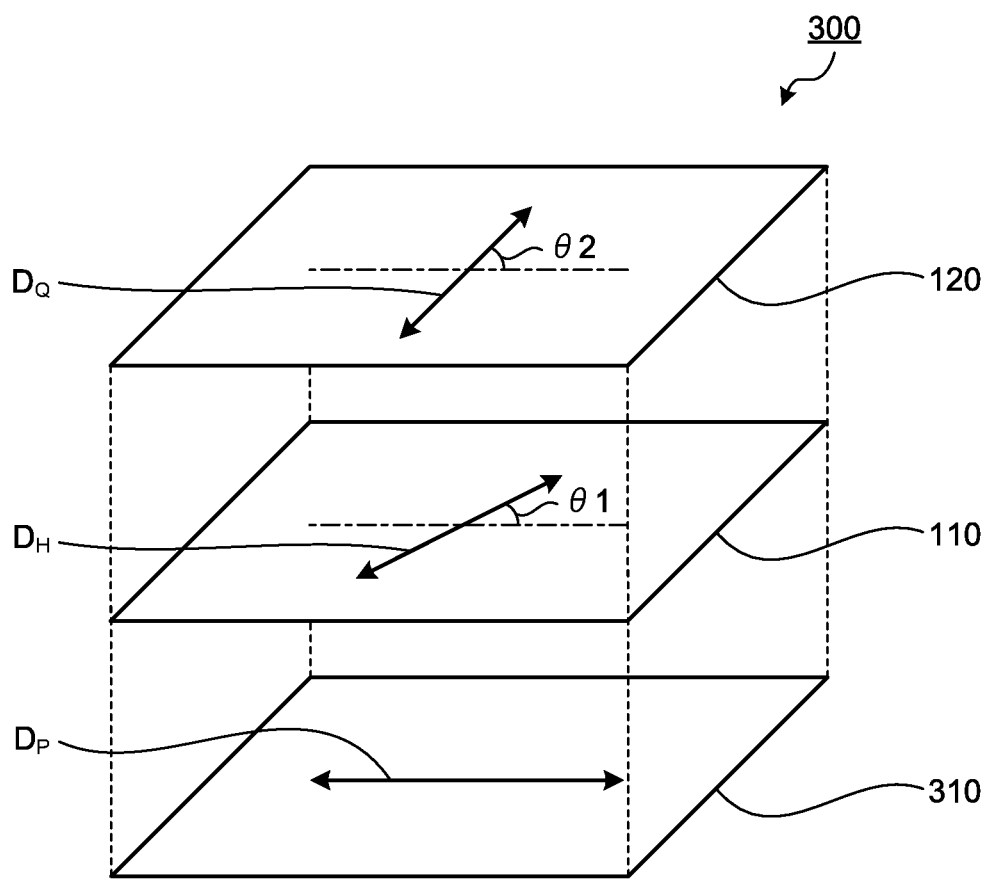
FIG. 4 is an exploded perspective view illustrating a disassembled state of the circularly polarizing plate as the third embodiment of the present invention.

FIG. 4 is an exploded perspective view illustrating a disassembled state of the circularly polarizing plate 300 as the third embodiment of the present invention. In FIG. 4, a virtual line parallel to a polarized light absorption axis $D_P$ of the linear polarizer 310 is shown by a dot-and-dash line on the first optically anisotropic layer 110 and the second optically anisotropic layer 120.

As shown in FIG. 4, an angle formed between the polarized light absorption axis $D_P$ of the linear polarizer 310 and a slow axis direction $D_H$ in the plane of the first optically anisotropic layer 110 is represented by "θ1", and an angle formed between the polarized light absorption axis $D_P$ of the linear polarizer 310 and a slow axis direction $D_Q$ in the plane of the second optically anisotropic layer 120 is represented by "θ2". In this case, θ1 and θ2 satisfy −90°<θ1<90° and −90°<θ2<90°, respectively.

Further, it is preferable that the angles θ1 and θ2 have the same sign and satisfy the following expressions (27) and (28):

$$|θ1|=15°±5°  \quad (27), \text{and}$$

$$|θ2|=75°±10°  \quad (28).$$

The expression (27) will be described in detail. The absolute value |θ1| of the angle θ1 is usually 15°±5°, preferably 15°±3°, and more preferably 15°±1°.

The expression (28) will be described in detail. The absolute value |θ2| of the angle θ2 is usually 75°±10°, preferably 75°±6°, and more preferably 75°±2°.

When such requirements are satisfied, linearly polarized light in a wide wavelength range that has passed through the linear polarizer 310 can be converted into circularly polarized light by the optically anisotropic layered body 100 including the first optically anisotropic layer 110 and the second optically anisotropic layer 120. Therefore, when the circularly polarizing plate 300 is provided to an image display device, the aforementioned effects such as suppression of coloring of a display surface and suppression of reflection of external light can be particularly effectively exerted.

Alternatively, it is preferable that the angles θ1 and θ2 have the same sign and satisfy the following expressions (29) and (30):

$$|θ1|=75°±10°  \quad (29), \text{and}$$

$$|θ2|=15°±5°  \quad (30).$$

The expression (29) will be described in detail. The absolute value |θ1| of the angle θ1 is usually 75°±10°, preferably 75°±6°, and more preferably 75°±2°.

The expression (30) will be described in detail. The absolute value |θ2| of the angle θ2 is usually 15°±5°, preferably 15°±3°, and more preferably 15°±1°.

When such requirements are satisfied, linearly polarized light in a wide wavelength range that has passed through the linear polarizer 310 can be converted into circularly polarized light by the optically anisotropic layered body 100 including the first optically anisotropic layer 110 and the second optically anisotropic layer 120. Therefore, when the circularly polarizing plate 300 is provided to an image display device, the aforementioned effects such as suppression of coloring of a display surface and suppression of reflection of external light can be particularly effectively exerted.

In a certain product according to the present invention (circularly polarizing plate, etc.), angular relationships formed between directions of in-plane optical axes (slow axis, polarized light transmission axis, polarized light absorption axis, etc.) and geometric directions (the lengthwise direction and widthwise direction of a film, etc.) are defined that a shift in a certain direction is positive and a shift in another direction is negative. The positive and negative directions are commonly defined in the components of the certain product. For example, in a circularly polarizing plate, "the direction of slow axis of the first optically anisotropic layer relative to the direction of polarized light absorption axis of the linear polarizer is 15° and the direction of slow axis of the second optically anisotropic layer relative to the direction of polarized light absorption axis of the linear polarizer is 75°" represents the following two cases:

When the circularly polarizing plate is observed from a surface thereof, the direction of slow axis of the first optically anisotropic layer shifts clockwise by 15° from the direction of polarized light absorption axis of the linear polarizer and the direction of slow axis of the second optically anisotropic layer shifts clockwise by 75° from the direction of polarized light absorption axis of the linear polarizer.

When the circularly polarizing plate is observed from a surface thereof, the direction of slow axis of the first optically anisotropic layer shifts counterclockwise by 15° from the direction of polarized light absorption axis of the linear polarizer and the direction of slow axis of the second optically anisotropic layer shifts counterclockwise by 75° from the direction of polarized light absorption axis of the linear polarizer.

The circularly polarizing plate 300 may further include an adhesive layer (not shown) for bonding the linear polarizer 310 and the optically anisotropic layered body 100 to each other. As the adhesive layer, a layer of a tackiness agent may be used, but it is preferable to use a layer formed by curing a curable adhesive. As the curable adhesive, a thermosetting adhesive may be used, but it is preferable to use a photocurable adhesive. The photocurable adhesive for use may be one containing a polymer or a reactive monomer. The adhesive may contain one or more of a solvent, a photopolymerization initiator, other additives, and the like as necessary.

The photocurable adhesive is an adhesive that is capable of being cured by irradiation with light such as visible light, ultraviolet light, and infrared light. Among these, an adhesive which is capable of being cured by ultraviolet light is preferable because of its simple operation.

In a preferred aspect, the photocurable adhesive contains 50% by weight or more of a (meth)acrylate monomer having a hydroxyl group. Herein, when "the adhesive contains a monomer in a certain ratio", the ratio of the monomer is the total ratio of both the monomer existing as the monomer and the monomer already polymerized to become a part of the polymer.

Examples of the (meth)acrylate monomers having a hydroxyl group may include hydroxyalkyl (meth)acrylates such as 4-hydroxybutyl (meth)acrylate, 2-hydroxy-3-phenoxypropyl (meth)acrylate, 2-hydroxyethyl (meth)acrylate, 2-hydroxypropyl (meth)acrylate, 2-hydroxy-3-acryloxypropyl methacrylate, 2-hydroxyethyl acrylate, and 2-hydroxypropyl (meth)acrylate. One type thereof may be solely used, and two or more types thereof may also be used in combination at any ratio. When used in combination, the containing ratio is the ratio of the total amount.

Examples of monomers which the photocurable adhesive may contain other than (meth)acrylate monomers having a hydroxyl group may include a (meth)acrylate monomer having no monofunctional or multifunctional hydroxyl group, and a compound containing one or more epoxy groups per molecule.

The adhesive may further contain optional components in a range that does not significantly impair the effects of the present invention. Examples of the optional components may include a photopolymerization initiator, a crosslinking agent, an inorganic filler, a polymerization inhibitor, a colored pigment, a dye, an antifoaming agent, a leveling agent, a dispersant, a light diffusing agent, a plasticizer, an antistatic agent, a surfactant, a non-reactive polymer (an inactive polymer), a viscosity modifier, and a near-infrared absorber. One type thereof may be solely used, and two or more types thereof may also be used in combination at any ratio.

Examples of the photopolymerization initiator may include a radical initiator and a cationic initiator. Examples of the cationic initiator may include Irgacure 250 (diallyl iodonium salts, manufactured by BASF). Examples of the radical initiator may include Irgacure 184, Irgacure 819, and Irgacure 2959 (all of which are manufactured by BASF).

The thickness of the adhesive layer is preferably 0.5 µm or more, and more preferably 1 µm or more, and is preferably 30 µm or less, more preferably 20 µm or less, and still more preferably 10 µm or less. When the thickness of the adhesive layer falls within the aforementioned range, good adhesion can be achieved without impairing the optical properties of the optically anisotropic layered body.

The circularly polarizing plate 300 may further include an optional layer. Examples of the optional layer may include a polarizer protective film layer (not shown). As the polarizer protective film layer, any transparent film layer may be used. Among these, a film layer formed of a resin having excellent transparency, mechanical strength, thermal stability, moisture shielding property, and the like is preferable. Examples of such a resin may include an acetate resin such as triacetyl cellulose, a polyester resin, a polyethersulfone resin, a polycarbonate resin, a polyamide resin, a polyimide resin, a chain olefin resin, a cyclic olefin resin, and a (meth)acrylic resin.

Examples of the optional layer which may be contained in the circularly polarizing plate 300 may include a hard coat layer such as an impact-resistant polymethacrylate resin layer, a mat layer for improving the sliding property of the film, an anti-reflection layer, and an anti-fouling layer.

As these layers, one layer thereof may be solely provided, and two or more layers thereof may also be provided.

The circularly polarizing plate 300 may be produced by a production method including bonding the linear polarizer 310 and the optically anisotropic layered body 100.

[11. Image Display Device]

The image display device of the present invention includes an image display element and the circularly polarizing plate described above. In the image display device, the circularly polarizing plate is usually provided on the viewing side of the image display element. In this instance, the orientation of the circularly polarizing plate may be set to any direction according to the use application of the circularly polarizing plate. Therefore, the image display device may include the optically anisotropic layered body, the linear polarizer, and the image display element in this order. In another aspect, the image display device may also include the linear polarizer, the optically anisotropic layered body, and the image display element in this order.

There are various types of image display devices depending on the type of image display element. Representative examples thereof may include a liquid crystal display device including a liquid crystal cell as an image display element, and an organic EL display device including an organic electroluminescent element as an image display element (hereinafter referred to as an "organic EL element" as appropriate).

Hereinafter, a preferable embodiment of the image display device will be described with reference to the drawings.

Figure 5:
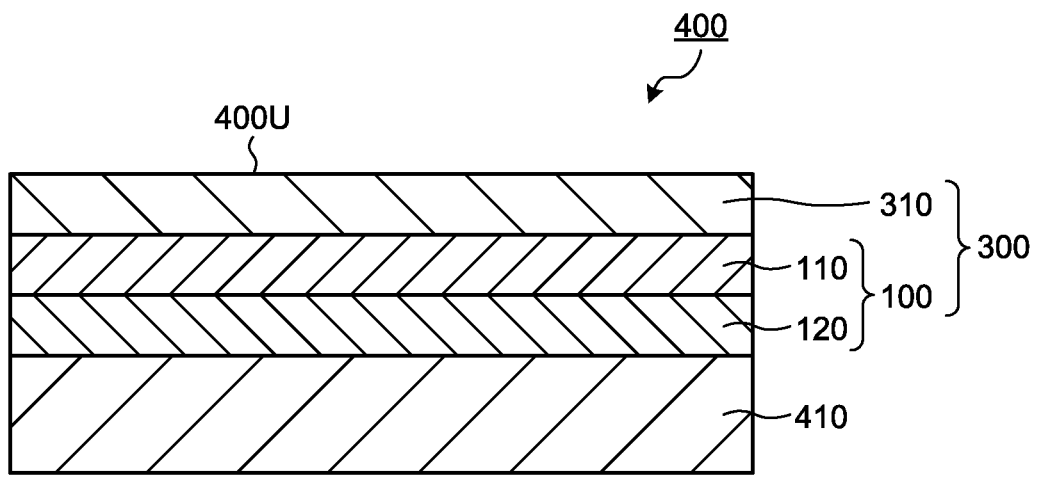
FIG. 5 is a cross-sectional view schematically showing an organic EL display device as an image display device according to a fourth embodiment of the present invention.

FIG. 5 is a cross-sectional view schematically showing an organic EL display device 400 as an image display device according to a fourth embodiment of the present invention.

As shown in FIG. 5, the organic EL display device 400 includes, in this order, an organic EL element 410 as an image display element; an optically anisotropic layered body 100 including a second optically anisotropic layer 120 and a first optically anisotropic layer 110; and a linear polarizer 310.

In the organic EL element 410, a transparent electrode layer, a light emitting layer, and an electrode layer are provided in this order, and a voltage is applied from the transparent electrode layer and the electrode layer, so that the light emitting layer can emit light. Examples of materials constituting the organic light emitting layer may include a polyparaphenylenevinylene-based material, a polyfluorene-based material, and a polyvinylcarbazole-based material. In addition, the light emitting layer may have a layered body of a plurality of layers having different emission colors, or a mixed layer in which a layer containing a dye is doped with a different dye. Further, the organic EL element 410 may include functional layers such as a hole injection layer, a hole transport layer, an electron injection layer, an electron transport layer, an equipotential surface formation layer, and an electronic charge generation layer.

As to such an organic EL display device 400, when a display surface 400U is viewed in a front direction thereof, glare of the display surface 400U due to reflection of external light can be suppressed by the circularly polarizing plate 300 including the optically anisotropic layered body 100 and the linear polarizer 310.

Specifically, when light is made incident from the outside of the device, only linearly polarized light constituting a portion of the light passes through the linear polarizer 310 and is then converted into circularly polarized light by passing through the optically anisotropic layer 100. The circularly polarized light is reflected on a component that reflects light in the display device (a reflection electrode (not shown) in the organic EL element 410, etc.), and then passes through the optically anisotropic layered body 100 again, resulting in linearly polarized light having a vibration direction orthogonal to a vibration direction of incident linearly polarized light. Thus, the light does not pass through the liner polarizer 310. Accordingly, a function of suppressing reflection is achieved (see Japanese Patent Application Laid-Open No. 9-127885 A for a principle of suppression of reflection in the organic EL display device).

As to the organic EL display device 400, the first optically anisotropic layer 110 and the second optically anisotropic layer 120 contained in the optically anisotropic layered body 100 have in-plane retardations Re satisfying the aforementioned requirements. Consequently, the circularly polarizing plate 300 can effectively exert a function of suppressing reflection in a wide wavelength range. Accordingly, the organic EL display device 400 can effectively suppress reflection of external light on the display surface 400U of the organic EL display device 400 in the front direction. Thus, excellent visibility can be achieved.

The function of suppressing reflection may be evaluated by the lightness L* of light reflected on the display surface 400U in the front direction when the display surface 400U of the organic EL display device 400 is irradiated with light. Herein, the lightness L* is a lightness in L*a*b* color space. Smaller value of the lightness L* is indicative of better function of suppressing reflection of light on the display surface 400U.

Figure 6:
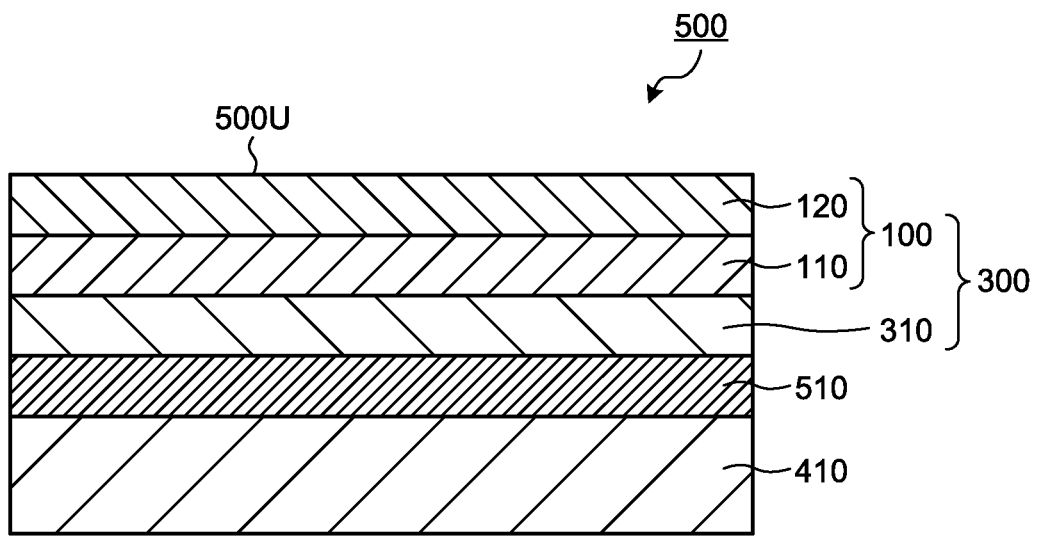
FIG. 6 is a cross-sectional view schematically showing an organic EL display device as an image display device according to a fifth embodiment of the present invention.

FIG. 6 is a cross-sectional view schematically showing an organic EL display device 500 as an image display device according to a fifth embodiment of the present invention.

As shown in FIG. 6, the organic EL display device 500 includes, in this order, an organic EL element 410 as an image display element; a λ/4 wave plate 510; a linear polarizer 310; and an optically anisotropic layered body 100 including a second optically anisotropic layer 120 and a first optically anisotropic layer 110.

As the λ/4 wave plate 510, a member that is capable of converting linearly polarized light having passed through the linear polarizer 310 into circularly polarized light may be used. For example, a film having an in-plane retardation Re in the same range as that of the in-plane retardation Re which the second optically anisotropic layer 120 may have may be used as such a λ/4 wave plate 510. The λ/4 wave plate 510 is provided so that an angle of the slow axis of the λ/4 wave plate relative to the polarized light absorption axis of the linear polarizer 310 is 45° or an angle close to 45° (for example, preferably 45°±5°, more preferably 45°±4°, and particularly preferably 45°±3°). By having such a feature, the function of a circularly polarizing plate is expressed by a combination of the λ/4 wave plate 510 and the linear polarizer 310. Thus, glare of a display surface 500U due to reflection of external light can be suppressed.

In such an organic EL display device 500, an image is displayed with light that has been emitted from the organic EL element 410, and passed through the λ/4 wave plate 510, the linear polarizer 310, and the optically anisotropic layered body 100. Therefore, the light for displaying an image is linearly polarized light at the time of passing through the linear polarizer 310, but is converted into circularly polarized light by passing through the optically anisotropic layered body 100. Therefore, as to the organic EL display device 500 described above, the image is displayed with circularly polarized light. Accordingly, the image can be visually recognized when the display surface 500U is viewed through polarized sunglasses.

In the organic EL display device 500 described above, the first optically anisotropic layer 110 and the second optically anisotropic layer 120 contained in the optically anisotropic layered body 100 have in-plane retardations Re satisfying the aforementioned requirements. Therefore, the optically anisotropic layered body 100 can convert the light for displaying the image into ideal circularly polarized light in a wide wavelength range. Therefore, as to this organic EL display device 500, when the display surface 500U is viewed in the front direction of the display surface 500U of the organic EL display device 500 through polarized sunglasses, light with any wavelength can uniformly pass through the polarized sunglasses without depending on the slant angle of the polarized sunglasses. Accordingly, coloring of the display surface 500U depending on the slant angle of the polarized sunglasses can be suppressed. Consequently, a change of toning of the display surface depending on the slant angle of the polarized sunglasses that occurs when the polarized sunglasses are slanted can be suppressed.

Figure 7:
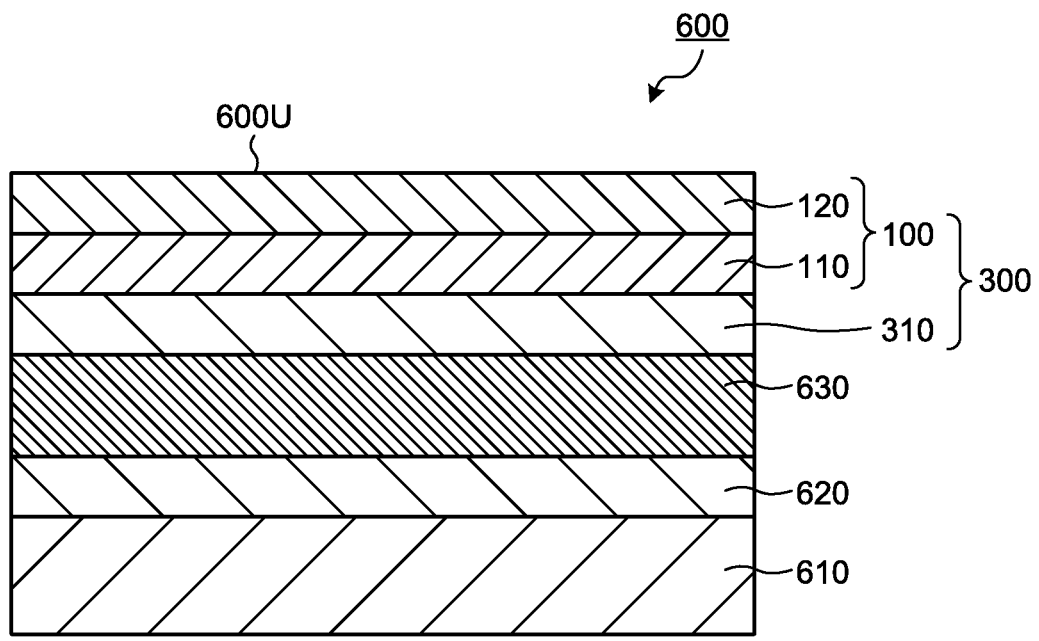
FIG. 7 is a cross-sectional view schematically showing a liquid crystal display device as an image display device according to a sixth embodiment of the present invention.

FIG. 7 is a cross-sectional view schematically showing a liquid crystal display device 600 as an image display device according to a sixth embodiment of the present invention.

As shown in FIG. 7, the liquid crystal display device 600 includes, in this order, a light source 610; a light source side linear polarizer 620; a liquid crystal cell 630 as an image display element; a linear polarizer 310 as a viewing side linear polarizer; and an optically anisotropic layered body 100 including a first optically anisotropic layer 110 and a second optically anisotropic layer 120.

The liquid crystal cell 630 may employ any mode of liquid crystal cell, for example, in-plane switching (IPS) mode, vertical alignment (VA) mode, multi-domain vertical alignment (MVA) mode, continuous spin wheel alignment (CPA) mode, hybrid alignment nematic (HAN) mode, twisted nematic (TN) mode, supertwisted nematic (STN) mode, optical compensated bend (OCB) mode, etc.

On the liquid crystal display device 600, an image is displayed with light having been emitted from the light source 610 and having passed through the light source side linear polarizer 620, the liquid crystal cell 630, the linear polarizer 310, and the optically anisotropic layered body 100. Therefore, the light for displaying an image is linearly polarized light at the time of passing through the linear polarizer 310, but is converted into circularly polarized light by passing through the optically anisotropic layered body 100. Thus, as to the liquid crystal display device 600 described above, since an image is displayed with circularly polarized light, it is possible to visually recognize the image when the display surface 600U is viewed through polarized sunglasses.

In the liquid crystal display device 600 described above, the first optically anisotropic layer 110 and the second optically anisotropic layer 120 contained in the optically anisotropic layered body 100 have the in-plane retardations Re satisfying the above-described requirements. Therefore, the optically anisotropic layered body 100 can convert the light for displaying an image into ideal circularly polarized light in a wide wavelength range. Thus, similarly to the organic EL display device 500 described in the fifth embodiment, in the liquid crystal display device 600 according to the present embodiment, it is possible to suppress coloring of the display surface 600U depending on the slant angle of the polarized sunglasses. Consequently, a change of toning of the display surface depending on the slant angle of the polarized sunglasses that occurs when the polarized sunglasses are slanted can be suppressed.

The function of suppressing coloring may be evaluated by an average value of chroma C* of the display surfaces 500U and 600U. Herein, the chroma C* is a chroma C* in L*C*h color space. The chroma C* is represented by the following expression (X) using the chromaticities a* and b* in L*a*b color space. Smaller value of the average of the chroma C* is indicative of better function of suppressing coloring of the display surface 600U depending on the slant angle of the polarized sunglasses.

$$C^* = \sqrt{(a^*)^2 + (b^*)^2} \quad (X)$$

The average value of the chroma C* may be measured by the following method.

The display surface of the image display device is observed in the front direction thereof through polarized sunglasses to measure the chroma C*. In measurement of the chroma C*, the slant angle of the polarized light absorption axis of the polarized sunglasses relative to a reference direction parallel to the display surface of the image display device (e.g., the direction of the polarized light absorption axis of the linear polarizer of the image display device) is changed within a range of 0° or more and less than 360° by an increment of 5°. The average value of the chroma C* values measured at each slant angle is calculated.

EXAMPLES

Hereinafter, the present invention will be specifically described with reference to Examples. However, the present invention is not limited to Examples described below. The present invention may be freely modified for implementation without departing from the scope of claims of the present invention and the scope of their equivalents. Unless otherwise specified, "%" and "part(s)" that represent an amount in the following description are on the basis of weight. Unless otherwise specified, operations described below were performed under conditions of normal temperature and normal pressure in an atmospheric air.

[Evaluation Method]
[Method for Measuring Phase Difference Properties of Optically Anisotropic Layer]

From a multilayer film including a stretched substrate and an optically anisotropic layer was cut out a sample piece of an A4 size having a long side parallel to the lengthwise direction of the multilayer film and a short side parallel to the widthwise direction of the multilayer film.

A surface of an optically isotropic glass plate was bonded to a surface on the optically anisotropic layer side of the sample piece by using a hand-application roller. The bonding was performed through a tackiness agent layer ("CS9621" manufactured by Nitto Denko Corporation). The glass plate had a size of 75 mm×25 mm. In the bonding, the long side of the glass plate was parallel to the long side of the sample piece. An excess portion of the sample piece that was protruded from the glass plate was cut off by a cutter. Thus, a layered body having a layer configuration of (glass plate)/(tackiness agent layer)/(optically anisotropic layer)/(stretched substrate) was obtained.

From the layered body, the stretched substrate was peeled, to obtain a phase difference plate for measurement having a layer configuration of (glass plate)/(tackiness agent layer)/(optically anisotropic layer).

The in-plane retardations Re(450), Re(550), Re(590), and Re(650) of the optically anisotropic layer at wavelengths of 450 nm, 550 nm, 590 nm, and 650 nm, respectively, and the slow axis direction were measured using the obtained phase difference plate for measurement by a phase difference measurement device ("AxoScan" manufactured by Axometrics, Inc.). The Re(590), Re(450)/Re(550), and Re(650)/Re(550) of the optically anisotropic layer were determined. The angle of the slow axis of the optically anisotropic layer relative to the widthwise direction of the film was determined.

[Method for Calculating Chroma Average Value by Simulation]

The following evaluation model including an optically anisotropic layered body was formed by using software for simulation "LCD Master" manufactured by Shintech.

In the evaluation model for simulation, an image display device in which a surface on a side of a first optically anisotropic layer of the optically anisotropic layered body was bonded to a display surface of a commercially available liquid crystal display device including a light source, a light source-side linear polarizer, a liquid crystal cell, and a visual recognition-side linear polarizer in this order ("iPad Air" manufactured by Apple Inc.) was set. The manner of bonding was set such that the angle θ1 and the angle θ2 were 15.0° and 75.0°, respectively, wherein the angle θ1 is an angle of the slow axis of the first optically anisotropic layer of the optically anisotropic layered body relative to the polarized light absorption axis of the visual recognition-side linear polarizer as viewed in the thickness direction, and the angle θ2 is an angle of a slow axis of a second optically anisotropic layer of the optically anisotropic layered body relative to the polarized light absorption axis of the visual recognition-side linear polarizer as viewed in the thickness direction. The image display device included the second optically anisotropic layer, the first optically anisotropic layer, the visual recognition-side linear polarizer, and the liquid crystal cell as an image display element in this order from a visual recognition side.

Figure 8:
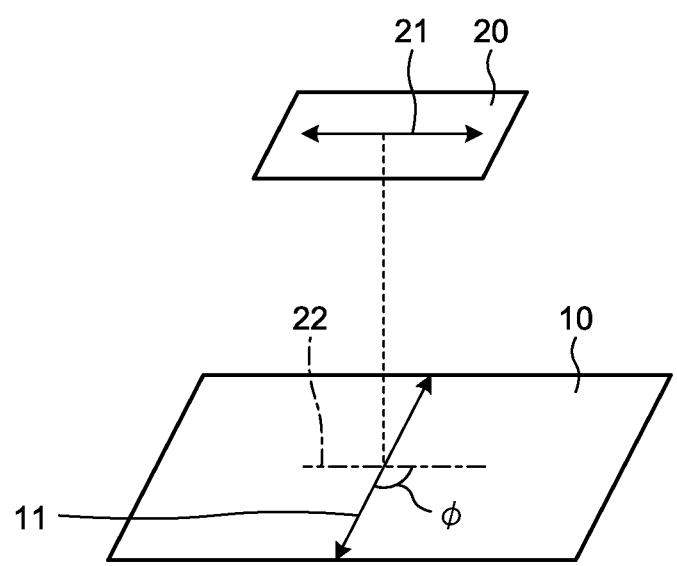
FIG. 8 is a perspective view schematically illustrating a state of the evaluation model designed for calculation of chroma in simulation in Examples and Comparative Examples.

FIG. 8 is a perspective view schematically illustrating a state of the evaluation model designed for calculation of chroma in simulation in Examples and Comparative Examples. In FIG. 8, a line 22 parallel to a polarized light absorption axis 21 of polarized sunglasses 20 is shown by a dot-and-dash line on a display surface 10 of an image display device.

A white image was assumed to be displayed on the image display device. A chroma C* of the image was calculated, wherein the chroma C* was of the image that is observed when the display surface 10 was viewed in a front direction through the polarized sunglasses 20 as shown in FIG. 8. For the polarized sunglasses 20, an ideal polarizing film was set. Herein, the ideal polarizing film is a film through which all linearly polarized light having a vibration direction parallel to a certain direction is allowed to pass and linearly polarized light having a vibration direction perpendicular to the direction is not at all allowed to pass.

In calculation of the chroma C*, the slant angle φ of the polarized light absorption axis 21 of the polarized sunglasses 20 relative to a certain reference direction 11 on the display surface 10 was changed within a range of 0° or more and less than 360° by an increment of 5°. The average value of the calculated chroma C* was calculated as a chroma average value. Smaller value of the chroma average is indicative of better result in which coloring is suppressed.

[Method for Visually Evaluating Coloring of Image]

A liquid crystal display device including a light source, a light source-side linear polarizer, a liquid crystal cell of IPS mode, and a visual recognition-side linear polarizer in this order ("iPad" manufactured by Apple Inc.) was prepared. The display surface portion of the liquid crystal display device was disassembled, so that the visual recognition-side linear polarizer of the liquid crystal display device was exposed. To the exposed visual recognition-side linear polarizer, the surface on the first optically anisotropic layer side of the optically anisotropic layered body produced in each of Examples and Comparative Examples described below was bonded by using a hand-application roller. The bonding was performed through a tackiness agent layer ("CS9621" manufactured by Nitto Denko Corporation). The bonding was performed such that the angle of the slow axis of the first optically anisotropic layer relative to the polarized light absorption axis of the visual recognition-side linear polarizer of the liquid crystal display device as viewed in the thickness direction was 15.0°, and the angle of the slow axis of the second optically anisotropic layer relative to the polarized light absorption axis of the visual recognition-side linear polarizer of the liquid crystal display device as viewed in the thickness direction was 75.0° Thus, an image display device for evaluation was obtained.

A white image was displayed on the image display device. The display surface was visually observed in the front direction of the display surface through polarized sunglasses. During the observation, the image display device was rotated once around a rotation axis perpendicular to the display surface. A change in color of the image to be observed depending on the rotation angle was evaluated. Smaller change in color depending on the rotation angle is indicative of better result.

The aforementioned evaluation was performed by many observers. Each observer ranked the results in all experimental examples (Examples and Comparative Examples) of Experimental Example Groups I to IV, and gave points thereto corresponding to the ranking (first place: 61 points, second place: 60 points, . . . , last place: 1 point). The totals of the points determined by the observers in experimental examples were sorted in terms of points. The higher order groups in the range of the points were evaluated in the order of A, B, C, D, and E.

[Method for Calculating Lightness L* by Simulation]

The following evaluation model including a circularly polarizing plate was formed by using software for simulation "LCD Master" manufactured by Shintech.

In the evaluation model for simulation, a structure in which a surface on a second optically anisotropic layer side of the circularly polarizing plate was bonded to a flat reflective surface of a mirror having the reflective surface was set. Therefore, in this evaluation model, a structure including a polarizer piece, a first optically anisotropic layer, a second optically anisotropic layer, and the mirror in this order from a visual recognition side was set. In this evaluation model, an ideal mirror capable of reflecting incident light on a mirror surface at a reflectance of 100% was set as the mirror, and an ideal polarizing film was set as the polarizer piece.

As to the aforementioned evaluation model, the lightness L* was calculated, wherein the lightness was of a light observed when the reflective surface of the mirror was viewed in the front direction upon irradiation with light from a D65 light source was performed in a front direction perpendicular to the reflective surface of the mirror. Smaller lightness L* is indicative of better result in which reflection of light is suppressed.

[Method for Visually Evaluating Reflection Luminance]

An organic EL display device including an organic EL element and a circularly polarizing plate in this order ("GALAXY" manufactured by Samsung) was prepared. The display surface portion of the organic EL display device was disassembled and the circularly polarizing plate was removed. To the organic EL element, the surface on the second optically anisotropic layer side of the circularly polarizing plate produced in each of Examples and Comparative Examples described below was bonded by using a hand-application roller. The bonding was performed through a tackiness agent layer ("CS9621" manufactured by Nitto Denko Corporation). Thus, an image display device for evaluation was obtained.

A black image was displayed on the image display device. The display surface was observed in the front direction of the display surface. Smaller luminance by reflection of external light is indicative of better result.

The aforementioned evaluation was performed by many observers. Each observer ranked the results in all experimental examples (Examples and Comparative Examples) of Experimental Example Groups V to VIII, and gave points thereto corresponding to the ranking (first place: 55 points, second place: 54 points, . . . , last place: 1 point). The totals of the points determined by the observers in experimental examples were sorted in terms of points. The higher order groups in the range of the points were evaluated in the order of A, B, C, D, and E.

Production Example 1: Production of Roll (S1-1) of Stretched Substrate (S1)

Pellets of a thermoplastic resin containing a norbornene polymer (manufactured by ZEON Corporation, glass transition temperature Tg=126° C.) were dried at 90° C. for 5 hours. The dried pellets were supplied to an extruder, and melted in the extruder. The melted resin was passed through a polymer pipe and a polymer filter, extruded from a T-die on a casting drum in a sheet shape, and cooled, to obtain a long-length pre-stretch substrate (S0) having a thickness of 60 µm and a width of 1,350 mm. While the obtained pre-stretch substrate (S0) was bonded to a masking film ("FF1025" manufactured by Tredegar Corporation) for protection, the pre-stretch substrate (S0) was wound. Thus, a roll of the pre-stretch substrate (S0) was obtained.

The pre-stretch substrate (S0) was unwound from the roll of the pre-stretch substrate (S0), the masking film was continuously peeled, and the pre-stretch substrate (S0) was supplied to a tenter stretching machine, and subjected to a stretching treatment in a diagonal direction. In this stretching treatment, the stretching ratio was 1.5 and the stretching temperature was 142° C. After stretching, both ends of the substrate in the widthwise direction of a film were trimmed to obtain a long-length stretched substrate (S1) having a width of 1,350 mm. The orientation angle of the slow axis of the obtained stretched substrate (S1) relative to the widthwise direction of the film was 15°, the dispersion of the orientation angle was 0.7°, the Nz factor of the stretched substrate (S1) was 1.1, the in-plane retardation Re of the stretched substrate (S1) at a measurement wavelength of 590 nm was 141 nm, and the thickness of the stretched substrate (S1) was 22 µm.

While a surface on a side of the obtained stretched substrate (S1) was bonded to another masking film ("FF1025" manufactured by Tredegar Corporation) for protection, the stretched substrate (S1) was wound. Thus, a roll (S1-1) of the stretched substrate (S1) was obtained.

Production Example 2: Production of Roll (S1-2) of Stretched Substrate (S1)

When the stretched substrate (S1) obtained by diagonal stretching of the pre-stretch substrate (S0) is bonded to another masking film ("FF1025" manufactured by Tredegar Corporation), the surface of the stretched substrate (S1) to be bonded to the masking film was changed to a surface on a side opposite to the surface that had been bonded to the masking film in Production Example 1. A roll (S1-2) of the stretched substrate (S1) was obtained in the same manner as that of Production Example 1 except for the aforementioned matter.

Production Example 3: Production of Liquid Crystal Composition (A)

21.295 parts of a polymerizable liquid crystal compound with reverse wavelength dispersion represented by the following formula (B1), 0.064 parts of a surfactant ("MEGAFACE F-562" manufactured by DIC Corporation), 0.641 parts of a polymerization initiator ("IRGACURE379EG" manufactured by BASF), and 46.800 parts by weight of 1,3-dioxolane (manufactured by Toho Chemical Industry Co., Ltd.) and 31.200 parts of cyclopentanone (manufactured by ZEON Corporation) as solvents were mixed to prepare a liquid crystal composition (A) in a liquid state.

(B1)

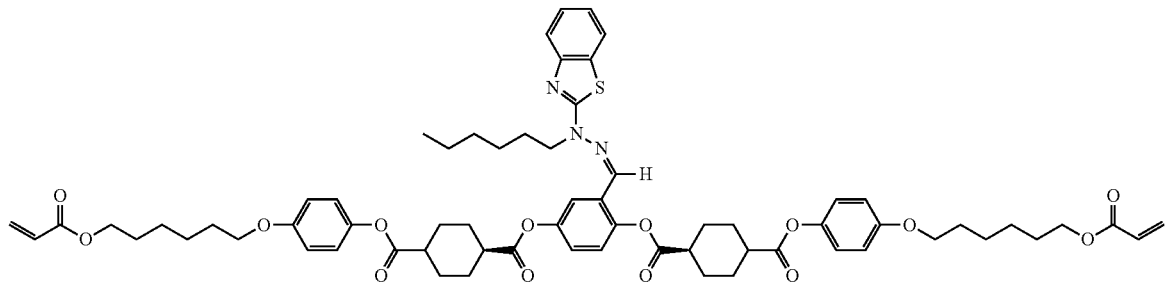

Production Example 4: Production of Liquid Crystal Composition (B)

13.629 parts of a liquid crystal compound with reverse wavelength dispersion represented by the aforementioned formula (B1), 7.666 parts of a polymerizable liquid crystal compound with reverse wavelength dispersion represented by the following formula (B2), 0.064 parts of a surfactant ("MEGAFACE F-562" manufactured by DIC Corporation), 0.641 parts of a polymerization initiator ("IRGACURE379EG" manufactured by BASF), and 46.800 parts by weight of 1,3-dioxolane (manufactured by Toho Chemical Industry Co., Ltd.) and 31.200 parts of cyclopentanone (manufactured by ZEON Corporation) as solvents were mixed to prepare a liquid crystal composition (B) in a liquid state.

(B2)

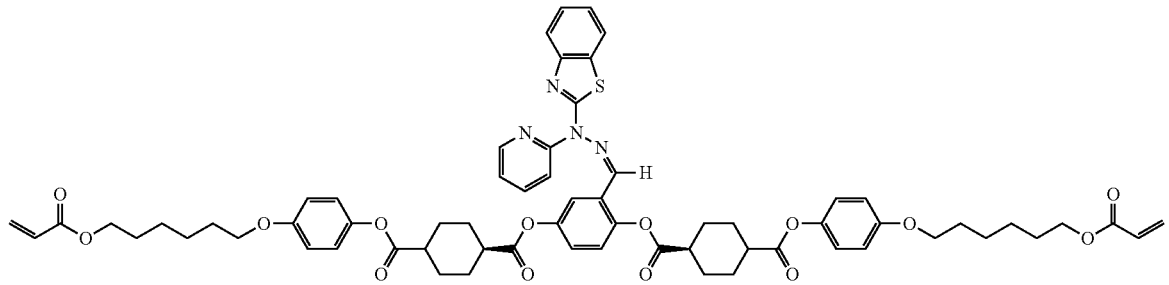

Production Example 5: Production of Liquid Crystal Composition (C)

10.009 parts of a polymerizable liquid crystal compound with reverse wavelength dispersion represented by the aforementioned formula (B1), 11.286 parts of a polymerizable liquid crystal compound with reverse wavelength dispersion represented by the aformentioned formula (B2), 0.064 parts of a surfactant ("MEGAFACE F-562" manufactured by DIC Corporation), 0.641 parts of a polymerization initiator ("IRGACURE379EG" manufactured by BASF), and 46.800 parts by weight of 1,3-dioxolane (manufactured by Toho Chemical Industry Co., Ltd.) and 31.200 parts of cyclopentanone (manufactured by ZEON Corporation) as solvents were mixed to prepare a liquid crystal composition (C) in a liquid state.

Experimental Example Group I: Experimental Examples about Coloring Suppression Effect Using Liquid Crystal Composition (A)

Example I-1

(I-1-1. Production of Multilayer Film Containing First Optically Anisotropic Layer)

The stretched substrate (S1) was unwound from the roll (S1-1) of the stretched substrate (S1), the masking film was peeled, and the stretched substrate was conveyed in the lengthwise direction of the film. The liquid crystal composition (A) was applied directly onto a surface of the conveyed stretched substrate (S1) on a side that had been bonded to the masking film by a die coater at a room temperature of 25° C. to form a layer of the liquid crystal composition.

The layer of the liquid crystal composition on the stretched substrate (S1) was subjected to an orientation treatment at 110° C. for 2.5 minutes. Subsequently, the layer of the liquid crystal composition was irradiated with ultraviolet light at an integral illuminance of 500 mJ/cm² or more under a nitrogen atmosphere to polymerize the polymerizable liquid crystal compound with reverse wavelength dispersion in the liquid crystal composition. As a result, the layer of the liquid crystal composition was cured, to obtain a multilayer film (S1-a1) having a layer configuration of (stretched substrate (S1))/(first optically anisotropic layer (a1)). The dry thickness of the first optically anisotropic layer (a1) was 3.89 μm. The first optically anisotropic layer (a1) contained a polymer of the polymerizable liquid crystal compound with reverse wavelength dispersion as a cured liquid crystal molecule of the liquid crystal compound that was homogeneously oriented.

The phase difference properties of the first optically anisotropic layer (a1) were measured using the obtained multilayer film (S1-a1) by the aforementioned method. As a result, Re(H590) of the first optically anisotropic layer (a1) was 246 nm, Re(H450)/Re(H550) thereof was 0.80, Re(H650)/Re(H550) thereof was 1.04, and the angle of the slow axis relative to the widthwise direction of the film was 15°.

(I-1-2. Production of Multilayer Film Containing Second Optically Anisotropic Layer)

The stretched substrate (S1) was unwound not from the roll (S1-1) but from the roll (S1-2). The thickness of the liquid crystal composition (A) to be applied was changed. A multilayer film (S1-a2) having a layer configuration of (stretched substrate (S1))/(second optically anisotropic layer (a2)) was obtained in the same manner as that of the step (I-1-1) except for the aforementioned matters. The dry thickness of the second optically anisotropic layer (a2) was 1.95 μm. The second optically anisotropic layer (a2) contained a polymer of the polymerizable liquid crystal compound with reverse wavelength dispersion as a cured liquid crystal molecule of liquid crystal compound that was homogeneously oriented.

The phase difference properties of the second optically anisotropic layer (a2) were measured using the obtained multilayer film (S1-a2) by the aforementioned method. As a result, Re(Q590) of the second optically anisotropic layer (a2) was 123 nm, Re(Q450)/Re(Q550) thereof was 0.80, Re(Q650)/Re(Q550) thereof was 1.04, and the angle of the slow axis relative to the widthwise direction of the film was −15°.

(I-1-3. Production of Optically Anisotropic Layered Body)

From the multilayer film (S1-a1) was cut out a sample piece (S1-a1) of an A4 size having a long side parallel to the widthwise direction of the multilayer film (S1-a1) and a short side parallel to the lengthwise direction of the multilayer film (S1-a1).

From the multilayer film (S1-a2) was cut out a sample piece (S1-a2) of an A4 size having a long side parallel to the lengthwise direction of the multilayer film (S1-a2) and a short side parallel to the widthwise direction of the multilayer film (S1-a2).

From an unstretched film formed of a resin containing a norbornene polymer ("ZF16" manufactured by ZEON Corporation, thickness: 100 μm), a sample piece (ZF) of an A4 size was cut out.

A surface of the sample piece (ZF) and a surface on the second optically anisotropic layer (a2) side of the sample piece (S1-a2) were bonded to each other by using a laminator so that the long side and the short side of the sample piece (ZF) were parallel to the long side and short side of the sample piece (S1-a2), respectively. The bonding was performed through a tackiness agent layer ("CS9621" manufactured by Nitto Denko Corporation). As a result, a layered body (ZF-a2-S1) having a layer configuration of (sample piece (ZF))/(tackiness agent layer)/(second optically anisotropic layer (a2))/(stretched substrate (S1)) was obtained. Further, the stretched substrate (S1) was peeled from the layered body (ZF-a2-S1) to obtain a layered body (ZF-a2) having a layer configuration of (sample piece (ZF))/(tackiness agent layer)/(second optically anisotropic layer (a2)).

Subsequently, a surface on the second optically anisotropic layer (a2) side of the layered body (ZF-a2) was bonded to a surface on the first optically anisotropic layer (a1) side of the sample piece (S1-a1) by using a laminater so that the long side and short side of the layered body (ZF-a2) were parallel to the long side and short side of the sample piece (S1-a1), respectively. The bonding was performed through a tackiness agent layer ("CS9621" manufactured by Nitto Denko Corporation). As a result, a layered body (ZF-a2-a1-S1) having a layer configuration of (sample piece (ZF))/(tackiness agent layer)/(second optically anisotropic layer (a2))/(tackiness agent layer)/(first optically anisotropic layer (a1))/(stretched substrate (S1)) was obtained. Further, the stretched substrate (S1) was peeled from the layered body (ZF-a2-a1-S1) to obtain an optically anisotropic layered body (ZF-a2-a1) having a layer configuration of (sample piece (ZF))/(tackiness agent layer)/(second optically anisotropic layer (a2))/(tackiness agent layer)/(first optically anisotropic layer (a1)). The angle formed between the slow axis of the first optically anisotropic layer (a1) and the slow axis of the second optically anisotropic layer (a2) in the layered body (ZF-a2-a1) was 60°.

As to the obtained optically anisotropic layered body (ZF-a2-a1), the chroma average value was calculated and coloring was evaluated by the aforementioned methods.

Examples I-2 to I-17 and Comparative Examples I-1 to I-3

The dry thickness of the first optically anisotropic layer (a1) was adjusted by changing the thickness of the liquid crystal composition (A) to be applied in the step (I-1-1), so that the value of the in-plane retardation Re(H590) of the first optically anisotropic layer (a1) at a wavelength of 590 nm was changed as shown in Table 1.

In addition, the dry thickness of the second optically anisotropic layer (a2) was adjusted by changing the thickness of the liquid crystal composition (A) to be applied in the step (I-1-2), so that the value of the in-plane retardation Re(Q590) of the second optically anisotropic layer (a2) at a wavelength of 590 nm was changed as shown in Table 1.

An optically anisotropic layered body (ZF-a2-a1) was produced and evaluated in the same manner as that of Example I-1 except for the aforementioned matters.

The respective optically anisotropic layers of Examples I-1 to I-17 and Comparative Examples I-1 to I-3 were obtained from the same liquid crystal composition (A). Thus, as to the first optically anisotropic layer (a1) and the second optically anisotropic layer (a2) of Examples I-1 to I-17 and Comparative Examples I-1 to I-3, all of Re(H450)/Re(H550) and Re(Q450)/Re(Q550) had the same value, and all of Re(H650)/Re(H550) and Re(Q650)/Re(Q550) had the same value.

Experimental Example Group II: Experimental Examples about Coloring Suppression Effect Using Liquid Crystal Composition (B)

Example II-1

An optically anisotropic layered body (ZF-2b-1b) was produced and evaluated in the same manner as in Example I-1 except that the liquid crystal composition (B) was used in place of the liquid crystal composition (A) and the application thickness of the liquid crystal composition (B) was changed. A detailed description will be given below.

(II-1-1. Production of Multilayer Film Containing First Optically Anisotropic Layer)

The stretched substrate (S1) was unwound from the roll (S1-1) of the stretched substrate (S1), the masking film was peeled off, and the stretched substrate was conveyed in the lengthwise direction of the film. The liquid crystal composition (B) was applied directly onto a surface of the conveyed stretched substrate (S1) on a side that had been bonded to the masking film by a die coater at a room temperature of 25° C. to form a layer of the liquid crystal composition.

The layer of the liquid crystal composition on the stretched substrate (S1) was subjected to an orientation treatment at 110° C. for 2.5 minutes. Subsequently, the layer of the liquid crystal composition was irradiated with ultraviolet light at an integral illuminance of 500 mJ/cm$^2$ or more under a nitrogen atmosphere to polymerize the polymerizable liquid crystal compound with reverse wavelength dispersion in the liquid crystal composition. As a result, the layer of the liquid crystal composition was cured, to obtain a multilayer film (S1-b1) having a layer configuration of (stretched substrate (S1))/(first optically anisotropic layer (b1)). The dry thickness of the first optically anisotropic layer (b1) was 3.37 μm. The first optically anisotropic layer (b1) contained a polymer of the polymerizable liquid crystal compound with reverse wavelength dispersion as a cured liquid crystal molecule of the liquid crystal compound that was homogeneously oriented.

The phase difference properties of the first optically anisotropic layer (b1) were measured using the obtained multilayer film (S1-b1) by the aforementioned method. As a result, Re(H590) of the first optically anisotropic layer (b1) was 242 nm, Re(H450)/Re(H550) thereof was 0.89, Re(H650)/Re(H550) thereof was 1.03, and the angle of the slow axis relative to the widthwise direction of the film was 15°.

(II-1-2. Production of Multilayer Film Containing Second Optically Anisotropic Layer)

The stretched substrate (S1) was unwound not from the roll (S1-1) but from the roll (S1-2). The thickness of the liquid crystal composition (B) to be applied was changed. A multilayer film (S1-b2) having a layer configuration of (stretched substrate (S1))/(second optically anisotropic layer (b2)) was obtained in the same manner as that of the step (II-1-1) except for the aforementioned matters. The dry thickness of the second optically anisotropic layer (b2) was 1.69 μm. The second optically anisotropic layer (b2) contained a polymer of the polymerizable liquid crystal compound with reverse wavelength dispersion as a cured liquid crystal molecule of liquid crystal compound that was homogeneously oriented.

The phase difference properties of the second optically anisotropic layer (b2) were measured using the obtained multilayer film (S1-b2) by the aforementioned method. As a result, Re(Q590) of the second optically anisotropic layer (b2) was 121 nm, Re(Q450)/Re(Q550) thereof was 0.89, Re(Q650)/Re(Q550) thereof was 1.03, and the angle of the slow axis relative to the widthwise direction of the film was −15°.

(II-1-3. Production of Optically Anisotropic Layered Body)

The multilayer film (S1-b1) having the layer configuration of (stretched substrate (S1))/(first optically anisotropic layer (b1)) was used in place of the multilayer film (S1-a1).

The multilayer film (S1-b2) having the layer configuration of (stretched substrate (S1))/(second optically anisotropic layer (b2)) was used in place of the multilayer film (S1-a2).

An optically anisotropic layered body (ZF-b2-b1) having a layer configuration of (sample piece (ZF))/(tackiness agent layer)/(second optically anisotropic layer (b2))/(tackiness agent layer)/(first optically anisotropic layer (b1)) was obtained in the same manner as that in Step (I-1-3) of Example I-1 except for the aforementioned matters.

As to the obtained optically anisotropic layered body (ZF-b2-b1), the chroma average value was calculated and coloring was evaluated by the aforementioned methods.

Examples II-2 to II-10 and Comparative Examples II-1 to II-4

The dry thickness of the first optically anisotropic layer (b1) was adjusted by changing the thickness of the liquid crystal composition (B) to be applied in the step (II-1-1), so that the value of the in-plane retardation Re(H590) of the first optically anisotropic layer (b1) at the wavelength of 590 nm was changed as shown in Table 2.

In addition, the dry thickness of the second optically anisotropic layer (b2) was adjusted by changing the thickness of the liquid crystal composition (B) to be applied in the step (II-1-2), so that the value of the in-plane retardation Re(Q590) of the second optically anisotropic layer (b2) at the wavelength of 590 nm was changed as shown in Table 2.

An optically anisotropic layered body (ZF-b2-b1) was produced and evaluated in the same manner as in Example II-1 except for the aforementioned matters.

The respective optically anisotropic layers of Examples II-1 to II-10 and Comparative Examples II-1 to II-4 were obtained from the same liquid crystal composition (B). Thus, as to the first optically anisotropic layer (b1) and the second optically anisotropic layer (b2) of Examples II-1 to II-10 and Comparative Examples II-1 to 11-4, all of Re(H450)/Re(H550) and Re(Q450)/Re(Q550) had the same value, and all of Re(H650)/Re(H550) and Re(Q650)/Re (Q550) had the same value.

Experimental Example Group III: Experimental Examples about Coloring Suppression Effect Using Liquid Crystal Composition (C)

Example III-1

An optically anisotropic layered body (ZF-2c-1c) was produced and evaluated in the same manner as in Example I-1 except that the liquid crystal composition (C) was used in place of the liquid crystal composition (A) and the application thickness of the liquid crystal composition (C) was changed. A detailed description will be given below.

(III-1-1. Production of Multilayer Film containing First Optically Anisotropic Layer)

The stretched substrate (S1) was unwound from the roll (S1-1) of the stretched substrate (S1), the masking film was peeled off, and the stretched substrate (S1) was conveyed in the lengthwise direction of the film. The liquid crystal composition (C) was applied directly onto a surface of the conveyed stretched substrate (S1) on a side that had been bonded to the masking film by a die coater at a room temperature of 25° C. to form a layer of the liquid crystal composition.

The layer of the liquid crystal composition on the stretched substrate (S1) was subjected to an orientation treatment at 110° C. for 2.5 minutes. Subsequently, the layer of the liquid crystal composition was irradiated with ultraviolet light at an integral illuminance of 500 mJ/cm² or more under a nitrogen atmosphere to polymerize the polymerizable liquid crystal compound with reverse wavelength dispersion in the liquid crystal composition. As a result, the layer of the liquid crystal composition was cured, to obtain a multilayer film (S1-c1) having a layer configuration of (stretched substrate (S1))/(first optically anisotropic layer (c1)). The dry thickness of the first optically anisotropic layer (c1) was 3.17 μm. The first optically anisotropic layer (c1) contained a polymer of the polymerizable liquid crystal compound with reverse wavelength dispersion as a cured liquid crystal molecule of the liquid crystal compound that was homogeneously oriented.

The phase difference properties of the first optically anisotropic layer (c1) were measured using the obtained multilayer film (S1-c1) by the aforementioned method. As a result, Re(H590) of the first optically anisotropic layer (c1) was 243 nm, Re(H450)/Re(H550) thereof was 0.93, Re(H650)/Re(H550) thereof was 1.01, and the angle of the slow axis relative to the widthwise direction of the film was 15°.

(III-1-2. Production of Multilayer Film Containing Second Optically Anisotropic Layer)

The stretched substrate (S1) was unwound not from the roll (S1-1) but from the roll (S1-2). The thickness of the liquid crystal composition (C) to be applied was changed. A multilayer film (S1-c2) having a layer configuration of (stretched substrate (S1))/(second optically anisotropic layer (c2)) was obtained in the same manner as that of the step (III-1-1) except for the aforementioned matters. The dry thickness of the second optically anisotropic layer (c2) was 1.58 μm. The second optically anisotropic layer (c2) contained a polymer of the polymerizable liquid crystal compound with reverse wavelength dispersion as a cured liquid crystal molecule of liquid crystal compound that was homogeneously oriented.

The phase difference properties of the second optically anisotropic layer (c2) were measured using the obtained multilayer film (S1-c2) by the aforementioned method. As a result, Re(Q590) of the second optically anisotropic layer (b2) was 122 nm, Re(Q450)/Re(Q550) thereof was 0.93, Re(Q650)/Re(Q550) thereof was 1.01, and the angle of the slow axis relative to the widthwise direction of the film was −15°.

(III-1-3. Production of Optically Anisotropic Layered Body)

The multilayer film (S1-c1) having the layer configuration of (stretched substrate (S1))/(first optically anisotropic layer (c1)) was used in place of the multilayer film (S1-a1).

The multilayer film (S1-c2) having the layer configuration of (stretched substrate (S1))/(second optically anisotropic layer (c2)) was used in place of the multilayer film (S1-a2).

An optically anisotropic layered body (ZF-c2-c1) having a layer configuration of (sample piece (ZF))/(tackiness agent layer)/(second optically anisotropic layer (c2))/(tackiness agent layer)/(first optically anisotropic layer (c1)) was obtained in the same manner as that in Step (I-1-3) of Example I-1 except for the aforementioned matters.

As to the obtained optically anisotropic layered body (ZF-c2-c1), the chroma average value was calculated and coloring was evaluated by the aforementioned methods.

Examples III-2 to III-9 and Comparative Examples III-1 to III-7

The dry thickness of the first optically anisotropic layer (c1) was adjusted by changing the thickness of the liquid crystal composition (C) to be applied in the step (III-1-1), so that the value of the in-plane retardation Re(H590) of the first optically anisotropic layer (c1) at the wavelength of 590 nm was changed as shown in Table 3.

In addition, the dry thickness of the second optically anisotropic layer (c2) was adjusted by changing the thickness of the liquid crystal composition (C) to be applied in the step (III-1-2), so that the value of the in-plane retardation Re(Q590) of the second optically anisotropic layer (c2) at the wavelength of 590 nm was changed as shown in Table 3.

An optically anisotropic layered body (ZF-c2-c1) was produced and evaluated in the same manner as in Example III-1 except for the aforementioned matters.

The respective optically anisotropic layers of Examples III-1 to III-9 and Comparative Examples III-1 to III-7 were obtained from the same liquid crystal composition (C). Thus, as to the first optically anisotropic layer (c1) and the second optically anisotropic layer (c2) of Examples III-1 to III-9 and Comparative Examples III-1 to 111-7), all of Re(H450)/Re(H550) and Re(Q450)/Re(Q550) had the same value, and all of Re(H650)/Re(H550) and Re(Q650)/Re(Q550) had the same value.

Experimental Example Group IV: Experimental Examples about Coloring Suppression Effect Using Stretched Film Comparative Examples IV-1 to IV-11

(IV-1. Production of First Optically Anisotropic Layer)

Pellets of a thermoplastic resin containing a norbornene polymer (manufactured by ZEON Corporation, glass transition temperature Tg=126° C.) were dried at 90° C. for 5 hours. The dried pellets were supplied to an extruder, and melted in the extruder. The melted resin was passed through a polymer pipe and a polymer filter, extruded from a T-die on a casting drum in a sheet shape, and cooled, to obtain a pre-stretch film. In extruding of the resin, the pulling rate of the resin by the casting drum was adjusted for adjusting the thickness of the obtained pre-stretch film such that a stretched film having an in-plane retardation Re(H590) shown in Table 4 was obtained. The pre-stretch film was stretched under stretching conditions that are identical in the respective Comparative Examples, to obtain a stretched film as the first optically anisotropic layer.

The obtained first optically anisotropic layer was measured by a phase difference measurement device ("AxoScan" manufactured by Axometrics, Inc.), and Re(H590) was as shown in Table 4, Re(H450)/Re(H550) was 1.01, and Re(H650)/Re(H550) was 0.99.

(IV-2. Production of Second Optically Anisotropic Layer)

In extruding of the resin, the pulling rate of a resin by a casting drum was adjusted for changing the thickness of a pre-stretch film such that a stretched film having an in-plane retardation Re(Q590) shown in Table 4 was obtained. A stretched film was obtained as the second optically anisotropic layer in the same manner as that in the step (IV-1) except for the aforementioned matters.

The obtained second optically anisotropic layer was measured by a phase difference measurement device ("AxoScan" manufactured by Axometrics, Inc.), and Re(Q590) was as shown in Table 4, Re(Q450)/Re(Q550) was 1.01, and Re(Q650)/Re(Q550) was 0.99.

(IV-3. Production of Optically Anisotropic Layered Body)

The stretched film as the first optically anisotropic layer and the stretched film as the second optically anisotropic layer were bonded to each other through a tackiness agent layer ("CS9621" manufactured by Nitto Denko Corporation), to obtain an optically anisotropic layered body. At that time, the angle formed between the slow axis of the first optically anisotropic layer and the slow axis of the second optically anisotropic layer was set to 60°.

As to the obtained optically anisotropic layered body, the chroma average value was calculated and coloring was evaluated by the aforementioned methods.

[Results]

The results of Examples I-1 to I-17 and Comparative Examples I-1 to I-3 (Table 1); Examples II-1 to II-10 and Comparative Examples II-1 to II-4 (Table 2); Examples III-1 to III-9 and Comparative Examples III-1 to III-7 (Table 3); and Comparative Examples IV-1 to IV-11 (Table 4) that are experimental examples about the coloring suppression effect are shown in Tables 1 to 4. In the following tables, abbreviations mean as follows.

θ1: the angle of the slow axis of the first optically anisotropic layer relative to the polarized light absorption axis of the visual recognition-side linear polarizer of the liquid crystal display device θ2: the angle of the slow axis of the second optically anisotropic layer relative to the polarized light absorption axis of the visual recognition-side linear polarizer of the liquid crystal display device Average C*: the average value of chroma C*
(A): liquid crystal composition (A)
(B): liquid crystal composition (B)
(C): liquid crystal composition (C)
COP: alicyclic structure-containing polymer

TABLE 1

[Results of experimental examples using liquid crylstal composition (A)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | Average C* | coloring |
| Ex. I-1 | (A) | 246 | 15.0° | (A) | 123 | 75.0° | 1.60 | D |
| Ex. I-2 | (A) | 250 | 15.0° | (A) | 125 | 75.0° | 1.50 | D |
| Ex. I-3 | (A) | 254 | 15.0° | (A) | 127 | 75.0° | 1.38 | C |
| Ex. I-4 | (A) | 258 | 15.0° | (A) | 129 | 75.0° | 1.27 | C |
| Ex. I-5 | (A) | 262 | 15.0° | (A) | 131 | 75.0° | 1.15 | C |
| Ex. I-6 | (A) | 266 | 15.0° | (A) | 133 | 75.0° | 1.02 | B |
| Ex. I-7 | (A) | 270 | 15.0° | (A) | 135 | 75.0° | 0.88 | B |
| Ex. I-8 | (A) | 274 | 15.0° | (A) | 137 | 75.0° | 0.76 | A |
| Ex. I-9 | (A) | 278 | 15.0° | (A) | 139 | 75.0° | 0.62 | A |
| Ex. I-10 | (A) | 285 | 15.0° | (A) | 142 | 75.0° | 0.42 | A |
| Ex. I-11 | (A) | 291 | 15.0° | (A) | 146 | 75.0° | 0.33 | A |
| Ex. I-12 | (A) | 299 | 15.0° | (A) | 150 | 75.0° | 0.48 | A |
| Ex. I-13 | (A) | 307 | 15.0° | (A) | 153 | 75.0° | 0.75 | A |
| Ex. I-14 | (A) | 314 | 15.0° | (A) | 157 | 75.0° | 1.08 | B |
| Ex. I-15 | (A) | 319 | 15.0° | (A) | 160 | 75.0° | 1.30 | C |
| Ex. I-16 | (A) | 324 | 15.0° | (A) | 162 | 75.0° | 1.51 | D |
| Ex. I-17 | (A) | 328 | 15.0° | (A) | 164 | 75.0° | 1.70 | D |
| Comp. Ex. I-1 | (A) | 238 | 15.0° | (A) | 119 | 75.0° | 1.80 | E |

TABLE 1-continued

[Results of experimental examples using liquid crylstal composition (A)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | Average C* | coloring |
| Comp. Ex. I-2 | (A) | 242 | 15.0° | (A) | 121 | 75.0° | 1.70 | E |
| Comp. Ex. I-3 | (A) | 331 | 15.0° | (A) | 166 | 75.0° | 1.86 | E |

TABLE 2

[Results of experimental examples using liquid crylstal composition (B)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | Average C* | coloring |
| Ex. II-1 | (B) | 242 | 15.0° | (B) | 121 | 75.0° | 1.54 | D |
| Ex. II-2 | (B) | 248 | 15.0° | (B) | 124 | 75.0° | 1.35 | C |
| Ex. II-3 | (B) | 255 | 15.0° | (B) | 127 | 75.0° | 1.13 | C |
| Ex. II-4 | (B) | 260 | 15.0° | (B) | 130 | 75.0° | 0.97 | B |
| Ex. II-5 | (B) | 267 | 15.0° | (B) | 133 | 75.0° | 0.78 | A |
| Ex. II-6 | (B) | 275 | 15.0° | (B) | 137 | 75.0° | 0.63 | A |
| Ex. II-7 | (B) | 283 | 15.0° | (B) | 141 | 75.0° | 0.65 | A |
| Ex. II-8 | (B) | 291 | 15.0° | (B) | 145 | 75.0° | 0.89 | B |
| Ex. II-9 | (B) | 299 | 15.0° | (B) | 150 | 75.0° | 1.26 | C |
| Ex. II-10 | (B) | 308 | 15.0° | (B) | 154 | 75.0° | 1.68 | D |
| Comp. Ex. II-1 | (B) | 230 | 15.0° | (B) | 115 | 75.0° | 1.89 | E |
| Comp. Ex. II-2 | (B) | 236 | 15.0° | (B) | 118 | 75.0° | 1.72 | E |
| Comp. Ex. II-3 | (B) | 316 | 15.0° | (B) | 158 | 75.0° | 2.14 | E |
| Comp. Ex. II-4 | (B) | 325 | 15.0° | (B) | 163 | 75.0° | 2.63 | E |

TABLE 3

[Results of experimental examples using liquid crylstal composition (C)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | Average C* | coloring |
| Ex. III-1 | (C) | 243 | 15.0° | (C) | 122 | 75.0° | 1.69 | D |
| Ex. III-2 | (C) | 248 | 15.0° | (C) | 124 | 75.0° | 1.48 | D |
| Ex. III-3 | (C) | 255 | 15.0° | (C) | 127 | 75.0° | 1.19 | C |
| Ex. III-4 | (C) | 259 | 15.0° | (C) | 130 | 75.0° | 1.08 | B |
| Ex. III-5 | (C) | 263 | 15.0° | (C) | 132 | 75.0° | 1.02 | B |
| Ex. III-6 | (C) | 268 | 15.0° | (C) | 134 | 75.0° | 1.04 | B |
| Ex. III-7 | (C) | 272 | 15.0° | (C) | 136 | 75.0° | 1.15 | C |
| Ex. III-8 | (C) | 277 | 15.0° | (C) | 138 | 75.0° | 1.35 | C |
| Ex. III-9 | (C) | 281 | 15.0° | (C) | 141 | 75.0° | 1.61 | D |
| Comp. Ex. III-1 | (C) | 236 | 15.0° | (C) | 118 | 75.0° | 2.03 | E |
| Comp. Ex. III-2 | (C) | 240 | 15.0° | (C) | 120 | 75.0° | 1.84 | E |
| Comp. Ex. III-3 | (C) | 290 | 15.0° | (C) | 145 | 75.0° | 2.24 | E |
| Comp. Ex. III-4 | (C) | 300 | 15.0° | (C) | 150 | 75.0° | 2.96 | E |
| Comp. Ex. III-5 | (C) | 309 | 15.0° | (C) | 154 | 75.0° | 3.73 | E |

TABLE 3-continued

[Results of experimental examples using liquid crylstal composition (C)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | Average C* | coloring |
| Comp. Ex. III-6 | (C) | 318 | 15.0° | (C) | 159 | 75.0° | 4.55 | E |
| Comp. Ex. III-7 | (C) | 328 | 15.0° | (C) | 164 | 75.0° | 5.41 | E |

TABLE 4

[Results of experimental examples using stretched film]

| | First optically anisotropic layer | | | Second optically anisotropic layer | | | Evaluation results | |
|---|---|---|---|---|---|---|---|---|
| | Resin | Re (H590) [nm] | θ1 | Resin | Re (Q590) [nm] | θ2 | Average C* | coloring |
| Comp. Ex. IV-1 | COP | 225 | 15.0° | COP | 112 | 75.0° | 2.83 | E |
| Comp. Ex. IV-2 | COP | 236 | 15.0° | COP | 118 | 75.0° | 2.00 | E |
| Comp. Ex. IV-3 | COP | 246 | 15.0° | COP | 123 | 75.0° | 1.87 | E |
| Comp. Ex. IV-4 | COP | 257 | 15.0° | COP | 129 | 75.0° | 2.66 | E |
| Comp. Ex. IV-5 | COP | 268 | 15.0° | COP | 134 | 75.0° | 3.96 | E |
| Comp. Ex. IV-6 | COP | 279 | 15.0° | COP | 139 | 75.0° | 5.48 | E |
| Comp. Ex. IV-7 | COP | 290 | 15.0° | COP | 145 | 75.0° | 7.10 | E |
| Comp. Ex. IV-8 | COP | 300 | 15.0° | COP | 150 | 75.0° | 8.78 | E |
| Comp. Ex. IV-9 | COP | 311 | 15.0° | COP | 156 | 75.0° | 10.50 | E |
| Comp. Ex. IV-10 | COP | 322 | 15.0° | COP | 161 | 75.0° | 12.21 | E |
| Comp. Ex. IV-11 | COP | 332 | 15.0° | COP | 166 | 75.0° | 13.87 | E |

As seen from the results shown in Tables 1 to 4, when the optically anisotropic layered body including the first optically anisotropic layer and the second optically anisotropic layer having in-plane retardations satisfying the requirements of the present invention is provided to an image display device, coloring of the display surface of the image display device viewed through polarized sunglasses can be effectively suppressed.

Experimental Example Group V: Experimental Examples about Reflection Suppression Effect Using Liquid Crystal Composition (A)

Example V-1

(V-1-1. Production of Multilayer Film containing First Optically Anisotropic Layer)

The dry thickness of the first optically anisotropic layer (a1) was changed to 4.15 μm, so as to change the Re(H590) of the first optically anisotropic layer (a1) to 262 nm. A multilayer film (S1-a1) having the layer configuration of (stretched substrate (S1))/(first optically anisotropic layer (a1)) was produced in the same manner as that in the step (I-1-1) of Example I-1 except for the aforementioned matter.

(V-1-2. Production of Multilayer Film containing Second Optically Anisotropic Layer)

The dry thickness of the second optically anisotropic layer (a2) was changed to 2.07 μm, so as to change the Re(Q590) of the second optically anisotropic layer (a2) to 131 nm. A multilayer film (S1-a2) having the layer configuration of (stretched substrate (S1))/(second optically anisotropic layer (a2)) was produced in the same manner as that in the step (I-1-2) of Example I-1 except for the aforementioned matter.

(V-1-3. Production of Multilayer Film Containing Second Optically Anisotropic Layer) From the multilayer film (S1-a1) was cut out a sample piece (s1-a1) of an A4 size having a long side parallel to the lengthwise direction of the multilayer film (S1-a1) and a short side parallel to the widthwise direction of the multilayer film (S1-a1).

From the multilayer film (S1-a2) was cut out a sample piece (s1-a2) of an A4 size having a long side parallel to the widthwise direction of the multilayer film (S1-a2) and a short side parallel to the lengthwise direction of the multilayer film (S1-a2).

As a long-length linear polarizer, a polarizing film ("HLC2-5618S" manufactured by Sanritz co., ltd., thickness: 180 μm, having a polarized light transmission axis at an angle relative to the widthwise direction of 0°, having a polarized light absorption axis at an angle relative to the widthwise direction of 90°) was prepared. From the polarizing film was cut out a polarizer piece (P) of an A4 size having a long side parallel to the lengthwise direction of the polarizing film and a short side parallel to the widthwise direction of the polarizing film.

A surface of the polarizer piece (P) was bonded to a surface on the first optically anisotropic layer (a1) side of the sample piece (S1-a1) by using a laminater so that the long side and short side of the polarizer piece were parallel to the long side and short side of the sample piece, respectively. The bonding was performed through a tackiness agent layer ("CS9621" manufactured by Nitto Denko Corporation). As a result, a layered body (P-a1-s1) having a layer configuration of (polarizer piece (P))/(tackiness agent layer)/(first optically anisotropic layer (a1))/(stretched substrate (S1)) was obtained. Further, the stretched substrate (S1) was peeled from the layered body (P-a1-s1) to obtain a layered body (P-a1) having a layer configuration of (polarizer piece (P))/(tackiness agent layer)/(first optically anisotropic layer (a1)).

Subsequently, the surface of the layered body (P-a1) on the first optically anisotropic layer (a1) side and the surface of the sample piece (s1-a2) on the second optically anisotropic layer (a2) side were bonded to each other by using a laminator so that the long side and the short side of the layered body (P-a1) were parallel to the long side and short side of the sample piece (s1-a2), respectively. The bonding was performed through a tackiness agent layer ("CS9621" manufactured by Nitto Denko Corporation). As a result, a layered body (P-a1-a2-S1) having a layer configuration of (polarizer piece (P))/(tackiness agent layer)/(first optically anisotropic layer (a1))/(tackiness agent layer)/(second optically anisotropic layer (a2))/(stretched substrate (S1)) was obtained. Further, the stretched substrate (S1) was peeled from the layered body (P-a1-a2-S1) to obtain a circularly polarizing plate (P-a1-a2) having a layer configuration of (polarizer piece (P))/(tackiness agent layer)/(first optically anisotropic layer (a1))/(tackiness agent layer)/(second optically anisotropic layer (a2)). The angle formed between the slow axis of the first optically anisotropic layer (a1) and the slow axis of the second optically anisotropic layer (a2) in the circularly polarizing plate (P-a1-a2) was 60°.

As to the obtained circularly polarizing plate (P-a1-a2), the lightness L* was calculated and reflection luminance was evaluated by the aforementioned methods.

Examples V-2 to V-11 and Comparative Examples V-1 to V-2

The dry thickness of the first optically anisotropic layer (a1) was adjusted by changing the thickness of the liquid crystal composition (A) to be applied in the step (V-1-1), so that the value of the in-plane retardation Re(H590) of the first optically anisotropic layer (a1) at the wavelength of 590 nm was changed as shown in Table 5.

In addition, the dry thickness of the second optically anisotropic layer (a2) was adjusted by changing the thickness of the liquid crystal composition (A) to be applied in the step (V-1-2), so that the value of the in-plane retardation Re(Q590) of the second optically anisotropic layer (a2) at the wavelength of 590 nm was changed as shown in Table 5.

A circularly polarizing plate (P-a1-a2) was produced and evaluated in the same manner as in Example V-1 except for the aforementioned matters.

The respective optically anisotropic layers of Examples V-1 to V-11 and Comparative Examples V-1 to V-2 were obtained from the same liquid crystal composition (A). Thus, as to the first optically anisotropic layer (a1) and the second optically anisotropic layer (a2) of Examples V-1 to V-11 and Comparative Examples V-1 to V-2, all of Re(H450)/Re(H550) and Re(Q450)/Re(Q550) were 0.80, and all of Re(H650)/Re(H550) and Re(Q650)/Re(Q550) were 1.04.

Experimental Example Group VI: Experimental Examples about Reflection Suppression Effect Using Liquid Crystal Composition (B)

Example VI-1

(VI-1-1. Production of Multilayer Film Containing First Optically Anisotropic Layer)

The dry thickness of the first optically anisotropic layer (b1) was changed to 3.54 µm, so as to change the Re(H590) of the first optically anisotropic layer (b1) to 254 nm. A multilayer film (S1-b1) having the layer configuration of (stretched substrate (S1))/(first optically anisotropic layer (b1)) was produced in the same manner as that in the step (II-1-1) of Example II-1 except for the aforementioned matter.

(VI-1-2. Production of Multilayer Film Containing Second Optically Anisotropic Layer)

The dry thickness of the second optically anisotropic layer (b2) was changed to 1.78 µm, so as to change the Re(Q590) of the second optically anisotropic layer (b2) to 127 nm. A multilayer film (S1-b2) having the layer configuration of (stretched substrate (S1))/(second optically anisotropic layer (b2)) was produced in the same manner as that in the step (II-1-2) of Example II-1 except for the aforementioned matter.

(VI-1-3. Production of Optically Anisotropic Layered Body)

The multilayer film (S1-b1) having the layer configuration of (stretched substrate (S1))/(first optically anisotropic layer (b1)) was used in place of the multilayer film (S1-a1).

The multilayer film (S1-b2) having the layer configuration of (stretched substrate (S1))/(second optically anisotropic layer (b2)) was used in place of the multilayer film (S1-a2).

A circularly polarizing plate (P-b1-b2) having a layer configuration of (polarizer piece (P))/(tackiness agent layer)/(first optically anisotropic layer (b1))/(tackiness agent layer)/(second optically anisotropic layer (b2)) was obtained in the same manner as that in Step (V-1-3) of Example V-1 except for the aforementioned matters.

As to the obtained optically anisotropic layered body (P-b1-b2), the lightness L* was calculated and reflection luminance was evaluated by the aforementioned methods.

Examples VI-2 to VI-14 and Comparative Examples VI-1 to VI-2

The dry thickness of the first optically anisotropic layer (b1) was adjusted by changing the thickness of the liquid crystal composition (B) to be applied in the step (VI-1-1), so that the value of the in-plane retardation Re(H590) of the first optically anisotropic layer (b1) at the wavelength of 590 nm was changed as shown in Table 6.

In addition, the dry thickness of the second optically anisotropic layer (b2) was adjusted by changing the thickness of the liquid crystal composition (B) to be applied in the step (VI-1-2), so that the value of the in-plane retardation Re(Q590) of the second optically anisotropic layer (b2) at the wavelength of 590 nm was changed as shown in Table 6.

A circularly polarizing plate (P-b1-b2) was produced and evaluated in the same manner as in Example VI-1 except for the aforementioned matters.

The respective optically anisotropic layers of Examples VI-1 to VI-14 and Comparative Examples VI-1 to VI-2 were obtained from the same liquid crystal composition (B). Thus, as to the first optically anisotropic layer (b1) and the second optically anisotropic layer (b2) of Examples VI-1 to VI-14 and Comparative Examples VI-1 to VI-2, all of Re(H450)/Re(H550) and Re(Q450)/Re(Q550) were 0.89, and all of Re(H650)/Re(H550) and Re(Q650)/Re(Q550) were 1.03.

Experimental Example Group VII: Experimental Examples about Reflection Suppression Effect Using Liquid Crystal Composition (C)

Example VII-1

(VII-1-1. Production of Multilayer Film Containing First Optically Anisotropic Layer)

The dry thickness of the first optically anisotropic layer (c1) was changed to 3.17 μm, so as to change the Re(H590) of the first optically anisotropic layer (c1) to 243 nm. A multilayer film (S1-c1) having the layer configuration of (stretched substrate (S1))/(first optically anisotropic layer (c1)) was produced in the same manner as that in the step (III-1-1) of Example III-1 except for the aforementioned matter.

(VII-1-2. Production of Multilayer Film Containing Second Optically Anisotropic Layer)

The dry thickness of the second optically anisotropic layer (c2) was changed to 1.58 μm, so as to change the Re(Q590) of the second optically anisotropic layer (c2) to 122 nm. A multilayer film (S1-c2) having the layer configuration of (stretched substrate (S1))/(second optically anisotropic layer (c2)) was produced in the same manner as that in the step (III-1-2) of Example III-1 except for the aforementioned matter.

(VII-1-3. Production of Optically Anisotropic Layered Body)

The multilayer film (S1-c1) having the layer configuration of (stretched substrate (S1))/(first optically anisotropic layer (c1)) was used in place of the multilayer film (S1-a1).

The multilayer film (S1-c2) having the layer configuration of (stretched substrate (S1))/(second optically anisotropic layer (c2)) was used in place of the multilayer film (S1-a2).

A circularly polarizing plate (P-c1-c2) having a layer configuration of (polarizer piece (P))/(tackiness agent layer)/(first optically anisotropic layer (c1))/(tackiness agent layer)/(second optically anisotropic layer (c2)) was obtained in the same manner as that in Step (V-1-3) of Example V-1 except for the aforementioned matters.

As to the obtained optically anisotropic layered body (P-c1-c2), the lightness L* was calculated and reflection luminance was evaluated by the aforementioned methods.

Examples VII-2 to VII-9 and Comparative Examples VII-1 to VII-6

The dry thickness of the first optically anisotropic layer (c1) was adjusted by changing the thickness of the liquid crystal composition (C) to be applied in the step (VII-1-1), so that the value of the in-plane retardation Re(H590) of the first optically anisotropic layer (c1) at the wavelength of 590 nm was changed as shown in Table 7.

In addition, the dry thickness of the second optically anisotropic layer (c2) was adjusted by changing the thickness of the liquid crystal composition (C) to be applied in the step (VII-1-2), so that the value of the in-plane retardation Re(Q590) of the second optically anisotropic layer (c2) at the wavelength of 590 nm was changed as shown in Table 7.

A circularly polarizing plate (P-c1-c2) was produced and evaluated in the same manner as in Example VII-1 except for the aforementioned matters.

The respective optically anisotropic layers of Examples VII-1 to VII-9 and Comparative Examples VII-1 to VII-6 were obtained from the same liquid crystal composition (C). Thus, as to the first optically anisotropic layer (c1) and the second optically anisotropic layer (c2) of Examples VII-1 to VII-9 and Comparative Examples VII-1 to VII-6, all of Re(H450)/Re(H550) and Re(Q450)/Re(Q550) were 0.93, and all of Re(H650)/Re(H550) and Re(Q650)/Re(Q550) were 1.01.

Experimental Example Group VIII: Experimental Examples about Reflection Suppression Effect Using Stretched Film Comparative Examples VIII-1 to VIII-11

(VIII-1. Production of First Optically Anisotropic Layer)

The pulling rate of a resin by a casting drum was adjusted for changing the thickness of the stretched film such that a stretched film having an in-plane retardation Re(H590) shown in Table 8 was obtained. A stretched film was obtained as the first optically anisotropic layer in the same manner as that of the step (IV-1) of Comparative Examples IV-1 to IV-11 except for the aforementioned matter.

In all Comparative Examples, Re(H450)/Re(H550) of the obtained first optically anisotropic layer was 1.01 and Re(H650)/Re(H550) thereof was 0.99.

(VIII-2. Production of Second Optically Anisotropic Layer)

The pulling rate of a resin by a casting drum was adjusted for changing the thickness of the stretched film such that a stretched film having an in-plane retardation Re(Q590) shown in Table 8 was obtained. A stretched film was obtained as the second optically anisotropic layer in the same manner as that of the step (IV-2) of Comparative Examples IV-1 to IV-11 except for the aforementioned matter.

In all Comparative Examples, Re(Q450)/Re(Q550) of the obtained second optically anisotropic layer was 1.01 and Re(Q650)/Re(Q550) thereof was 0.99.

(VIII-3. Production of Optically Anisotropic Layered Body)

A polarizing film ("HLC2-5618S" manufactured by Sanritz Co., Ltd.), the stretched film as the first optically anisotropic layer, and the stretched film as the second optically anisotropic layer were bonded in this order through tackiness agent layers ("CS9621" manufactured by Nitto Denko Corporation), to obtain a circularly polarizing plate. At that time, the angle of the slow axis of the first optically anisotropic layer relative to the polarized light absorption axis of the polarizing film was set to 15°, and the angle of the slow axis of the second optically anisotropic layer relative to the polarized light absorption axis of the polarizing film was set to 75°.

As to the obtained circularly polarizing plate, the lightness L* was calculated and reflection luminance was evaluated by the aforementioned methods.

[Results]

The results of Examples V-1 to V-11 and Comparative Examples V-1 to V-2 (Table 5); Examples VI-1 to VI-14 and Comparative Examples VI-1 to VI-2 (Table 6); Examples VII-1 to VII-9 and Comparative Examples VII-1 to VII-6 (Table 7); and Comparative Examples VIII-1 to VIII-11 (Table 8) that are experimental examples about the reflection suppression effect are shown in Tables 5 to 8. In the following tables, abbreviations mean as follows.

θ1: the angle of the slow axis of the first optically anisotropic layer relative to the polarized light absorption axis of the polarizer piece of the circularly polarizing plate θ2: the angle of the slow axis of the second optically anisotropic layer relative to the polarized light absorption axis of the polarizer piece of the circularly polarizing plate L*: lightness (A): liquid crystal composition (A)

(B): liquid crystal composition (B)

(C): liquid crystal composition (C)

COP: alicyclic structure-containing polymer

TABLE 5

[Results of experimental examples using liquid crylstal composition (A)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | L* | Reflection luminance |
| Ex. V-1 | (A) | 262 | 15.0° | (A) | 131 | 75.0° | 0.31 | E |
| Ex. V-2 | (A) | 266 | 15.0° | (A) | 133 | 75.0° | 0.22 | D |
| Ex. V-3 | (A) | 270 | 15.0° | (A) | 135 | 75.0° | 0.16 | C |
| Ex. V-4 | (A) | 274 | 15.0° | (A) | 137 | 75.0° | 0.12 | B |
| Ex. V-5 | (A) | 278 | 15.0° | (A) | 139 | 75.0° | 0.09 | B |
| Ex. V-6 | (A) | 285 | 15.0° | (A) | 142 | 75.0° | 0.07 | A |
| Ex. V-7 | (A) | 291 | 15.0° | (A) | 146 | 75.0° | 0.07 | A |
| Ex. V-8 | (A) | 299 | 15.0° | (A) | 150 | 75.0° | 0.11 | B |
| Ex. V-9 | (A) | 307 | 15.0° | (A) | 153 | 75.0° | 0.23 | D |
| Ex. V-10 | (A) | 314 | 15.0° | (A) | 157 | 75.0° | 0.49 | E |
| Ex. V-11 | (A) | 324 | 15.0° | (A) | 162 | 75.0° | 1.15 | E |
| Comp. Ex. V-1 | (A) | 331 | 15.0° | (A) | 166 | 75.0° | 2.02 | E |
| Comp. Ex. V-2 | (A) | 339 | 15.0° | (A) | 170 | 75.0° | 3.47 | E |

TABLE 6

[Results of experimental examples using liquid crylstal composition (B)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | L* | Reflection luminance |
| Ex. VI-1 | (B) | 254 | 15.0° | (B) | 127 | 75.0° | 0.54 | E |
| Ex. VI-2 | (B) | 255 | 15.0° | (B) | 127 | 75.0° | 0.51 | E |
| Ex. VI-3 | (B) | 260 | 15.0° | (B) | 130 | 75.0° | 0.33 | E |
| Ex. VI-4 | (B) | 263 | 15.0° | (B) | 132 | 75.0° | 0.24 | E |
| Ex. VI-5 | (B) | 267 | 15.0° | (B) | 133 | 75.0° | 0.18 | C |
| Ex. VI-6 | (B) | 271 | 15.0° | (B) | 135 | 75.0° | 0.13 | B |
| Ex. VI-7 | (B) | 275 | 15.0° | (B) | 137 | 75.0° | 0.09 | B |
| Ex. VI-8 | (B) | 279 | 15.0° | (B) | 139 | 75.0° | 0.08 | A |
| Ex. VI-9 | (B) | 283 | 15.0° | (B) | 141 | 75.0° | 0.07 | A |
| Ex. VI-10 | (B) | 287 | 15.0° | (B) | 143 | 75.0° | 0.09 | A |
| Ex. VI-11 | (B) | 291 | 15.0° | (B) | 145 | 75.0° | 0.12 | B |
| Ex. VI-12 | (B) | 295 | 15.0° | (B) | 148 | 75.0° | 0.18 | C |
| Ex. VI-13 | (B) | 299 | 15.0° | (B) | 150 | 75.0° | 0.27 | E |
| Ex. VI-14 | (B) | 308 | 15.0° | (B) | 154 | 75.0° | 0.61 | E |
| Comp. Ex. VI-1 | (B) | 316 | 15.0° | (B) | 158 | 75.0° | 1.25 | E |
| Comp. Ex. VI-2 | (B) | 325 | 15.0° | (B) | 163 | 75.0° | 2.39 | E |

TABLE 7

[Results of experimental examples using liquid crylstal composition (C)]

| | First optically anisotropic layer | | | Second optically anisotropic layer | | | Evaluation results | |
|---|---|---|---|---|---|---|---|---|
| | Liquid crystal composition | Re (H590) [nm] | θ1 | Liquid crystal composition | Re (Q590) [nm] | θ2 | L* | Reflection luminance |
| Ex. VII-1 | (C) | 243 | 15.0° | (C) | 122 | 75.0° | 1.24 | E |
| Ex. VII-2 | (C) | 248 | 15.0° | (C) | 124 | 75.0° | 0.89 | E |
| Ex. VII-3 | (C) | 255 | 15.0° | (C) | 127 | 75.0° | 0.51 | E |
| Ex. VII-4 | (C) | 263 | 15.0° | (C) | 132 | 75.0° | 0.26 | E |
| Ex. VII-5 | (C) | 268 | 15.0° | (C) | 134 | 75.0° | 0.18 | C |
| Ex. VII-6 | (C) | 272 | 15.0° | (C) | 136 | 75.0° | 0.13 | B |
| Ex. VII-7 | (C) | 277 | 15.0° | (C) | 138 | 75.0° | 0.11 | B |
| Ex. VII-8 | (C) | 281 | 15.0° | (C) | 141 | 75.0° | 0.12 | B |
| Ex. VII-9 | (C) | 286 | 15.0° | (C) | 143 | 75.0° | 0.15 | C |
| Comp. Ex. VII-1 | (C) | 290 | 15.0° | (C) | 145 | 75.0° | 0.22 | D |
| Comp. Ex. VII-2 | (C) | 295 | 15.0° | (C) | 148 | 75.0° | 0.34 | E |
| Comp. Ex. VII-3 | (C) | 300 | 15.0° | (C) | 150 | 75.0° | 0.52 | E |
| Comp. Ex. VII-4 | (C) | 309 | 15.0° | (C) | 154 | 75.0° | 1.11 | E |
| Comp. Ex. VII-5 | (C) | 318 | 15.0° | (C) | 159 | 75.0° | 2.21 | E |
| Comp. Ex. VII-6 | (C) | 328 | 15.0° | (C) | 164 | 75.0° | 4.04 | E |

TABLE 8

[Results of experimental examples using stretched film]

| | First optically anisotropic layer | | | Second optically anisotropic layer | | | Evaluation results | |
|---|---|---|---|---|---|---|---|---|
| | Resin | Re (H590) [nm] | θ1 | Resin | Re (Q590) [nm] | θ2 | L* | Reflection luminance |
| Comp. Ex. VIII-1 | COP | 225 | 15.0° | COP | 112 | 75.0° | 3.26 | E |
| Comp. Ex. VIII-2 | COP | 236 | 15.0° | COP | 118 | 75.0° | 1.71 | E |
| Comp. Ex. VIII-3 | COP | 246 | 15.0° | COP | 123 | 75.0° | 0.84 | E |
| Comp. Ex. VIII-4 | COP | 257 | 15.0° | COP | 129 | 75.0° | 0.41 | E |
| Comp. Ex. VIII-5 | COP | 268 | 15.0° | COP | 134 | 75.0° | 0.25 | E |
| Comp. Ex. VIII-6 | COP | 279 | 15.0° | COP | 139 | 75.0° | 0.31 | E |
| Comp. Ex. VIII-7 | COP | 290 | 15.0° | COP | 145 | 75.0° | 0.61 | E |
| Comp. Ex. VIII-8 | COP | 300 | 15.0° | COP | 150 | 75.0° | 1.25 | E |
| Comp. Ex. VIII-9 | COP | 311 | 15.0° | COP | 156 | 75.0° | 2.43 | E |
| Comp. Ex. VIII-10 | COP | 322 | 15.0° | COP | 161 | 75.0° | 4.40 | E |
| Comp. Ex. VIII-11 | COP | 332 | 15.0° | COP | 166 | 75.0° | 7.49 | E |

As seen from the results shown in Tables 5 to 8, when the first optically anisotropic layer and the second optically anisotropic layer in the optically anisotropic layered body of the present invention have in-plane retardations satisfying the specific requirements, the optically anisotropic layered body of the present invention can be used together with a circularly polarizing plate in combination with a linear polarizer. The circularly polarizing plate can be used as a reflection suppressing film capable of particularly effectively suppressing reflection of external light in the front direction of an image display device.

REFERENCE SIGN LIST 100 optically anisotropic layered body
110 first optically anisotropic layer
120 second optically anisotropic layer
200 optically anisotropic layered body
210 transparent electroconductive layer
300 circularly polarizing plate
310 linear polarizer
400 organic EL display device
410 organic EL element 500 organic EL display device
510 λ/4 wave plate
600 liquid crystal display device
610 light source
620 light source side linear polarizer
630 liquid crystal cell

The invention claimed is:

1. An optically anisotropic layered body comprising a first optically anisotropic layer and a second optically anisotropic layer, wherein
in-plane retardations Re(H450), Re(H550), Re(H590), and Re(H650) of the first optically anisotropic layer at wavelengths of 450 nm, 550 nm, 590 nm, and 650 nm, respectively, satisfy the following expressions (1), (2), and (3), and
in-plane retardations Re(Q450), Re(Q550), Re(Q590), and Re(Q650) of the second optically anisotropic layer at wavelengths of 450 nm, 550 nm, 590 nm, and 650 nm, respectively, satisfy the following expressions (4), (5), and (6), $$242 \text{ nm} < Re(H590) < 331 \text{ nm} \quad (1),$$

$$0.75 \leq Re(H450)/Re(H550) \leq 0.85 \quad (2),$$

$$1.04 \leq Re(H650)/Re(H550) \leq 1.20 \quad (3),$$

$$121 \text{ nm} < Re(Q590) < 166 \text{ nm} \quad (4),$$

$$0.75 \leq Re(Q450)/Re(Q550) \leq 0.85 \quad (5), \text{ and}$$

$$1.04 \leq Re(Q650)/Re(Q550) \leq 1.20 \quad (6).$$

2. The optically anisotropic layered body according to claim 1, wherein
the in-plane retardation Re(H590) of the first optically anisotropic layer at the wavelength of 590 nm satisfies the following expression (19), and
the in-plane retardation Re(Q590) of the second optically anisotropic layer at the wavelength of 590 nm satisfies the following expression (20), $$266 \text{ nm} < Re(H590) < 314 \text{ nm} \quad (19), \text{ and}$$

$$133 \text{ nm} < Re(Q590) < 157 \text{ nm} \quad (20).$$

3. The optically anisotropic layered body according to claim 1, wherein
the in-plane retardation Re(H590) of the first optically anisotropic layer at the wavelength of 590 nm satisfies the following expression (23), and
the in-plane retardation Re(Q590) of the second optically anisotropic layer at the wavelength of 590 nm satisfies the following expression (24), $$274 \text{ nm} < Re(H590) < 299 \text{ nm} \quad (23), \text{ and}$$

$$137 \text{ nm} < Re(Q590) < 150 \text{ nm} \quad (24).$$

4. The optically anisotropic layered body according to claim 1, wherein an angle formed between a slow axis direction which gives a maximum refractive index in a plane of the first optically anisotropic layer and a slow axis direction which gives a maximum refractive index in a plane of the second optically anisotropic layer is 60°±10°.

5. The optically anisotropic layered body according to claim 1, wherein at least one of the first optically anisotropic layer and the second optically anisotropic layer is formed of a cured product of a liquid crystal composition containing a polymerizable liquid crystal compound.

6. The optically anisotropic layered body according to claim 5, wherein the liquid crystal compound is a liquid crystal compound that expresses an in-plane retardation with reverse wavelength dispersion when it is homogeneously oriented.

7. The optically anisotropic layered body according to claim 5, wherein the liquid crystal compound contains a main chain mesogen and a side chain mesogen bonded to the main chain mesogen in a molecule of the liquid crystal compound.

8. The optically anisotropic layered body according to claim 5, wherein the liquid crystal compound is represented by the following formula (I):

$$Z^1-Y^7-G^1-Y^5-A^4-Y^3+(A^2-Y^1)_m-A^1-(Y^2-A^3)_m-Y^4-A^5-Y^6-G^2-Y^8-Z^2 \quad (I)$$

with substituent $\overset{A^x}{\underset{Q^1}{\overset{\diagdown}{N}}}\overset{A^y}{\underset{N}{\diagup}}$ (in the Formula (I),
$Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;
$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; with a proviso that cases where two or more of each of —O— or —S— groups are adjacently inserted are excluded, wherein R$^2$ is a hydrogen atom or an alkyl group of 1 to 6 carbon atoms;
$Z^1$ and $Z^2$ are each independently an alkenyl group of 2 to 10 carbon atoms optionally being substituted by a halogen atom;
$A^x$ is an organic group of 2 to 30 carbon atoms having at least one aromatic ring selected from the group consisting of an aromatic hydrocarbon ring and an aromatic heterocyclic ring;
$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R³, —SO₂—R⁴, —C(=S) NH—R⁹, or an organic group of 2 to 30 carbon atoms having at least one aromatic ring selected from the group consisting of an aromatic hydrocarbon ring and an aromatic heterocyclic ring, wherein R³ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; R⁴ is an alkyl group of 1 to 20 carbon atoms, an alkenyl group of 2 to 20 carbon atoms, a phenyl group, or a 4-methylphenyl group; R⁹ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A^x$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m is each independently 0 or 1).

9. The optically anisotropic layered body according to claim 5, wherein the liquid crystal compound contains at least one type selected from the group consisting of a benzothiazole ring, and a combination of a cyclohexyl ring and a phenyl ring, in a molecule of the liquid crystal compound.

10. The optically anisotropic layered body according to claim 1, wherein both the first optically anisotropic layer and the second optically anisotropic layer are formed of a cured product of a liquid crystal composition containing a polymerizable liquid crystal compound.

11. The optically anisotropic layered body according to claim 1, comprising a transparent electroconductive layer.

12. A circularly polarizing plate comprising a linear polarizer, and the optically anisotropic layered body according to claim 1, wherein
the circularly polarizing plate comprises the linear polarizer, the first optically anisotropic layer, and the second optically anisotropic layer in this order.

13. The circularly polarizing plate according to claim 12, wherein
an angle θ1 (−90°<θ1<90°) formed between an absorption axis direction of the linear polarizer and a slow axis direction which gives a maximum refractive index in a plane of the first optically anisotropic layer, and
an angle θ2 (−90°<θ2<90°) formed between the absorption axis direction of the linear polarizer and a slow axis direction which gives a maximum refractive index in a plane of the second optically anisotropic layer
have the same sign, and
satisfy the following expressions (27) and (28):

|θ1|=15°±5° (27), and

|θ2|=75°±10° (28).

14. The circularly polarizing plate according to claim 12, wherein
an angle θ1 (−90°<θ1<90°) formed between an absorption axis direction of the linear polarizer and a slow axis direction which gives a maximum refractive index in a plane of the first optically anisotropic layer, and
an angle θ2 (−90°<θ2<90°) formed between the absorption axis direction of the linear polarizer and a slow axis direction which gives a maximum refractive index in a plane of the second optically anisotropic layer
have the same sign, and
satisfy the following expressions (29) and (30):

|θ1|=75°±10° (29), and

|θ2|=15°±5° (30).

15. An image display device comprising the circularly polarizing plate according to claim 12, and an image display element, wherein
the image display device comprises the image display element, the linear polarizer, and the optically anisotropic layered body in this order.

16. An image display device being an organic electroluminescent display device comprising the circularly polarizing plate according to claim 12, and an organic electroluminescent element, wherein
the image display device comprises the linear polarizer, the optically anisotropic layered body, and the organic electroluminescent element in this order.

17. An optically anisotropic layered body comprising a first optically anisotropic layer and a second optically anisotropic layer, wherein
in-plane retardations Re(H450), Re(H550), Re(H590), and Re(H650) of the first optically anisotropic layer at wavelengths of 450 nm, 550 nm, 590 nm, and 650 nm, respectively, satisfy the following expressions (7), (8), and (9), and
in-plane retardations Re(Q450), Re(Q550), Re(Q590), and Re(Q650) of the second optically anisotropic layer at wavelengths of 450 nm, 550 nm, 590 nm, and 650 nm, respectively, satisfy the following expressions (10), (11), and (12), 236 nm<Re(H590)<316 nm (7), 0.85<Re(H450)/Re(H550)≤0.90 (8), 1.02≤Re(H650)/Re(H550)<1.04 (9), 118 nm<Re(Q590)<158 nm (10), 0.85<Re(Q450)/Re(Q550)≤0.90 (11), and 1.02≤Re(Q650)/Re(Q550)<1.04 (12).

18. The optically anisotropic layered body according to claim 17, wherein
the in-plane retardation Re(H590) of the first optically anisotropic layer at the wavelength of 590 nm satisfies the following expression (21), and
the in-plane retardation Re(Q590) of the second optically anisotropic layer at the wavelength of 590 nm satisfies the following expression (22), 260 nm<Re(H590)<291 nm (21), and 130 nm<Re(Q590)<145 nm (22).

19. The optically anisotropic layered body according to claim 17, wherein the in-plane retardation Re(H590) of the first optically anisotropic layer at the wavelength of 590 nm satisfies the following expression (25), and
the in-plane retardation Re(Q590) of the second optically anisotropic layer at the wavelength of 590 nm satisfies the following expression (26), $$271\ nm < Re(H590) < 291\ nm \quad (25), and$$

$$135\ nm < Re(Q590) < 145\ nm \quad (26).$$

20. The optically anisotropic layered body according to claim 17, wherein an angle formed between a slow axis direction which gives a maximum refractive index in a plane of the first optically anisotropic layer and a slow axis direction which gives a maximum refractive index in a plane of the second optically anisotropic layer is 60°±10°.

21. The optically anisotropic layered body according to claim 17, wherein at least one of the first optically anisotropic layer and the second optically anisotropic layer is formed of a cured product of a liquid crystal composition containing a polymerizable liquid crystal compound.

22. The optically anisotropic layered body according to claim 21, wherein the liquid crystal compound is a liquid crystal compound that expresses an in-plane retardation with reverse wavelength dispersion when it is homogeneously oriented.

23. The optically anisotropic layered body according to claim 21, wherein the liquid crystal compound contains a main chain mesogen and a side chain mesogen bonded to the main chain mesogen in a molecule of the liquid crystal compound.

24. The optically anisotropic layered body according to claim 21, wherein the liquid crystal compound is represented by the following formula (I):

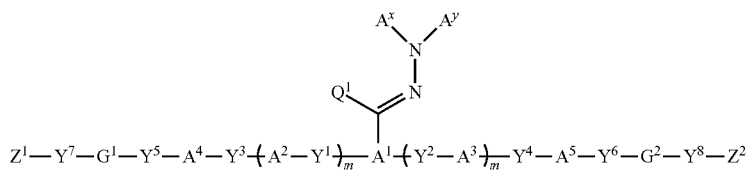

(in the Formula (I),
$Y^1$ to $Y^8$ are each independently a chemical single bond, —O—, —S—, —O—C(=O)—, —C(=O)—O—, —O—C(=O)—O—, —C(=O)—NR$^1$—, —O—NR$^1$—, or —NR$^1$—O—, wherein R$^1$ is a hydrogen atom or an alkyl group of 1 to 6 carbon atoms;

$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, or —C(=O)— inserted therein; with a proviso that cases where two or more of each of —O— or —S— groups are adjacently inserted are excluded, wherein R$^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S) NH—R$^9$, or an organic group of 2 to 30 carbon atoms having at least one aromatic ring selected from the group consisting of an aromatic hydrocarbon ring and an aromatic heterocyclic ring, wherein R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; R$^4$ is an alkyl group of 1 to 20 carbon atoms, an alkenyl group of 2 to 20 carbon atoms, a phenyl group, or a 4-methylphenyl group; R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that A' and A$^y$ have may have a substituent; and A$^x$ and A$^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m is each independently 0 or 1).

25. The optically anisotropic layered body according to claim 21, wherein the liquid crystal compound contains at least one type selected from the group consisting of a benzothiazole ring, and a combination of a cyclohexyl ring and a phenyl ring, in a molecule of the liquid crystal compound.

26. The optically anisotropic layered body according to claim 17, wherein both the first optically anisotropic layer and the second optically anisotropic layer are formed of a cured product of a liquid crystal composition containing a polymerizable liquid crystal compound.

27. The optically anisotropic layered body according to claim 17, comprising a transparent electroconductive layer.

28. A circularly polarizing plate comprising a linear polarizer, and the optically anisotropic layered body according to claim 17, wherein the circularly polarizing plate comprises the linear polarizer, the first optically anisotropic layer, and the second optically anisotropic layer in this order.

29. The circularly polarizing plate according to claim 28, wherein
an angle θ1 (−90°<θ1<90°) formed between an absorption axis direction of the linear polarizer and a slow axis direction which gives a maximum refractive index in a plane of the first optically anisotropic layer, and
an angle θ2 (−90°<θ2<90°) formed between the absorption axis direction of the linear polarizer and a slow axis direction which gives a maximum refractive index in a plane of the second optically anisotropic layer
have the same sign, and
satisfy the following expressions (27) and (28):

|θ1|=15°±5°    (27), and

|θ2|=75°±10°    (28).

30. The circularly polarizing plate according to claim 28, wherein
an angle θ1 (−90°<θ1<90°) formed between an absorption axis direction of the linear polarizer and a slow axis direction which gives a maximum refractive index in a plane of the first optically anisotropic layer, and
an angle θ2 (−90°<θ2<90°) formed between the absorption axis direction of the linear polarizer and a slow axis direction which gives a maximum refractive index in a plane of the second optically anisotropic layer
have the same sign, and
satisfy the following expressions (29) and (30):

|θ1|=75°±10°    (29), and

|θ2|=15°±5°    (30).

31. An image display device comprising the circularly polarizing plate according to claim 28, and an image display element, wherein
the image display device comprises the image display element, the linear polarizer, and the optically anisotropic layered body in this order.

32. An image display device being an organic electroluminescent display device comprising the circularly polarizing plate according to claim 28, and an organic electroluminescent element, wherein
the image display device comprises the linear polarizer, the optically anisotropic layered body, and the organic electroluminescent element in this order.

33. An optically anisotropic layered body comprising a first optically anisotropic layer and a second optically anisotropic layer, wherein
in-plane retardations Re(H450), Re(H550), Re(H590), and Re(H650) of the first optically anisotropic layer at wavelengths of 450 nm, 550 nm, 590 nm, and 650 nm, respectively, satisfy the following expressions (13), (14), and (15), and in-plane retardations Re(Q450), Re(Q550), Re(Q590), and Re(Q650) of the second optically anisotropic layer at wavelengths of 450 nm, 550 nm, 590 nm, and 650 nm, respectively, satisfy the following expressions (16), (17), and (18), 240 nm<Re(H590)<290 nm    (13), 0.90<Re(H450)/Re(H550)≤0.99    (14), 1.01≤Re(H650)/Re(H550)<1.20    (15), 120 nm<Re(Q590)<148 nm    (16), 0.90<Re(Q450)/Re(Q550)≤0.99    (17), and 1.01≤Re(Q650)/Re(Q550)<1.02    (18).

34. The optically anisotropic layered body according to claim 33, wherein an angle formed between a slow axis direction which gives a maximum refractive index in a plane of the first optically anisotropic layer and a slow axis direction which gives a maximum refractive index in a plane of the second optically anisotropic layer is 60°±10°.

35. The optically anisotropic layered body according to claim 33, wherein at least one of the first optically anisotropic layer and the second optically anisotropic layer is formed of a cured product of a liquid crystal composition containing a polymerizable liquid crystal compound.

36. The optically anisotropic layered body according to claim 35, wherein the liquid crystal compound is a liquid crystal compound that expresses an in-plane retardation with reverse wavelength dispersion when it is homogeneously oriented.

37. The optically anisotropic layered body according to claim 35, wherein the liquid crystal compound contains a main chain mesogen and a side chain mesogen bonded to the main chain mesogen in a molecule of the liquid crystal compound.

38. The optically anisotropic layered body according to claim 35, wherein the liquid crystal compound is represented by the following formula (I):

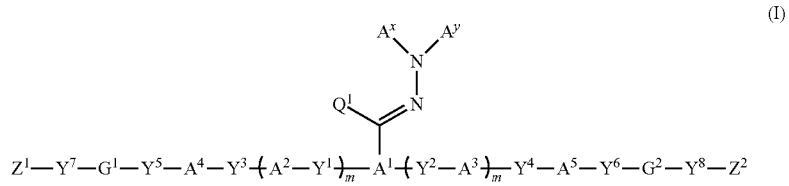

(in the Formula (I),
$Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;
$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; with a proviso that cases where two or more of each of —O— or —S— groups are adjacently inserted are excluded, wherein $R^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, —C(=S) NH—$R^9$, or an organic group of 2 to 30 carbon atoms having at least one aromatic ring selected from the group consisting of an aromatic hydrocarbon ring and an aromatic heterocyclic ring, wherein $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; $R^4$ is an alkyl group of 1 to 20 carbon atoms, an alkenyl group of 2 to 20 carbon atoms, a phenyl group, or a 4-methylphenyl group; $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A'$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m is each independently 0 or 1).

39. The optically anisotropic layered body according to claim 35, wherein the liquid crystal compound contains at least one type selected from the group consisting of a benzothiazole ring, and a combination of a cyclohexyl ring and a phenyl ring, in a molecule of the liquid crystal compound.

40. The optically anisotropic layered body according to claim 33, wherein both the first optically anisotropic layer and the second optically anisotropic layer are formed of a cured product of a liquid crystal composition containing a polymerizable liquid crystal compound.

41. The optically anisotropic layered body according to claim 33, comprising a transparent electroconductive layer.

42. A circularly polarizing plate comprising a linear polarizer, and the optically anisotropic layered body according to claim 33, wherein
the circularly polarizing plate comprises the linear polarizer, the first optically anisotropic layer, and the second optically anisotropic layer in this order.

43. The circularly polarizing plate according to claim 42, wherein
an angle θ1 (−90°<θ1<90°) formed between an absorption axis direction of the linear polarizer and a slow axis direction which gives a maximum refractive index in a plane of the first optically anisotropic layer, and
an angle θ2 (−90°<θ2<90°) formed between the absorption axis direction of the linear polarizer and a slow axis direction which gives a maximum refractive index in a plane of the second optically anisotropic layer
have the same sign, and
satisfy the following expressions (27) and (28):

$$|θ1|=15°±5° \quad (27), \text{ and}$$

$$|θ2|=75°±10° \quad (28).$$

44. The circularly polarizing plate according to claim 42, wherein
an angle θ1 (−90°<θ1<90°) formed between an absorption axis direction of the linear polarizer and a slow axis direction which gives a maximum refractive index in a plane of the first optically anisotropic layer, and
an angle θ2 (−90°<θ2<90°) formed between the absorption axis direction of the linear polarizer and a slow axis direction which gives a maximum refractive index in a plane of the second optically anisotropic layer
have the same sign, and
satisfy the following expressions (29) and (30):

$$|θ1|=75°±10° \quad (29), \text{ and}$$

$$|θ2|=15°±5° \quad (30).$$

45. An image display device comprising the circularly polarizing plate according to claim 42, and an image display element, wherein
the image display device comprises image display element, the linear polarizer, and the optically anisotropic layered body in this order.

46. An image display device being an organic electroluminescent display device comprising the circularly polarizing plate according to claim 42, and an organic electroluminescent element, wherein
the image display device comprises the linear polarizer, the optically anisotropic layered body, and the organic electroluminescent element in this order.

* * * * *